(12) United States Patent
Umemoto et al.

(10) Patent No.: US 8,447,479 B2
(45) Date of Patent: May 21, 2013

(54) SPEED CHANGE SYSTEM FOR WORK VEHICLE

(75) Inventors: Susumu Umemoto, Nara (JP); Hisao Mukai, Sakai (JP); Nobushige Ichikawa, Izumi (JP); Takuya Inamori, Izumi (JP); Yushi Matsuzaki, Sakai (JP)

(73) Assignee: Kubota Corporation, Osaka (JP)

( * ) Notice: Subject to any disclaimer, the term of this patent is extended or adjusted under 35 U.S.C. 154(b) by 303 days.

(21) Appl. No.: 12/968,639

(22) Filed: Dec. 15, 2010

(65) Prior Publication Data

US 2011/0178684 A1 Jul. 21, 2011

(30) Foreign Application Priority Data

Jan. 21, 2010 (JP) .................................. 2010-011329
Jan. 21, 2010 (JP) .................................. 2010-011330
Jan. 21, 2010 (JP) .................................. 2010-011331
Feb. 2, 2010 (JP) .................................. 2010-020989

(51) Int. Cl.
*G06F 7/00* (2006.01)
(52) U.S. Cl.
USPC ............................................ 701/51; 475/275
(58) Field of Classification Search
USPC ...... 701/51, 56; 475/207, 275, 198; 74/336 R
See application file for complete search history.

(56) References Cited

U.S. PATENT DOCUMENTS

| 7,210,293 | B2 | 5/2007 | Fukasawa et al. | |
| 7,469,534 | B2 | 12/2008 | Nishi et al. | |
| 2004/0211276 | A1* | 10/2004 | Ito et al. | 74/335 |

FOREIGN PATENT DOCUMENTS

| JP | 6017928 A | 1/1994 |
| JP | 7023610 A | 1/1995 |
| JP | 7215096 A | 8/1995 |
| JP | 10311412 A | 11/1998 |
| JP | 2001148915 A | 6/2001 |
| JP | 200248236 A | 2/2002 |
| JP | 2002192989 A | 7/2002 |
| JP | 2004017912 A | 1/2004 |
| JP | 2005233420 A | 9/2005 |
| JP | 200792951 A | 4/2007 |
| JP | 2008133896 A | 6/2008 |
| JP | 2008223819 A | 9/2008 |
| JP | 2009168059 A | 7/2009 |

* cited by examiner

Primary Examiner — Thomas Black
Assistant Examiner — Luke Huynh
(74) Attorney, Agent, or Firm — The Webb Law Firm

(57) ABSTRACT

A speed change system for work vehicle having a continuously variable transmission device selects a first change gear ratio which is set larger than a smallest change gear ratio, when an engine rotational speed is a first set rotational speed which is set equal or close to an idling rotational speed of an engine; retains the change gear ratio of the continuously variable transmission device at the smallest change gear ratio, when the engine rotational speed is equal to or above a second set rotational speed set on a high-speed side relative to the first set rotational speed; and makes the change gear ratio of the continuously variable transmission device larger between the first change gear ratio and the smallest change gear ratio, as the engine rotational speed at that moment becomes lower, when the engine rotational speed is between the first and second set rotational speeds.

22 Claims, 17 Drawing Sheets

SPEED CHANGE SYSTEM FOR WORK VEHICLE

BACKGROUND OF THE INVENTION

1. Field of the Invention

The present invention relates to a speed change system for a work vehicle including: a pump swash plate operation mechanism configured to operate a swash plate of a variable capacity pump for continuously variable transmission device; a motor swash plate operation mechanism configured to operate a swash plate of a variable capacity motor for the continuously variable transmission device; a swash plate angle control unit for controlling the pump swash plate operation mechanism and the motor swash plate operation mechanism; and an operation position detector configured to detect an operation position of a speed change operation tool. A swash plate angle of the variable capacity pump is non-stepwise changed, and a swash plate angle of the variable capacity motor is stepwise changed.

2. Description of the Related Art

For such a speed change system for a work vehicle, Japanese Unexamined Patent Application Publication No. 6-17928 describes a system in which: by changing a swash plate angle of a hydraulic pump (variable capacity pump) of a hydrostatic continuously variable transmission device through the operation of a shift lever (speed change operation tool), a change gear ratio of the hydrostatic continuously variable transmission device is non-stepwise altered, and based on detection information from a pressure detecting unit for detecting a circuit pressure of a hydraulic circuit that communicates with the hydraulic pump and a hydraulic motor (variable capacity motor) of the hydrostatic continuously variable transmission device, a hydraulic motor is switched to a low-speed state when the circuit pressure of the hydraulic circuit is a predetermined pressure or more, and to a high-speed state when the circuit pressure is below the predetermined pressure. In this system, though the hydrostatic continuously variable transmission device are provided with the variable capacity pump and the variable capacity motor, the variable capacity motor is normally kept in a high-speed state, and cannot be changed to a low-speed state by a manual operation. Accordingly, even when the speed change operation tool is operated to an operation position on a low-speed side for performing a low-speed traveling of the work vehicle, the variable capacity motor remains in the high-speed state with a low torque. As a result, it becomes difficult for the work vehicle to smoothly travel in a large load situation, such as hill-climbing traveling and a working state in which a working device is connected. In addition, in a low-speed region in which the change gear ratio of the hydrostatic continuously variable transmission device is made large by operating the speed change operation tool to the low-speed side, an angle on a low-speed side exhibiting low hydraulic pressure transmission efficiency is more frequently used as the swash plate angle of the variable capacity pump, and thus a vehicle speed is unlikely to be stabilized during the low-speed traveling.

Accordingly, it may be proposed to provide a special operation tool that allows a manual switching operation of the variable capacity motor. However in this case, a number of operation tools mounted in the operation part should be increased, and it becomes necessary to perform a speed change operation by the speed change operation tool as well as an operation of the operation tool specialized for shifting the swash plate angle of the variable capacity motor, as speed change operation relative to the hydrostatic continuously variable transmission device. Therefore, there is a room for improvement in operability.

As a vehicle speed control system for the work vehicle, Japanese Unexamined Patent Application Publication No. 7-23610 (see paragraph [0012] and FIG. 1) describes the system including: a hydraulic cylinder for speed change configured to operate a trunnion axis of the hydrostatic continuously variable transmission device (corresponding to change gear ratio altering unit); a controller configured to control an actuation of the hydraulic cylinder for speed change (corresponding to vehicle speed control unit); a potentiometer type speed setter for detecting an operation amount of the shift lever; and a potentiometer type feedback sensor configured to detect an actual turning amount of the trunnion axis, wherein the controller controls the actuation of the hydraulic cylinder so that a detection value of the feedback sensor matches a set value by the speed setter. In the work vehicle, it is often the case that the change gear ratio of the continuously variable transmission device is set to a small change gear ratio (high-speed side) for the purpose of, for example, enhancing work efficiency. When the work vehicle is started in such a setting condition, a large load due to the small change gear ratio will be applied to the engine from a stage with a low engine rotational speed, and therefore, engine stall due to overload is likely to be generated.

Accordingly, in order to prevent generation of engine stall, an accelerator operation should be carefully performed. Especially in a case where the work vehicle is started in a situation where a load is large, such as in ascending a slope or in a working state with the working device connected, there is a notable tendency that engine stall occurs, and the accelerator operation should be further carefully performed. Therefore, there is a room for improvement in operability.

As a speed change control system for the work vehicle, Japanese Unexamined Patent Application Publication No. 7-23610 (see paragraph [0012], FIG. 1) describes the system including: the hydraulic cylinder for speed change configured to operate the trunnion axis of the hydrostatic continuously variable transmission device (corresponding to change gear ratio altering unit); the controller configured to control the actuation of the hydraulic cylinder for speed change (corresponding to vehicle speed control unit); the potentiometer type speed setter for detecting the operation amount of the shift lever; and the potentiometer type feedback sensor configured to detect the actual turning amount of the trunnion axis, wherein the controller controls the actuation of the hydraulic cylinder so that the detection value of the feedback sensor matches the set value by the speed setter. In this system, by a control actuation of the vehicle speed control unit, the actual turning amount of the trunnion axis of the hydrostatic continuously variable transmission device can be made correspond to the operation amount of the shift lever. However, it has been known in the hydrostatic continuously variable transmission device that, as the load becomes larger, a loss of a hydraulic pressure due to oil leakage becomes larger, resulting in reduction of power transmission efficiency. Therefore, even when the engine rotational speed is constant, and at the same time the actual turning amount of the trunnion axis of the hydrostatic continuously variable transmission device matches the operation amount of the shift lever maintained at a predetermined operation position, in a case where the load fluctuates during traveling, the power transmission efficiency in the hydrostatic continuously variable transmission device is then fluctuated, and thus the change gear ratio of the hydrostatic continuously variable transmission device becomes unstable and the vehicle speed changes to a large extent.

Accordingly, with respect to the work vehicle, such as a tractor, in which power from an engine whose speed is changed by the hydrostatic continuously variable transmission device is used for traveling and power from the engine whose speed is not changed by the hydrostatic continuously variable transmission device is used for work, if the configuration described in Japanese Unexamined Patent Application Publication No. 7-23610 is introduced, in the case where work, such as rotary tillage work, is performed in which the vehicle speed and an actuation speed of the working device are desired to be retained in a relationship in which they are proportional to the engine rotational speed, this relationship cannot be retained due to a large vehicle speed change caused by the fluctuation of the power transmission efficiency in the hydrostatic continuously variable transmission device, and thus it becomes difficult to make a working trail of the working device uniform with high accuracy. In other words, there is a room for improvement in enhancing work accuracy of rotary tillage work or the like.

It has been proposed that, in the work vehicle having the continuously variable transmission device, the change gear ratio of the continuously variable transmission device is divided into multiple speed change steps, and when the change gear ratio of the continuously variable transmission device is stepwise changed among the divided speed change steps, an integer value corresponding to the number of the divided speed change steps, for example, in a case where the change gear ratio of the continuously variable transmission device is divided into seven steps, a figure from "1"-"7" is displayed as the speed change step of the continuously variable transmission device, and when the change gear ratio of the continuously variable transmission device is changed in a continuous manner, unlike the stepwise change in which the integer alone is displayed, a decimal indication of a value from 1 to 7 is displayed so as to show the continuous change of the change gear ratio of the continuously variable transmission device. Regarding this technique, for example, Japanese Unexamined Patent Application Publication No. 2006-70943 can be referred to. However, it describes a technique in which the change gear ratio of the continuously variable transmission device is decimally expressed merely based on the integer value corresponding to the the divided speed change step, and therefore, such a technique does not have enough meaning to introduce to the work vehicle, and it requires further elaboration and creation to introduce such a technique.

SUMMARY OF THE INVENTION

Therefore, it is desirable to provide a speed change system for a work vehicle having more excellent performance, without reducing operability.

Such a speed change system for a work vehicle will be listed below.

(1) A speed change system for a work vehicle having a continuously variable transmission device including: a pump swash plate operation mechanism configured to operate a swash plate of a variable capacity pump for the continuously variable transmission device; a motor swash plate operation mechanism configured to operate a swash plate of a variable capacity motor for the continuously variable transmission device; a swash plate angle control unit configured to non-stepwise adjust a swash plate angle of the variable capacity pump through the pump swash plate operation mechanism and stepwise adjust a swash plate angle of the variable capacity motor through the motor swash plate operation mechanism; and an operation position detector configured to detect an operation position of a speed change operation tool; wherein the swash plate angle control unit sets the swash plate angle of the variable capacity pump and the swash plate angle of the variable capacity motor based on an output from the operation position detector, and controls the pump swash plate operation mechanism and the motor swash plate operation mechanism so that the swash plate angle of the variable capacity pump and the swash plate angle of the variable capacity motor become respective set swash plate angles, and when the swash plate angle of the variable capacity motor is changed based on the output from the operation position detector, the swash plate angle control unit controls the pump swash plate operation mechanism in such a manner that the swash plate angle of the variable capacity pump is changed with a control amount which is set so as to compensate an amount of change in a change gear ratio of the continuously variable transmission device caused along with the change of the swash plate angle of the variable capacity motor.

According to this system, by operating the speed change operation tool, not only the swash plate angle of the variable capacity pump but also the swash plate angle of the variable capacity motor can be changed. Accordingly, for example in a large load situation, by operating the speed change operation tool to change the swash plate angle of the variable capacity motor to an angle on a low-speed side, a high torque can be obtained, and thus even in the large load situation, the work vehicle can smoothly travel. In addition, during the low-speed traveling, by operating the speed change operation tool to change the swash plate angle of the variable capacity motor to the angle on the low-speed side, an angle on the high-speed side exhibiting high hydraulic pressure transmission efficiency can be more frequently used as the swash plate angle of the variable capacity pump, and thus the vehicle speed during the low-speed traveling can be stabilized, to thereby facilitate work at a low-speed.

Then, the special operation tool for shifting the swash plate angle of the variable capacity motor becomes unnecessary and therefore, it becomes unnecessary to secure a space for mounting such a newly introduced operation tool in the operation part, and lowering in the operability of the continuously variable transmission device can be prevented, which may otherwise be caused by introducing the special operation tool for shifting the swash plate angle of the variable capacity motor.

Furthermore, when the swash plate angle of the variable capacity motor is shifted from the angle on the low-speed side to the angle on the high-speed side, along with the shifting, the swash plate angle of the variable capacity pump is changed to an angle on a low-speed side with an appropriate operation amount, to thereby compensate (offset) an amount in the change gear ratio increased along with the shifting of the swash plate angle of the variable capacity motor. To the contrary, when the swash plate angle of the variable capacity motor is shifted from the angle on the high-speed side to the angle on the low-speed side, along with the shifting, the swash plate angle of the variable capacity pump is changed to the angle on the high-speed side with an appropriate operation amount, to thereby compensate (offset) an amount in the change gear ratio reduced along with the shifting of the swash plate angle of the variable capacity motor.

With this configuration, while the swash plate angle of the variable capacity pump as well as the swash plate angle of the variable capacity motor can be changed by operating the speed change operation tool, the change gear ratio of the continuously variable transmission device can be made constant, regardless of the shifting of the swash plate angle of the variable capacity motor. As a result, while the swash plate angle of the variable capacity motor is configured to be stepwise shifted, the change gear ratio of the continuously variable transmission device can be altered by the speed change operation tool, smoothly without steps.

(2) A speed change system for a work vehicle having a continuously variable transmission device including: an engine rotational speed detector configured to detect an engine rotational speed; and a vehicle speed control unit configured to control a change gear ratio of the continuously variable transmission device; wherein the vehicle speed control unit controls the change gear ratio with a process including: (a) when the engine rotational speed is a first set rotational speed which is set to a rotational speed equal or close to an idling rotational speed of an engine, selecting a first change gear ratio which is set to a change gear ratio larger than a smallest change gear ratio as the change gear ratio of the continuously variable transmission device; (b) when the engine rotational speed is a rotational speed which is equal to or above a second set rotational speed which is set on a high-speed side relative to the first set rotational speed, retaining the change gear ratio of the continuously variable transmission device at the smallest change gear ratio; and (c) when the engine rotational speed is a rotational speed between the first set rotational speed and the second set rotational speed, making the change gear ratio of the continuously variable transmission device larger between the first change gear ratio and the smallest change gear ratio, as the engine rotational speed at that moment becomes low.

According to this system, in a case where the engine rotational speed is increased from the idling rotational speed by an accelerator operation and the work vehicle is started, as the engine rotational speed becomes a lower rotational speed close to the first set rotational speed, the change gear ratio of the continuously variable transmission device becomes a larger change gear ratio on a low-speed side, and thus a load on the engine is reduced. Therefore, as compared with the case where the work vehicle is started in a state in which the change gear ratio of the continuously variable transmission device is retained at a small change gear ratio on the high-speed side exhibiting a large load, without placing any burden on the driver, a decrease in the engine rotational speed and generation of engine stall caused by overload upon starting can be effectively suppressed, and the starting of the work vehicle can be smoothly performed.

In addition, in a case where the engine rotational speed is reduced to a rotational speed lower than the second set rotational speed during traveling due to the traveling load, working load or the like, as a decrease amount from the second set rotational speed becomes larger, the change gear ratio of the continuously variable transmission device becomes a larger change gear ratio on the low-speed side, and thus a load on the engine is reduced. Therefore, the engine can be imparted with a viscous property, to thereby effectively suppress the generation of engine stall which may otherwise be caused by overload.

Then, when the engine rotational speed is increased to or above the second set rotational speed, regardless of fluctuation of the engine rotational speed caused by the accelerator operation, traveling load or working load, the change gear ratio of the continuously variable transmission device becomes constant at the smallest change gear ratio, and therefore, a relationship in which the vehicle speed is proportional to the engine rotational speed is retained. Accordingly, with respect to the work vehicle in which power from the engine whose speed is not changed by the continuously variable transmission device is generally used for work, in the case where the work, such as rotary tillage work, is performed in which the vehicle speed and the actuation speed of the working device are desired to be retained in a relationship in which they are proportional to the engine rotational speed, even through the engine rotational speed is changed due to traveling load, working load or the like during work traveling, the vehicle speed and the actuation speed of the working device are changed in accordance with the change in the engine rotational speed, while they are retained in the constant relationship. As a result, an unevenness in the working trail of the working device can be prevented which may otherwise be caused by the vehicle speed and the actuation speed of the working device not being retained in a constant relationship.

Furthermore, when the engine rotational speed is a rotational speed between the first set rotational speed and the second set rotational speed, the engine rotational speed as well as the change gear ratio of the continuously variable transmission device is changed by the accelerator operation, a range of adjustment of the vehicle speed by the accelerator operation becomes wider, and an amount of change in the vehicle speed relative to the accelerator operation amount becomes larger, and acceleration and deceleration by the accelerator operation is facilitated. Therefore, moving can be comfortably performed.

(3) A speed change system for a work vehicle having a continuously variable transmission device including: an engine rotational speed detector configured to detect an engine rotational speed; a vehicle speed control unit configured to control a change gear ratio of the continuously variable transmission device; and a vehicle speed detector configured to detect a vehicle speed; wherein the vehicle speed control unit computes a control target vehicle speed based on the detected engine rotational speed and a change gear ratio which is set for the continuously variable transmission device, and controls the change gear ratio of the continuously variable transmission device so that the detected vehicle speed matches the control target vehicle speed.

In this system, the vehicle speed control unit performs a vehicle speed feedback control to change the change gear ratio of the continuously variable transmission device so that the vehicle speed detected by a vehicle speed detector matches the control target vehicle speed, and therefore, an amount of fluctuation in the power transmission efficiency in the continuously variable transmission device caused by fluctuation in load can be compensated by the control actuation of the vehicle speed control unit, and regardless of the fluctuation of the power transmission efficiency in the continuously variable transmission device, the change gear ratio of the continuously variable transmission device can be stabilized. Accordingly, the speed change by the continuously variable transmission device can be performed with high accuracy, and a relationship in which the engine rotational speed and the vehicle speed correspond to each other at the change gear ratio of the continuously variable transmission device set by the change gear ratio setting unit (for example, the relationship in which the vehicle speed is proportional to the engine rotational speed) can be retained with high accuracy.

As a result, with respect to the work vehicle, such as tractor, in which power from the engine whose speed is changed by the transmission device for traveling is generally used for traveling and power from the engine whose speed is not changed by the transmission device for traveling is generally used for work, in the case where work, such as rotary tillage work, is performed in which the vehicle speed and the actuation speed of the working device are desired to be accurately retained in a relationship in which they are proportional to the engine rotational speed, the relationship can be retained with high accuracy regardless of the fluctuation of the power transmission efficiency in the continuously variable transmission device, and a difference is unlikely to occur between the vehicle speed and an appropriate speed for the actuation speed of the working device. Thus the working trail of the working device can be made uniform with high accuracy, and the work accuracy of rotary tillage work or the like can be enhanced.

(4) A speed change system for a work vehicle having a continuously variable transmission device including: a computing unit configured to compute a rated vehicle speed obtained when an engine rotational speed reaches a rated rotational speed of an engine, based on the rated rotational speed and a change gear ratio set for the continuously variable transmission device; a display device including: a vehicle speed display part configured to display information regarding a vehicle speed; and a speed change step display part for variable speed change configured to display with characters without unit the rated vehicle speed output by the computing unit as a speed change step of the continuously variable transmission device; and a display control unit configured to control the display device.

According to this system, when the change gear ratio of the continuously variable transmission device is changed by the change gear ratio setting unit, the speed change step of the continuously variable transmission device displayed on the speed change step display part for continuously variable speed change is changed in a continuous manner. In other words, a state in which the change gear ratio of the continuously variable transmission device is changed in a continuous manner can be clearly indicated. Then, with such a continuous change in the change gear ratio of the continuously variable transmission device, a precise setting of the change gear ratio the continuously variable transmission device in accordance with the work condition is facilitated.

In addition, at the change gear ratio of the continuously variable transmission device set by the change gear ratio setting unit, the speed change step of the continuously variable transmission device displayed on the speed change step display part for continuously variable speed change is a vehicle speed upon a rated rotation obtained when an output rotational speed of the engine reaches the rated rotational speed, i.e., the highest speed obtained when the accelerator operation becomes maximum, and therefore, without using a vehicle speed table which stores the highest speed for each speed change step, the highest speed for the speed change step set by the change gear ratio setting unit can be easily understood. Accordingly, regardless of the state of the vehicle including traveling and stopping, the vehicle speed setting in accordance with the work condition is facilitated.

Therefore, there can be displayed a state in which the change gear ratio of the continuously variable transmission device is changed in a continuous manner in accordance with the change of the speed change step by the change gear ratio setting unit, and moreover, information can be displayed in such a suitable manner for the work vehicle that the vehicle speed setting in accordance with the work condition is facilitated, and thus workability can be enhanced.

DETAILED DESCRIPTION OF THE PREFERRED EMBODIMENTS

Hereinbelow, as one example of embodiment to carry out the present invention, a case in which a speed change system of a work vehicle according to the present invention is applied to a tractor as one example of the work vehicle will be described with reference to the drawings.

Figure 1:
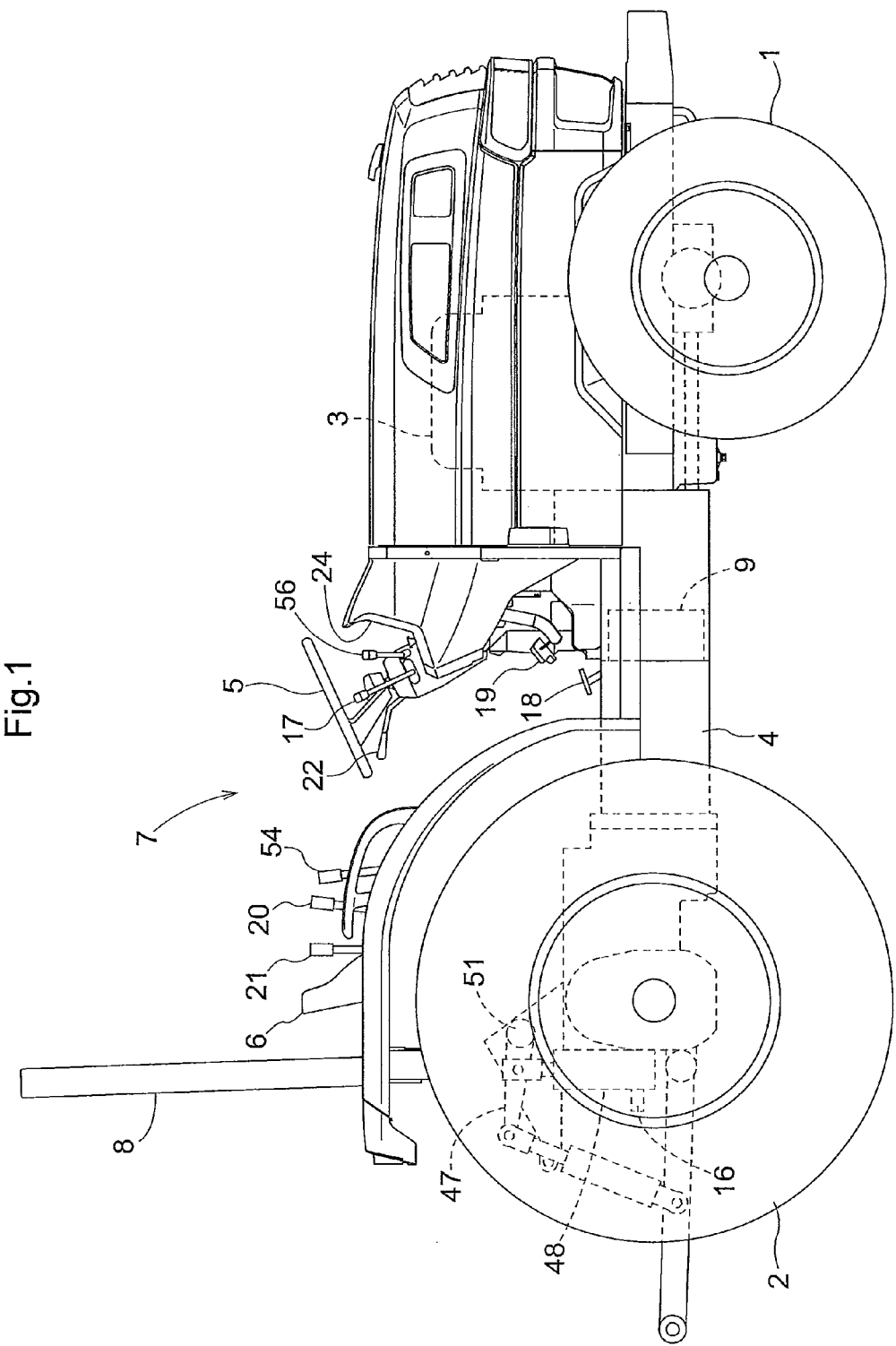
FIG. 1 is a side view of an entire tractor.
Figure 2:
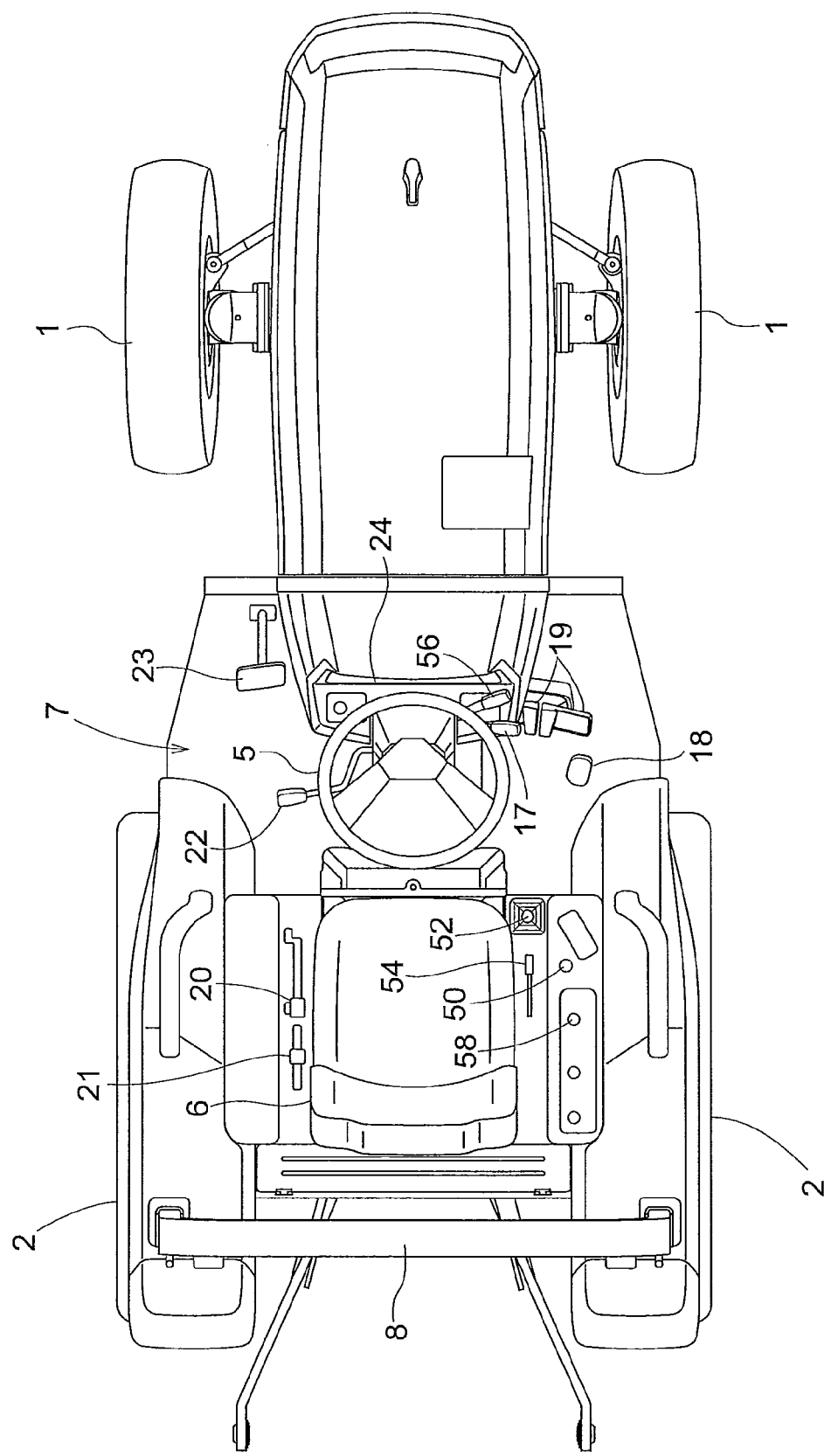
FIG. 2 is a plan view of the entire tractor.

As shown in FIGS. 1 and 2, the tractor is configured as four-wheel-drive type including a pair of right and left front wheels 1 which are steerable and drivable, and a pair of right and left rear wheels 2 which are drivable and to which braking is independently applicable. A front portion side of the tractor has an engine 3 mounted thereon, and to a rear portion of the engine 3, a transmission case (hereinafter, referred to as "T/M case") 4, also serving as a body frame, is connected. In a rear portion side of the tractor, a steering wheel 5 for front wheel steering and a driver's seat 6 are disposed to form a boarding operation part 7, and a gate-shaped protection frame 8 is vertically arranged.

Figure 3:
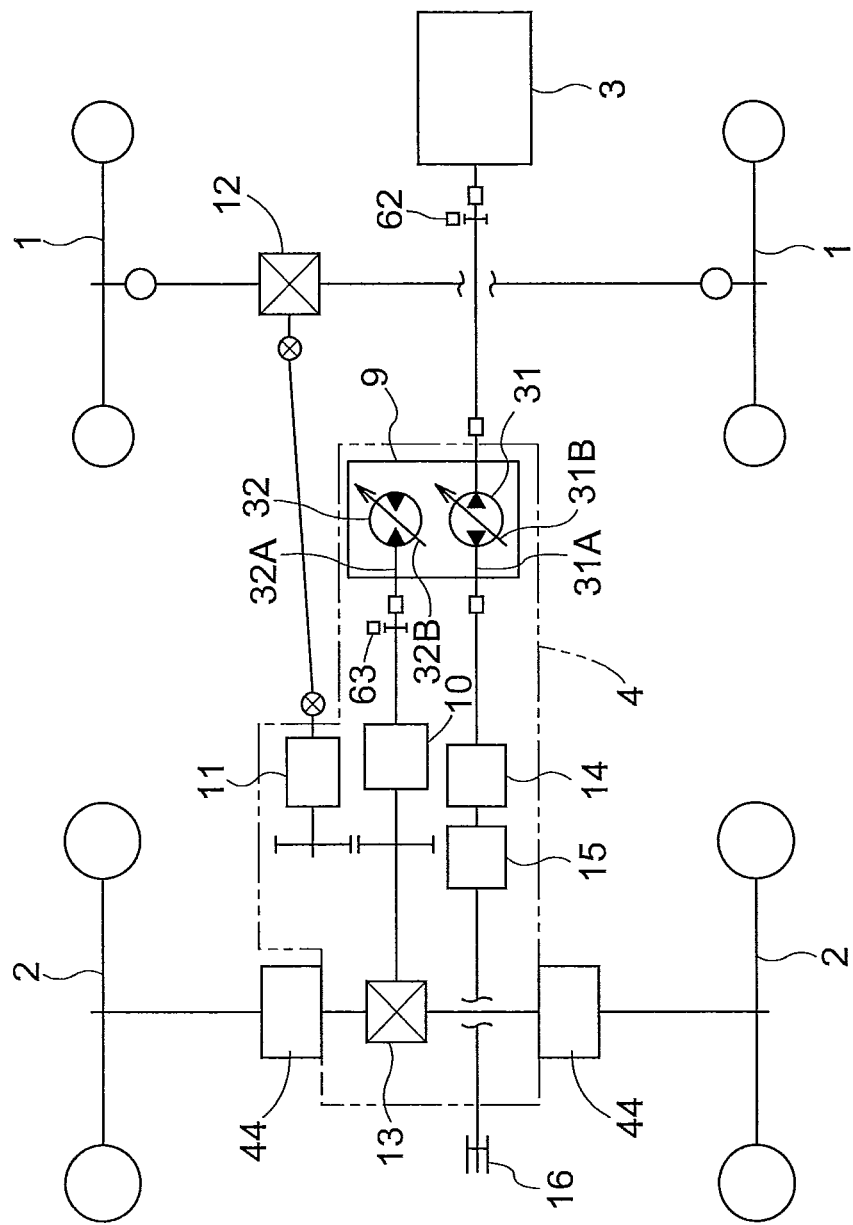
FIG. 3 is a schematic plan view showing a transmission structure of the tractor.

As shown in FIGS. 1 and 3, in the tractor, power from the engine 3 is transmitted to a main transmission device 9 for traveling. Power changed by the main transmission device 9 is used for traveling, and non-changed power which has passed through the main transmission device 9 is used for working. The power for traveling is transmitted to an auxiliary transmission device 10 for traveling, shifted by the auxiliary transmission device 10, and divided into power for front wheel drive and power for rear wheel drive. The power for front wheel drive is transmitted through a power transmission switching device 11 for front wheel, a differential device 12 for front wheel, and the like, to the right and left front wheels 1. The power for rear wheel drive is transmitted through a differential device 13 for rear wheel and the like, to the right and left rear wheels 2. The power for working is transmitted through a clutch 14 for working, a transmission device 15 for working, and the like, to a PTO shaft 16 for power takeoff.

To sum up, the tractor is configured as clutchless type in which no main clutch is present which would otherwise connect or disconnect the transmission from the engine 3 to the right and left front wheels 1 and the right and left rear wheels 2 as drive wheels, and at the same time the transmission from the engine 3 to the PTO shaft 16, through the connection or disconnection of the transmission from the engine 3 to the main transmission device 9.

As shown in FIGS. 1 and 2, on a lower right side of the steering wheel 5 in the boarding operation part 7, an accelerator lever 17 is provided which is swingable in a front-rear direction and is capable of retaining its position at a desired operation position. In a right foot area, an accelerator pedal 18 and a pair of right and left brake pedals 19 are provided, which are configured as pressing operation type to automatically resume respective press canceling positions. On a left side of the driver's seat 6, there are provided: a main shift lever 20 as one example of a speed change operation tool, which is swingable in the front-rear direction and capable of retaining its position at a desired operation position; and an auxiliary shift lever 21 which is swingable in the front-rear direction and capable of retaining its position at a low-speed position, a high-speed position or a high-speed movement position. On a left lower side of the steering wheel 5, an FR lever 22 for switching forward-reverse movement is provided which is swingable in the front-rear direction and capable of retaining its position at a neutral position, a forward position or a reverse position. In a left foot area, a stop pedal 23 is provided which is configured as pressing operation type to automatically resume a press canceling position. On a front lower side of the steering wheel 5, a display panel 24 is provided which is configured to display information, such as vehicle speed.

Figure 4A:
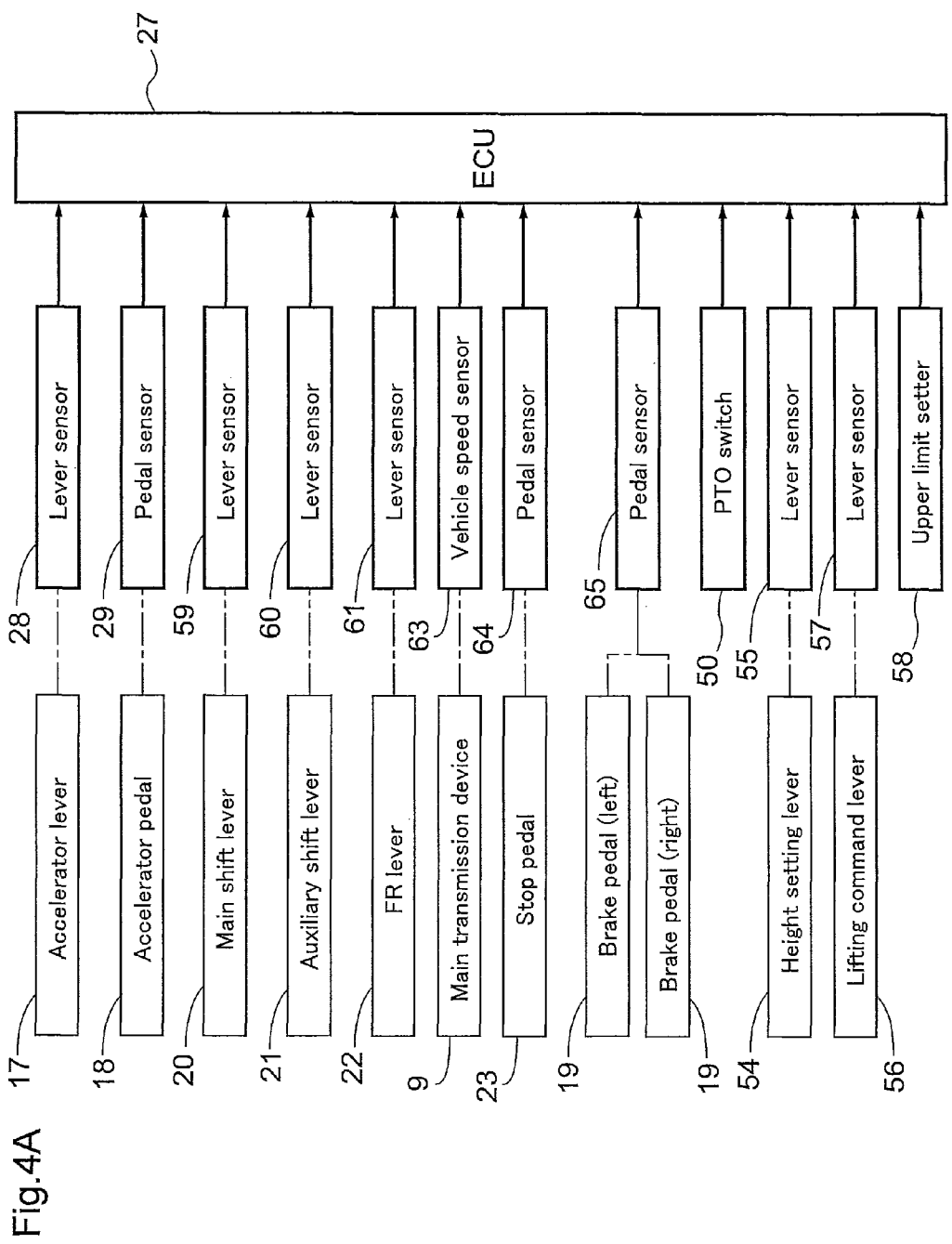
FIGS. 4A, 4B and 4C are block diagrams showing a control configuration.
Figure 4B:
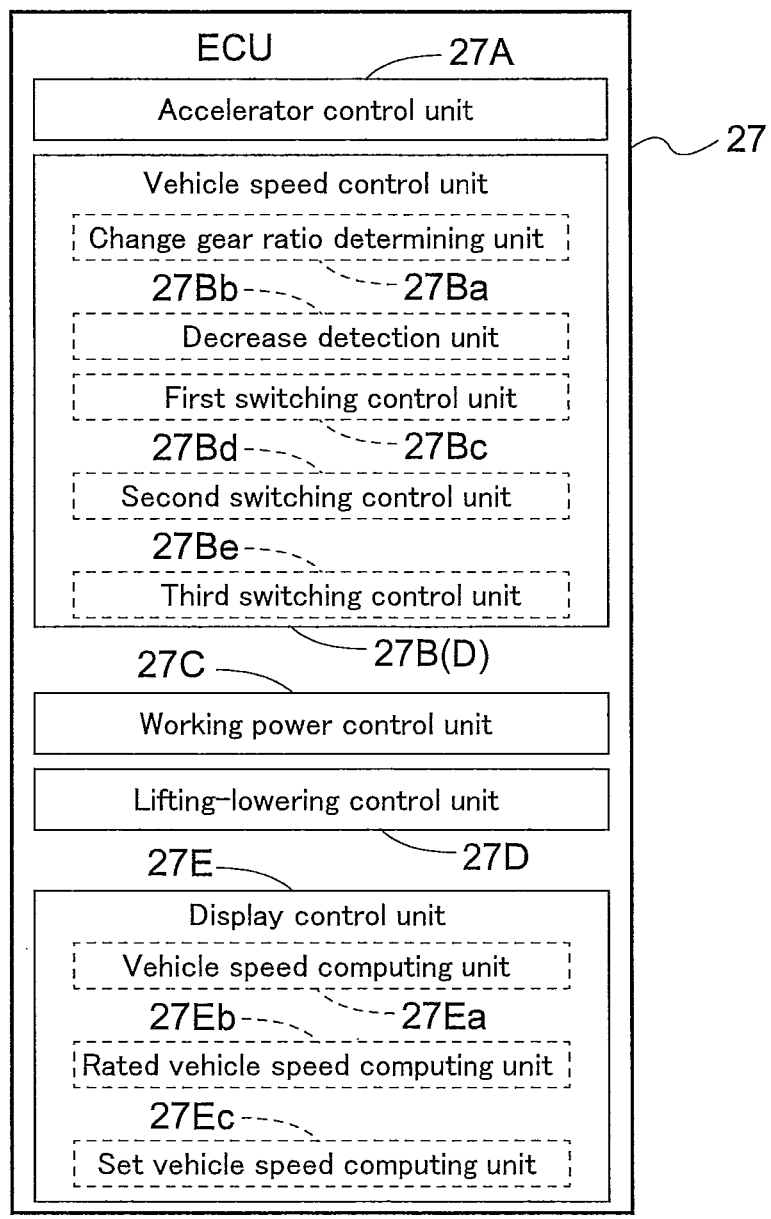
Figure 4C:
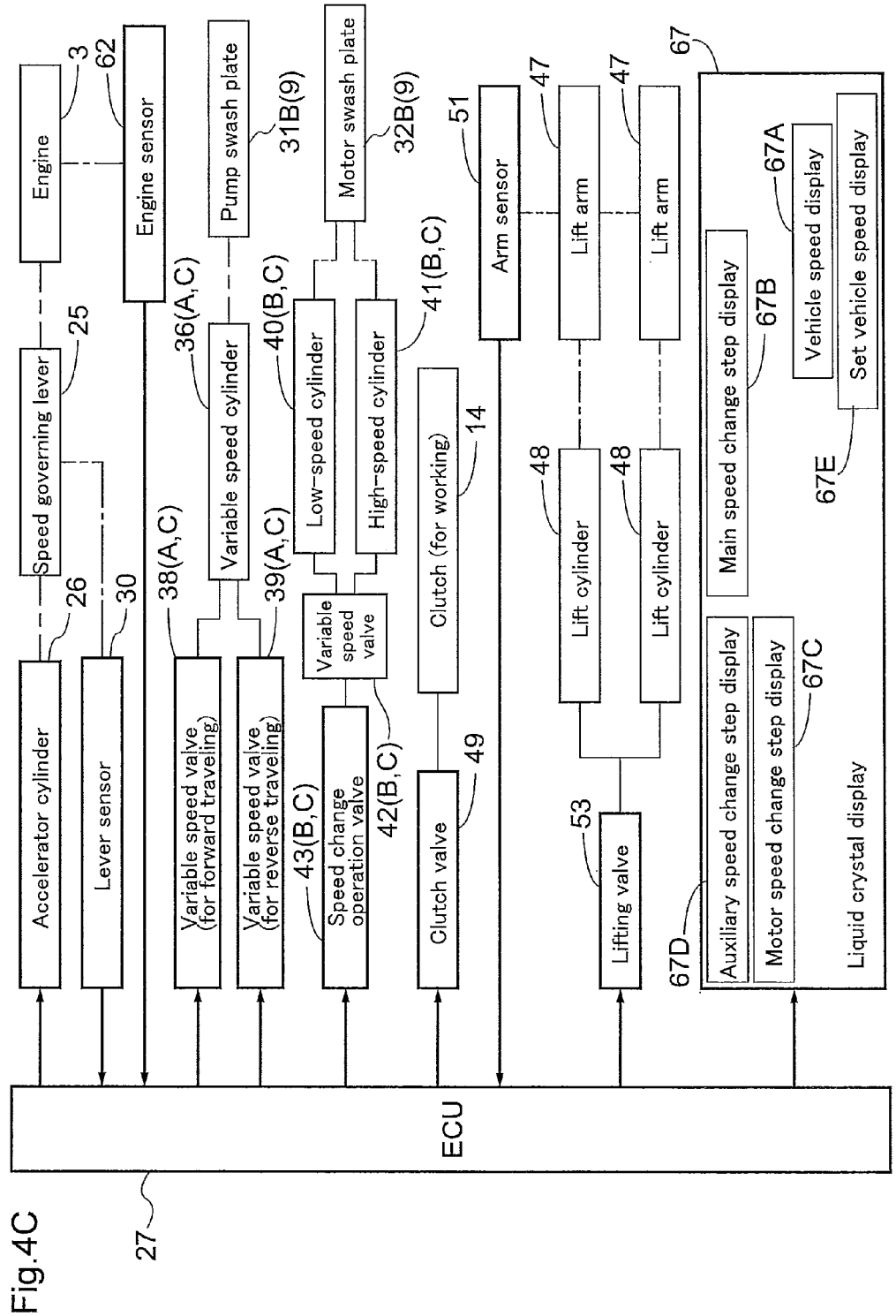

As shown in FIGS. 4B and 4C, the engine 3 is configured so that its output rotational speed is non-stepwise adjusted between an idling rotational speed and a rated rotational speed, by an actuation of an accelerator cylinder 26 which is configured to operate a speed governing lever 25 of a speed governor (not shown) thereof. An electric cylinder is used for the accelerator cylinder 26. The actuation of the accelerator cylinder 26 is controlled by a control actuation of an accelerator control unit 27A provided as control program in an electronic control unit (hereinbelow, referred to as "ECU") 27.

The ECU 27 includes a microcomputer having a CPU, an EEPROM and the like. To the ECU 27 are input: an output of a lever sensor 28 for detecting an operation position of the accelerator lever 17; an output of a pedal sensor 29 for detecting an operation position of the accelerator pedal 18; and an output of a lever sensor 30 for detecting an operation position of the speed governing lever 25. A rotatable potentiometer is used for each of the lever sensor 28 for accelerator lever, the pedal sensor 29 for accelerator pedal, and the lever sensor 30 for speed governing lever.

The accelerator control unit 27A is configured to compare the operation position of the accelerator lever 17 and the operation position of the accelerator pedal 18 based on the output of the lever sensor 28 for accelerator lever, the output of the pedal sensor 29 for accelerator pedal, and the output of the lever sensor 30 for speed governing lever, and when the operation position of the accelerator pedal 18 is not on a high-speed side relative to the operation position of the accelerator lever 17, the actuation of the accelerator cylinder 26 is controlled so that the operation position of the speed governing lever 25 corresponds to the operation position of the accelerator lever 17. When the operation position of the accelerator pedal 18 is on the high-speed side relative to the operation position of the accelerator lever 17, the actuation of the accelerator cylinder 26 is controlled so that the operation position of the speed governing lever 25 corresponds to the operation position of the accelerator pedal 18.

Figure 5:
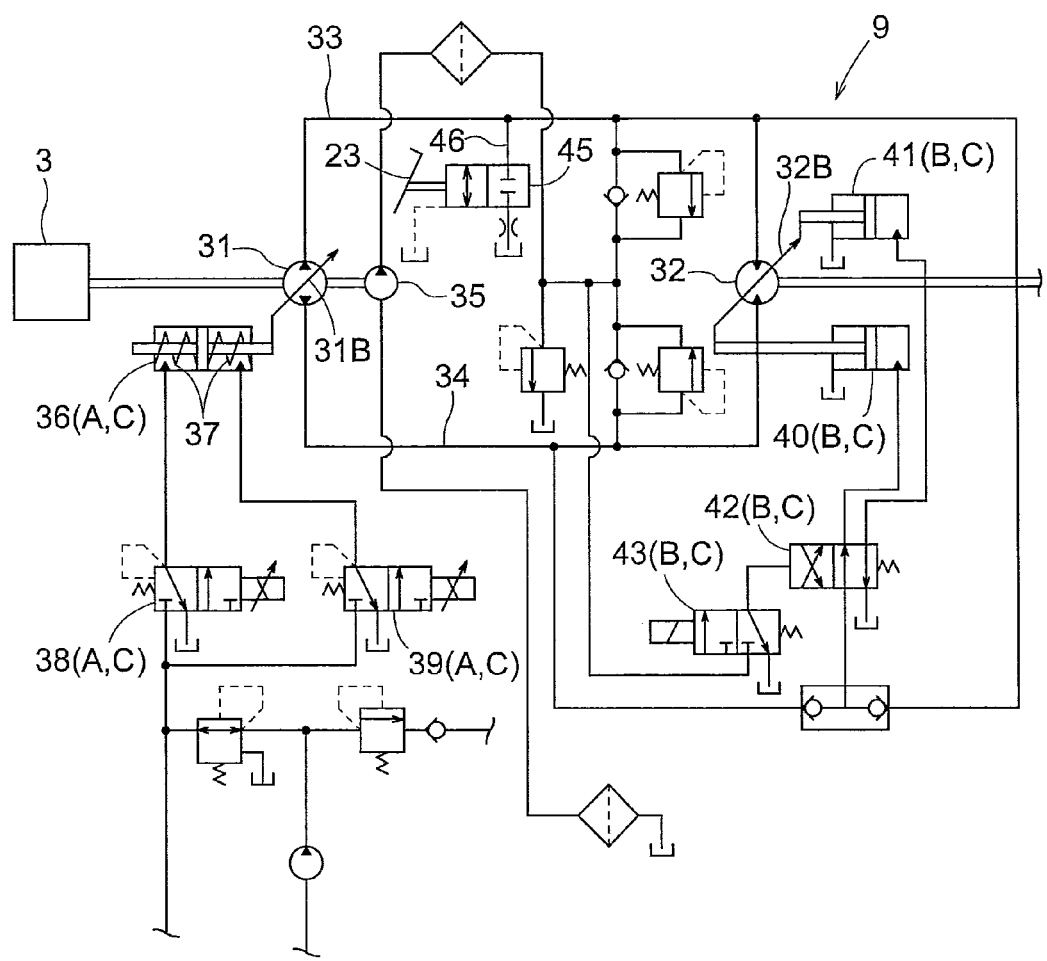
FIG. 5 is a schematic view showing a configuration and an operation structure of a main transmission device (HST).
Figure 6:
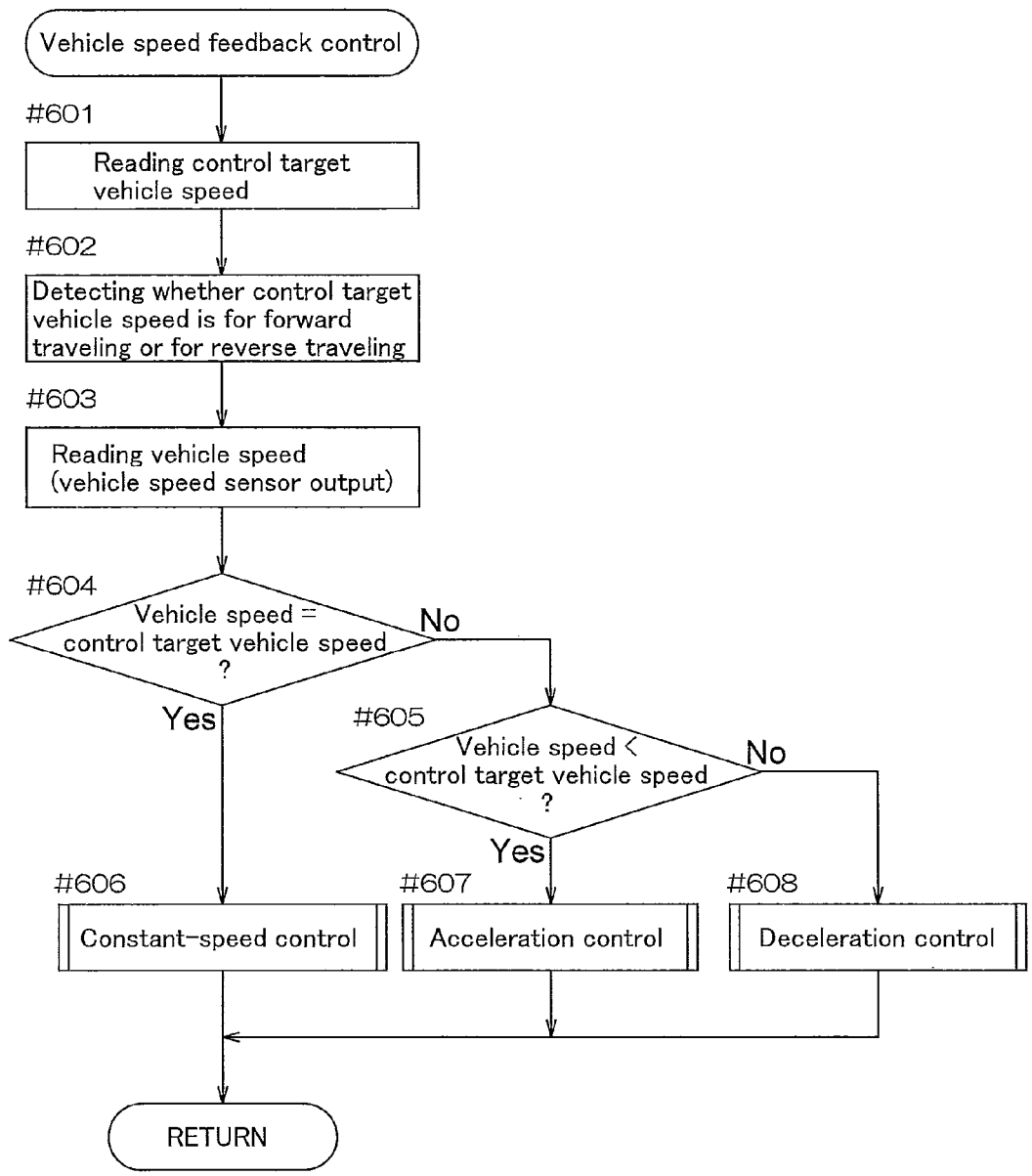
FIG. 6 is a flow chart of vehicle speed control.

As shown in FIGS. 3 and 5, a hydrostatic transmission device (hereinbelow, referred to as "HST") is used for the main transmission device 9. The HST 9 is formed of a variable capacity pump 31 and a variable capacity motor 32, each of which are of axial plunger type, and the like, built in the T/M case 4. Power (non-changed power; non-changed rotational speed) which has passed through the HST 9 is output to a pump shaft 31A of the variable capacity pump 31 as power for working, while power (rotational speed) changed by the HST 9 is output to a motor shaft 32A of the variable capacity motor 32 as power for traveling. The variable capacity pump 31 and the variable capacity motor 32 are connected so as to form a closed circuit through a first oil passage 33 and a second oil passage 34. In the closed circuit, oil is supplied from a charge pump 35 actuated by the power from the engine 3.

As shown in FIGS. 4A, 4B, 4C and 5, the variable capacity pump 31 is configured to non-stepwise alter an operation angle of a pump swash plate 31B (a swash plate angle of the variable capacity pump 31), by an actuation of a variable speed cylinder 36 for pump provided inside the T/M case 4. For the variable speed cylinder 36, a double-acting type hydraulic cylinder is used, which has a pair of compression springs 37 embedded therein and configured to bias the variable speed cylinder 36 to return to a neutral state in which the operation angle of the pump swash plate 31B is zero. The actuation of the variable speed cylinder 36 is controlled by actuations of a variable speed valve 38 for forward traveling and a variable speed valve 39 for reverse traveling, each formed of an electromagnetic proportional valve. The actuations of the variable speed valves 38,39 are controlled by a control actuation of a vehicle speed control unit 27B provided as control program in the ECU 27.

To sum up, the variable speed cylinder 36 for pump, the variable speed valve 38 for forward traveling, and the variable speed valve 39 for reverse traveling form a pump swash plate operation unit A which is configured to non-stepwise operate the pump swash plate 31B of the variable capacity pump 31 in accordance with the control actuation of the vehicle speed control unit 27B.

The variable capacity motor 32 is configured to be switched between two steps, including a low-speed step in which an operation angle of a motor swash plate 32B (a swash plate angle of the variable capacity motor 32) is set to a set angle for low-speed and a high-speed step in which the operation angle is set to a set angle for high-speed, by actuations of a low-speed cylinder 40 for motor and a high-speed cylinder 41 for motor, provided inside the T/M case 4. A single-acting type hydraulic cylinder is used for each of the low-speed cylinder 40 and the high-speed cylinder 41. The actuations of the low-speed cylinder 40 and the high-speed cylinder 41 are controlled by an actuation of a variable speed valve 42 formed of a pilot-operable switching valve. The actuation of the variable speed valve 42 is controlled by an actuation of a speed change operation valve 43 formed of an electromagnetic proportional valve. The actuation of the speed change operation valve 43 is controlled by the control actuation of the vehicle speed control unit 27B.

To sum up, the low-speed cylinder 40 for motor, the high-speed cylinder 41 for motor, the variable speed valve 42 and the speed change operation valve 43 form a motor swash plate operation unit B which is configured to operate the motor swash plate 32B of the variable capacity motor 32 between two steps including high and low, in accordance with the control actuation of the vehicle speed control unit 27B.

The pump swash plate operation unit A and the motor swash plate operation unit B form a change gear ratio altering unit C configured to change a change gear ratio of the main transmission device 9, and the vehicle speed control unit 27B functions as a swash plate angle control unit D for controlling an actuation of the change gear ratio altering unit C. The main transmission device 9 is configured as electronic control type in which the change gear ratio can be non-stepwise and stepwise altered, by altering the operation angles of the pump swash plate 31B and the motor swash plate 32B through the control of the change gear ratio altering unit C using the control actuation of the vehicle speed control unit 27B.

Though not shown, for the auxiliary transmission device 10, a gear type transmission device (stepped transmission device) is used which is capable of three-step speed change, including a low-speed step for low-speed working, a high-speed step for high-speed working, and a fastest step for high-speed moving. The auxiliary transmission device 10 is linked to the auxiliary shift lever 21 through a mechanical linkage mechanism for auxiliary speed change, in such a manner that, when the auxiliary shift lever 21 is operated to the low-speed position, a speed change step is shifted to the low-speed step, when the auxiliary shift lever 21 is operated to the high-speed position, the speed change step is shifted to the high-speed step, and when the auxiliary shift lever 21 is operated to the high-speed movement position, the speed change step is shifted to the fastest step.

It should be noted that, in this tractor, a traveling transmission system is configured in such a manner that: when an engine rotational speed, the change gear ratio of the main transmission device 9, and the speed change step of the auxiliary transmission device 10 are set to the rated rotational speed, a fastest change gear ratio (smallest change gear ratio), and the low-speed step for low-speed working, respectively, the obtained maximum speed at low-speed working becomes 5 km/h; when the engine rotational speed, the change gear ratio of the main transmission device 9, and the speed change step of the auxiliary transmission device 10 are set to the rated rotational speed, the fastest change gear ratio, and the high-speed step for high-speed working, respectively, the obtained maximum speed at high-speed working becomes 12 km/h; and when the engine rotational speed, the change gear ratio of the main transmission device 9, and the speed change step of the auxiliary transmission device 10 are set to the rated rotational speed, the fastest change gear ratio, and the fastest step for high-speed moving, respectively, the obtained maximum speed at high-speed moving becomes 30 km/h.

As shown in FIG. 3, on a right side and a left side in a rear portion of the T/M case 4, multiplate type parking brakes 44 each configured to put a brake on the corresponding rear wheel 2 are provided. The left parking brake 44 is linked to the left brake pedal 19 and the right parking brake 44 is linked to the right brake pedal 19 through the corresponding mechanical linkage mechanism for braking (not shown), in such a manner that a brake is put on the corresponding rear wheel 2, with a braking force in accordance with a pressing operation amount of the corresponding brake pedal 19.

With this configuration, for example, during a turning traveling in which the steering wheel 5 is operated to turn in a turning direction, by performing a pressing operation on one of the right and left brake pedals 19 alone corresponding to the rear wheel 2 on an inner side of the turn, a turning state at that moment can be switched from a normal turning state caused by the turning operation of the steering wheel 5 to a braking turning state in which, in addition to the normal turning state, a brake is put on the rear wheel 2 on the inner side of the turn, and thus a turning radius of a vehicle body can be made small. In addition, during a straight-ahead traveling, if a deviation occurs in a traveling direction of the vehicle body caused by roughness in an agricultural field plough pan or the like, by performing a pressing operation on the brake pedal 19 on an opposite side to a direction of the deviation, a traveling state at that moment can be switched from a straight-ahead traveling state to a single braking traveling state. Accordingly, while retaining the steering operation system in the straight-ahead traveling state, the traveling direction of the vehicle body can be corrected. Then, by performing a dual pressing operation of the right and left brake pedals 19, the right and left parking brakes 44 can be used as a brake for deceleration stop.

Though not shown, the right and left brake pedals 19 are provided with a connection mechanism switchable between a connecting state in which the right and left brake pedals 19 are connected to prevent an independent operation of one of the right and left brake pedals 19, and a connection canceling state in which the connection of the right and left brake pedals 19 is cancelled to allow the independent operation of one of the right and left brake pedals 19. Accordingly, when the speed change step of the auxiliary transmission device 10 is set to the low-speed step or the high-speed step for working, by canceling in advance the connection between the right and left brake pedals 19 through the connection mechanism, it becomes possible to switch the state to the single braking traveling state or the braking turning state, which is useful during work traveling. When the speed change step of the auxiliary transmission device 10 is set to the fastest step for high-speed moving, by connecting in advance the right and left brake pedals 19 through the connection mechanism, the traveling state is prevented from being switched to the single braking traveling state or the braking turning state, which may otherwise be occurred by a failure of stepping on the brake pedal 19 during high-speed moving.

As shown in FIG. 5, the stop pedal 23 is linked to an unloading valve 45 provided in the main transmission device 9 through a mechanical linkage mechanism for stopping a traveling (not shown). The unloading valve 45 is provided on a return oil passage 46 connected to the first oil passage 33 in the main transmission device 9, and is configured in such a manner that, when the stop pedal 23 is not pressed to a predetermined press limit region, a cut-off state is retained in which oil is prevented from being discharged from the first oil passage 33, and in conjunction with a pressing operation of the stop pedal 23 to the predetermined press limit region, the state is switched to a communicating state in which the oil is allowed to be discharged from the first oil passage 33.

In other words, by performing the pressing operation of the stop pedal 23 to the predetermined press limit region, the oil can be discharged from the first oil passage 33 of the main transmission device 9 so as to cut off the transmission of a hydraulic pressure from the variable capacity pump 31 to the variable capacity motor 32, to thereby stop or prevent the traveling of the vehicle body.

As a result, when need arises to stop the vehicle body in the single braking traveling state or the braking turning state in which one of the right and left brake pedals 19 is pressed, by performing the pressing operation of the stop pedal 23 to the predetermined press limit region, the vehicle body can be rapidly stopped without an effort of switching of the right and left brake pedals 19 from a single pressing state to a dual pressing state.

As shown in FIGS. 1 and 4C, in the rear portion of the T/M case 4, there are provided: a pair of right and left lift arms 47 which allow lifting and lowering operations of a working device (not shown), such as rotary tilling device and agent sparging device, connected to a rear portion of the tractor; a pair of right and left lift cylinders 48 configured to swing-drive the respective lift arms 47; and the like. A single-acting type hydraulic cylinder is used for each of the right and left lift cylinders 48. When the working device, such as rotary tilling device configured to be actuated by power from the tractor, is connected to the rear portion of the tractor, power taken out from the PTO shaft 16 can be supplied to the working device through a removable external transmission device (not shown).

Referring to FIGS. 2 to 4C, the clutch 14 for working is switchable between an on-state in which non-changed power (non-changed rotational speed) from the main transmission device 9 is transmitted to the PTO shaft 16 through the transmission device 15 for working and an off-state in which the transmission is cut off, by an actuation of a clutch valve 49 formed of an electromagnetic control valve. The actuation of the clutch valve 49 is controlled by a control actuation of a working power control unit 27C provided as control program in the ECU 27. A multiplate type hydraulic clutch is used for the clutch 14 for working.

To the ECU 27 are input: an output of a PTO switch 50 for setting an on-off of the transmission to the PTO shaft 16; an output of an arm sensor 51 for detecting a swing angle of the lift arm 47 as a height of the working device; and the like, and the working power control unit 27C is configured to control the actuation of the clutch valve 49, in accordance with these outputs and the like.

Specifically, the working power control unit 27C is configured to detect an operation position of the PTO switch 50 based on the output of the PTO switch 50. When the operation position of the PTO switch 50 is an off-position, the actuation of the clutch valve 49 is controlled in such a manner that the clutch 14 for working is retained in the off-state. When the operation position of the PTO switch 50 is an on-position, the actuation of the clutch valve 49 is controlled in such a manner that the clutch 14 for working is retained in the on-state. When the operation position of the PTO switch 50 is an automatic position, the actuation of the clutch valve 49 is controlled based on the output of the arm sensor 51 for lift arm, in such a manner that the clutch 14 for working is retained in the off-state while the swing angle of the lift arm 47 stays at a set angle or in an upper side angle region above the set angle, and the clutch 14 for working is retained in the on-state while the swing angle of the lift arm 47 stays in a ground side angle region below the set angle.

In other words, in the case where the working device of a ground work type, such as rotary tilling device, configured to be actuated by power from the PTO shaft 16 is connected, by operating in advance the PTO switch 50 to the automatic position, the working device can be actuated in conjunction with the lowering operation of the working device that makes the swing angle of the lift arm 47 less than the set angle. In addition, an actuation of the working device can be stopped in conjunction with the lifting operation of the working device that makes the swing angle of the lift arm 47 equal to or above the set angle.

The PTO switch 50 is disposed on a right side of the driver's seat 6 in the boarding operation part 7 (see FIG. 2). For the PTO switch 50, a dial type multicontact switch is used which is 3-position-switchable and configured to resume the off-position by a downward pressing operation. A rotatable potentiometer is used for the arm sensor 51 for lift arm.

Though not shown, for the transmission device 15 for working, a gear type transmission device is used which is switchable between a normal rotation and a reverse rotation, and is capable of four-step speed change for the normal rotation. The transmission device 15 for working is linked to a shift lever 52 for working through a mechanical linkage mechanism for working speed change, in such a manner that an actuation state is switchable in accordance with an operation position of the shift lever 52 for working (see FIG. 2) provided on the right side of the driver's seat 6 in the boarding operation part 7. The shift lever 52 for working is of a combined swingable type in which a swinging operation can be made in the front-rear directions and right-left directions, and is capable of retaining its position.

Referring to FIGS. 4A, 4B and 4C, actuations of the right and left lift cylinders 48 is controlled by an actuation of a lifting valve 53 formed of an electromagnetic control valve. The actuation of the lifting valve 53 is controlled by a control actuation of a lifting-lowering control unit 27D provided as control program in the ECU 27.

To the ECU 27 are input: an output of a lever sensor 55 for detecting an operation position of a height setting lever 54 as control target height of the working device; an output of a lever sensor 57 for detecting an operation of a lifting command lever 56 from a neutral position to a lifting position or lowering position; an output of an upper limit setter 58 for outputting a turning operation amount from a standard position as a control target upper limit position of the working device; and the like. The lifting-lowering control unit 27D is configured to perform, based on these outputs and the like: a height control for positioning the working device at a desired height position; a lifting control, in priority to the height control, for lifting the working device to a set upper limit position; and the like.

In the height control, based on the output of the lever sensor 55 for height setting lever and the output of the arm sensor 51 for lift arm, the actuation of the lifting valve 53 is controlled in such a manner that the swing angle of the lift arm 47 corresponds to the operation position of the height setting lever 54.

The lifting control is performed in priority to the height control, when the lever sensor 57 detects the operation of the lifting command lever 56 to the lifting position. In the lifting control, based on the output of the upper limit setter 58 and the output of the arm sensor 51 for lift arm, the actuation of the lifting valve 53 is controlled in such a manner that the swing angle of the lift arm 47 corresponds to the turning operation amount from the standard position of the upper limit setter 58. When the lever sensor 57 detects the operation of the lifting command lever 56 to the lowering position, the priority given to the lifting control is cancelled and the height control is performed.

In other words, by an operation of the height setting lever 54, the height of the working device can be altered to a desired height in accordance with the operation position of the height setting lever 54. In addition, by a swinging operation of the lifting command lever 56 to the lifting position, the height of the working device can be altered to the upper limit position set by the upper limit setter 58. By the swinging operation of the lifting command lever 56 to the lowering position, the height of the working device can be returned to the desired height in accordance with the operation position of the height setting lever 54.

As shown in FIGS. 1 and 2, the height setting lever 54 is provided on the right side of the driver's seat 6 in the boarding operation part 7, and is swingable in the front-rear direction and capable of retaining the position. The lifting command lever 56 is disposed on the lower right side of the steering wheel 5 in the boarding operation part 7, and is vertically swingable and capable of returning to the neutral position. The upper limit setter 58 is provided on the right side of the driver's seat 6 in the boarding operation part 7, and is configured as a dial operation type. A rotatable potentiometer is used for each of the lever sensor 55 for height setting lever and the upper limit setter 58. A switch is used for the lever sensor 57 for lifting command lever.

Meanwhile, with respect to the HST 9 forming the main transmission device 9, it has been known that as a load becomes large, a loss of a hydraulic pressure due to oil leakage becomes large, leading to a reduction in power transmission efficiency. For example, a swash plate angle sensor may be provided for detecting the operation angle of the pump swash plate 31B in the main transmission device 9, and the vehicle speed control unit 27B may be configured to perform a swash plate feedback control in which an actuation of the pump swash plate operation unit A is controlled in such a manner that an output of the swash plate angle sensor matches a control target operation angle which is set based on an operation position of the main shift lever 20 (an operation angle of the swash plate angle sensor falls on a dead band of the control target operation angle). In this case, the operation angle of the pump swash plate 31B can be matched with the control target operation angle by the swash plate feedback control, but a fluctuation of the power transmission efficiency in the main transmission device 9 caused by load fluctuation cannot be compensated. As a result, the fluctuation of the power transmission efficiency hinders stability of the change gear ratio of the main transmission device 9, and it becomes difficult to accurately retain a relationship in which the vehicle speed is proportional to the engine rotational speed.

Accordingly, in the case where work, such as rotary tillage work, is performed in which the vehicle speed and an actuation speed of the working device are desired to be accurately retained in a relationship in which they are proportional to the engine rotational speed, since the relationship cannot be retained with high accuracy, a difference is likely to occur between an appropriate vehicle speed for the actuation speed of the working device and the vehicle speed, leading to an unevenness in a working trail of the working device, and thus it becomes difficult to make the working trail of the working device uniform with high accuracy.

Therefore, in a vehicle speed control in which the vehicle speed of the tractor is controlled, the vehicle speed control unit 27B is configured to perform a vehicle speed feedback control in which the actuation of the change gear ratio altering unit C is controlled in such a manner that the vehicle speed matches a control target vehicle speed which is set based on the operation position of the main shift lever 20 or the like (the vehicle speed falls on a dead band of the control target vehicle speed).

Specifically stating the configuration, referring to FIGS. 3, 4A, 4B, 4C and 6, to the ECU 27 are input: an output of a lever sensor 59 as operation position detector for detecting the operation position of the main shift lever 20; an output of a lever sensor 60 for detecting an operation position of the auxiliary shift lever 21; an output of a lever sensor 61 for detecting an operation position of the FR lever 22; an output of an engine sensor (engine rotational speed detector) 62 for detecting the engine rotational speed; an output of a vehicle speed sensor (vehicle speed detector) 63 for detecting an output rotational speed of the main transmission device 9 as vehicle speed upon control; an output of a pedal sensor 64 for detecting accession of the stop pedal 23 to the predetermined press limit region; and an output of a pedal sensor 65 for detecting a dual pressing operation amount of the right and left brake pedals 19 from the press canceling position. In addition, the ECU 27 is provided with vehicle speed setting data showing a relationship among the engine rotational speed, the change gear ratio of the main transmission device 9, and the vehicle speed (the output rotational speed of the main transmission device 9).

A rotatable potentiometer is used for each of the lever sensor 59 for main shift lever and the pedal sensor 65 for brake pedal. A switch is used for each of the lever sensor 60 for auxiliary shift lever, the lever sensor 61 for FR lever, and the pedal sensor 64 for stop pedal. An electromagnetically pick up type rotation sensor is used for each of the engine sensor 62 and the vehicle speed sensor 63. Map data, relational expression or the like is used for the vehicle speed setting data.

In the vehicle speed feedback control, first the control target vehicle speed (control target rotational speed) for an output of the vehicle speed sensor 63 is read out which is determined by a vehicle speed setting control based on: the change gear ratio of the main transmission device 9 (hereinbelow, referred to as "set change gear ratio") set by the main shift lever 20 from the output of the lever sensor 59 for main shift lever; the speed change step of the auxiliary transmission device 10 (hereinbelow, referred to as "set speed change step") set by the auxiliary shift lever 21 from the output of the lever sensor 60 for auxiliary shift lever; the output of the engine sensor 62; and the vehicle speed setting data (step #601), and whether the control target vehicle speed is for forward traveling or for reverse traveling from the output of the lever sensor 61 for FR lever is determined (step #602). Next, the output of the vehicle speed sensor 63 is read (step #603), and the control target vehicle speed for forward traveling or for reverse traveling is compared with the output of the vehicle speed sensor 63 (steps #604, #605). When the output of the vehicle speed sensor 63 matches the control target vehicle speed for forward traveling or for reverse traveling (the vehicle speed upon control which is output by the vehicle speed sensor 63 falls on the dead band of the control target vehicle speed for forward traveling or for reverse traveling), a constant-speed control is performed which controls an electrical continuity to the variable speed valve 38 for forward traveling or the variable speed valve 39 for reverse traveling and the speed change operation valve 43 so as to retain the current vehicle speed (step #606). When the output of the vehicle speed sensor 63 is smaller than the control target vehicle speed for forward traveling or for reverse traveling, an acceleration control is performed which controls the electrical continuity to the variable speed valve 38 for forward traveling or the variable speed valve 39 for reverse traveling and the speed change operation valve 43 to accelerate the vehicle speed, so that the output of the vehicle speed sensor 63 matches the control target vehicle speed for forward traveling or for reverse traveling (step #607). When the output of the vehicle speed sensor 63 is larger than the control target vehicle speed for forward traveling or for reverse traveling, a deceleration control is performed which controls the electrical continuity to the variable speed valve 38 for forward traveling or the variable speed valve 39 for reverse traveling and the speed change operation valve 43 to decelerate the vehicle speed, so that the output of the vehicle speed sensor 63 matches the control target vehicle speed for forward traveling or for reverse traveling (step #608).

With this configuration, solely the fluctuation of the power transmission efficiency in the main transmission device (HST) 9, which is caused by the loss of the hydraulic pressure that fluctuates along with the increase/decrease of the load, can be compensated by the control actuation of the vehicle speed control unit 27B, and thus the speed change by the main transmission device 9 can be performed with high accuracy. As a result, in the case where the work, such as rotary tillage work, is performed in which the vehicle speed and the actuation speed of the working device are desired to be accurately retained in a relationship in which they are proportional to the engine rotational speed, the relationship can be retained with high accuracy regardless of the fluctuation of the power transmission efficiency in the main transmission device 9, and a difference is unlikely to occur between the appropriate speed for the actuation speed of the working device and the vehicle speed. Thus the working trail of the working device can be made uniform with high accuracy.

As shown in FIGS. 4A, 4B, 4C and 7, the vehicle speed control unit 27B is configured to perform a forward-reverse switching control based on an operation of the FR lever 22, when the operation of the FR lever 22 is detected from the output of the lever sensor 61 for FR lever.

Figure 7:
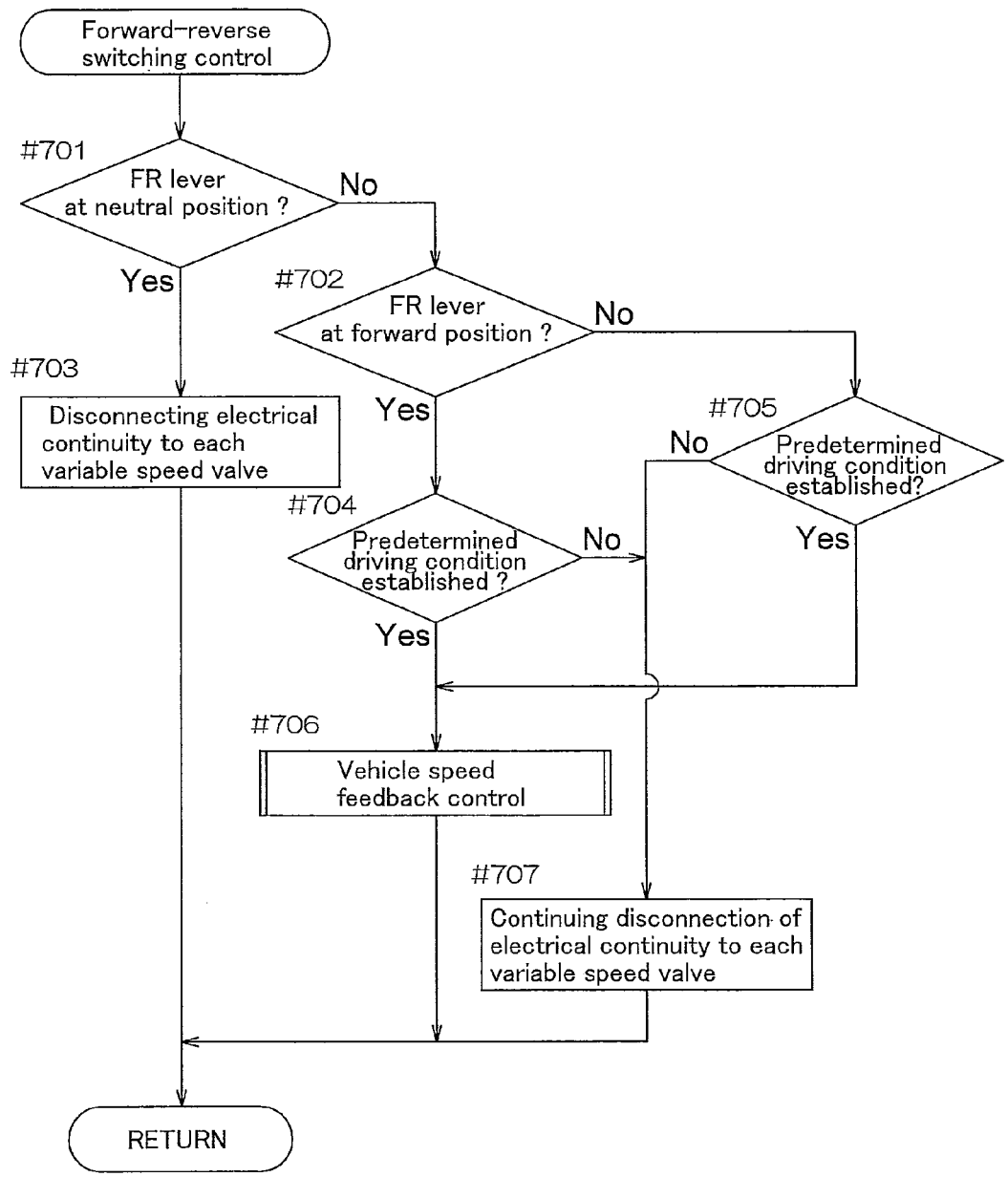
FIG. 7 is a flow chart of forward-reverse switching control.

Hereinbelow, the forward-reverse switching control will be described with reference to the flow chart of FIG. 7. When the operation of the FR lever 22 is detected from the output of the lever sensor 61 for FR lever, the operation position of the FR lever 22 after the operation is also detected (steps #701, #702). When the operation position of the FR lever 22 after the operation is the neutral position, the electrical continuity to the variable speed valve 38 for forward traveling and the variable speed valve 39 for reverse traveling is disconnected (step #703). Accordingly, the operation angle of the pump swash plate 31B can be zeroed to thereby make the main transmission device 9 neutral, and regardless of the control target vehicle speed determined by the vehicle speed setting control, the output of the vehicle speed sensor 63 can be zeroed. When the operation position of the FR lever 22 after the operation is the forward position or the reverse position, it is determined whether or not a predetermined driving condition is established by this operation to the forward position or the reverse position (steps #704, #705). When the predetermined driving condition is established, the process advances to the vehicle speed feedback control (step #706). When the predetermined driving condition is not established, the disconnection of the electrical continuity to the variable speed valve 38 for forward traveling and the variable speed valve 39 for reverse traveling is continued (step #707).

It should be noted that, a state in which "the predetermined driving condition is established" means a state in which the lever sensor 61 for FR lever detects that the operation position of the FR lever 22 is the forward position or the reverse position, the pedal sensor 64 for stop pedal does not detect the accession of the stop pedal 23 to the predetermined press limit region, and the pedal sensor 65 for brake pedal detects that both pressing operation positions of the right and left brake pedals 19 are within a braking canceling region.

As shown in FIGS. 4A, 4B, 4C and 8, the vehicle speed control unit 27B is configured to perform a start-stop control based on the operation of the stop pedal 23, when the operation of the stop pedal 23 is detected from the output of the pedal sensor 64 for stop pedal.

Figure 8:
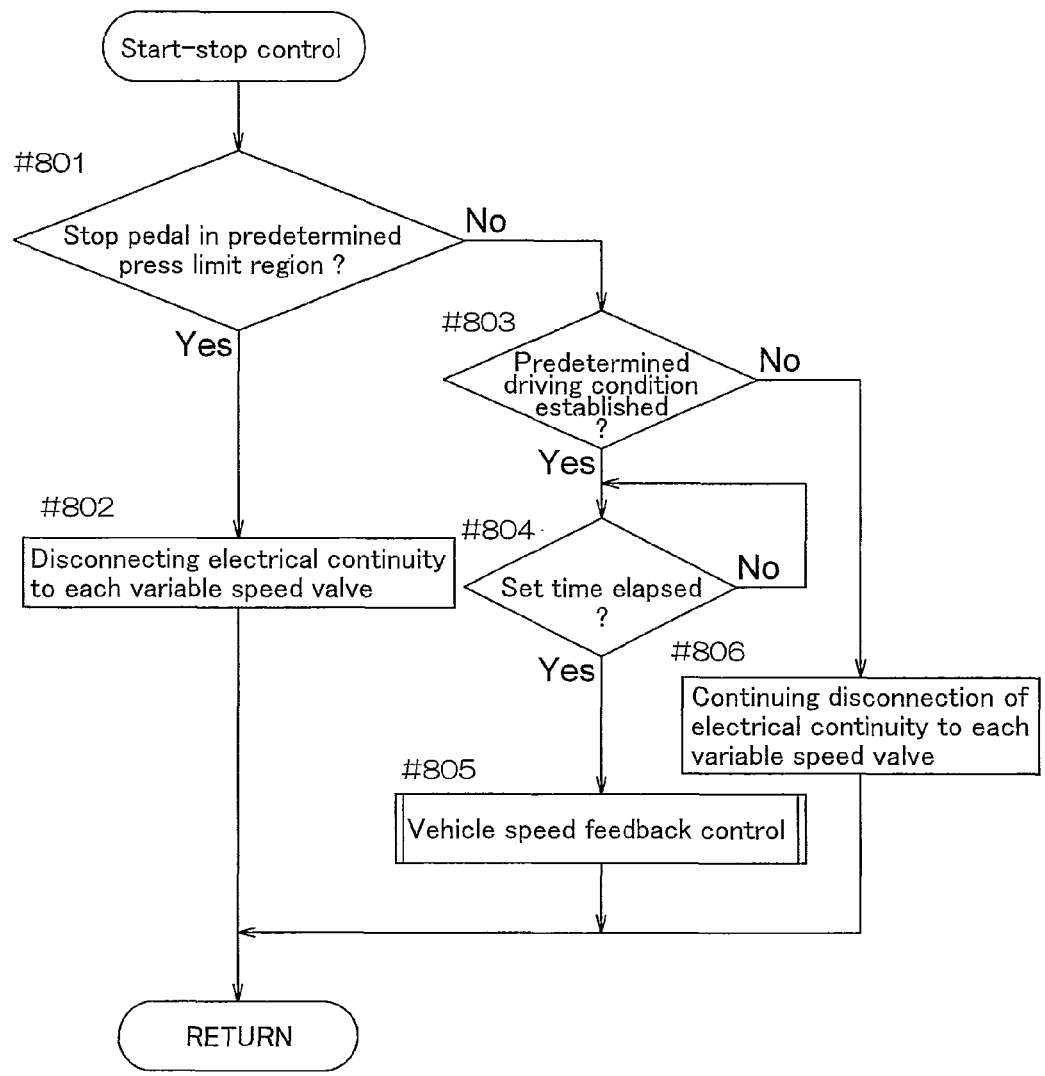
FIG. 8 is a flow chart of start-stop control.

Hereinbelow, the start-stop control will be described with reference to the flow chart of FIG. 8. When the operation of the stop pedal 23 is detected from the output of the pedal sensor 64 for stop pedal, the operation position of the stop pedal 23 after the operation is also detected (step #801). When the operation position of the stop pedal 23 after the operation is within the predetermined press limit region, the electrical continuity to the variable speed valve 38 for forward traveling and the variable speed valve 39 for reverse traveling is disconnected (step #802). Accordingly, the operation angle of the pump swash plate 31B can be zeroed to thereby make the main transmission device 9 neutral, and regardless of the control target vehicle speed determined by the vehicle speed setting control, the output of the vehicle speed sensor 63 can be zeroed. When the operation position of the stop pedal 23 after the operation is outside the press limit region, it is determined whether or not the predetermined driving condition is established by this operation (step #803). When the predetermined driving condition is established, it is determined whether or not a set time has elapsed which is required for the unloading valve 45 to switch from the communicating state to a cut-off state in conjunction with the operation of the stop pedal 23 to outside the press limit region, and for a circuit pressure of the main transmission device 9 to reach a set value (step #804). After the set time has elapsed, the process advances to the vehicle speed feedback control (step #805). In the step #803, when the predetermined driving condition is not established, the disconnection of the electrical continuity to the variable speed valve 38 for forward traveling and the variable speed valve 39 for reverse traveling is continued (step #806).

It should be noted that, in this start-stop control, the state in which "the predetermined driving condition is established" is the same state as described for the forward-reverse switching control, in which the predetermined driving condition is established.

As shown in FIGS. 4A, 4B, 4C and 9, the vehicle speed control unit 27B is configured to perform a braking start-stop control based on the dual pressing operation of the right and left brake pedals 19, when the dual pressing operation of the right and left brake pedals 19 is detected from the output of the pedal sensor 65 for brake pedal.

Figure 9:
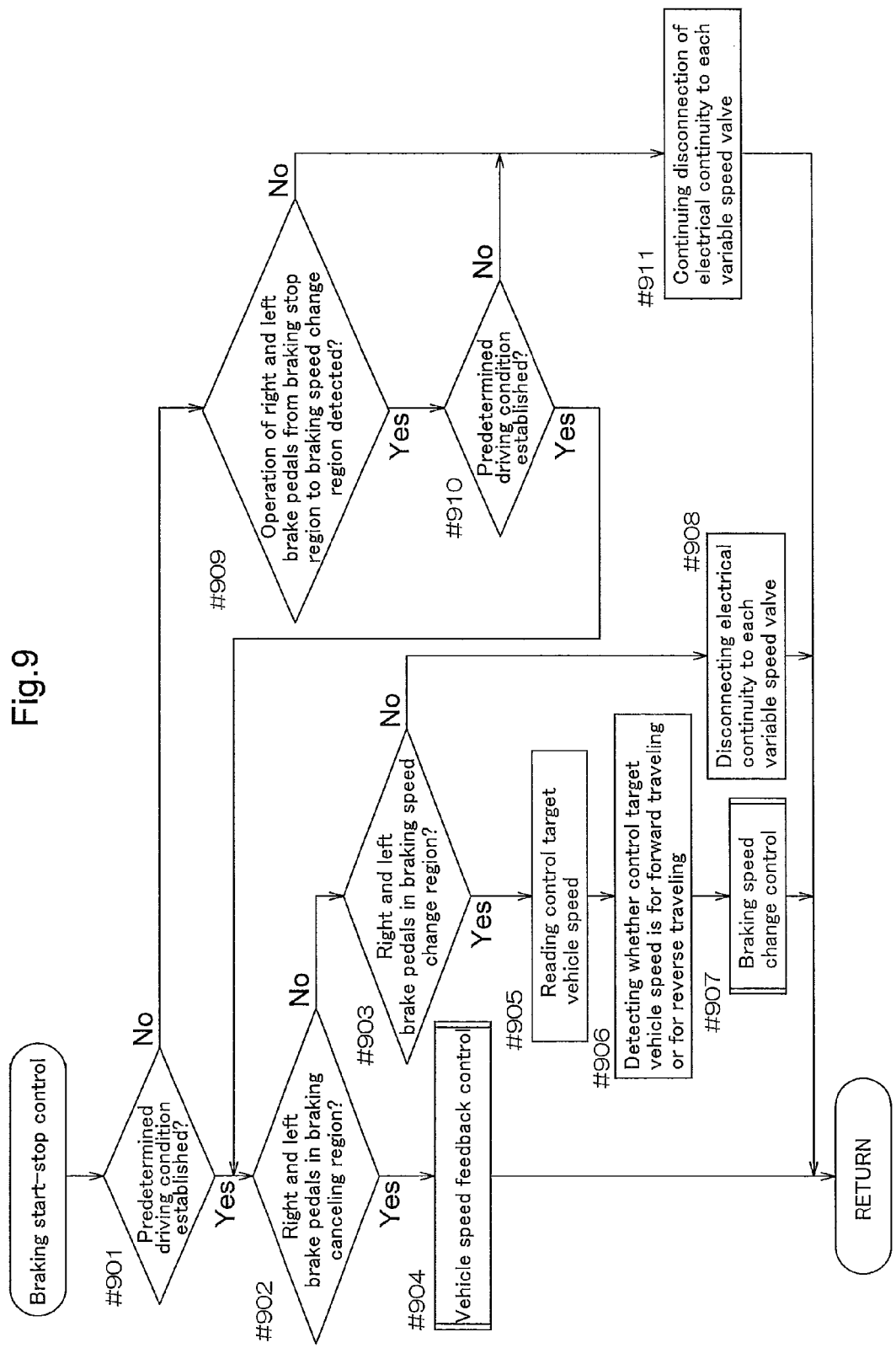
FIG. 9 is a flow chart of braking start-stop control.

Hereinbelow, the braking start-stop control will be described with reference to the flow chart of FIG. 9. When the dual pressing operation of the right and left brake pedals 19 is detected from the output of the pedal sensor 65 for brake pedal, it is determined whether or not the predetermined driving condition is established (step #901). When the predetermined driving condition is established, a dual pressing operation position of the right and left brake pedals 19 is detected from the output of the pedal sensor 65 for brake pedal (steps #902, #903). When the dual pressing operation position of the right and left brake pedals 19 is in the braking canceling region, the vehicle speed feedback control is continued (step #904). When the dual pressing operation position of the right and left brake pedals 19 is in a braking speed change region which is continuous to the braking canceling region, the control target vehicle speed determined by the vehicle speed setting control is read (step #905), and it is detected whether the control target vehicle speed is for forward traveling or for reverse traveling from the output of the lever sensor 61 for FR lever (step #906). In this case, a braking speed change control is performed in which the electrical continuity to the variable speed valve 38 for forward traveling or the variable speed valve 39 for reverse traveling is controlled to alter the operation angle of the pump swash plate 31B so that, as the dual pressing operation amount of the right and left brake pedals 19 in the braking speed change region becomes large, the output of the vehicle speed sensor 63 approaches zero from the control target vehicle speed for forward traveling or for reverse traveling (step #907). When the dual pressing operation position of the right and left brake pedals 19 is in a braking stop region which is continuous to the braking speed change region, the electrical continuity to the variable speed valve 38 for forward traveling and the variable speed valve 39 for reverse traveling is disconnected (step #908). Accordingly, the operation angle of the pump swash plate 31B can be zeroed to thereby make the main transmission device 9 neutral, and regardless of the control target vehicle speed determined by the vehicle speed setting control, the output of the vehicle speed sensor 63 can be zeroed. When the predetermined driving condition is not established in the step #901, it is determined whether or not the dual pressing operation of the right and left brake pedals 19 from the braking stop region to the braking speed change region is detected (step #909). When the dual pressing operation of the right and left brake pedals 19 from the braking stop region to the braking speed change region is detected, it is determined whether or not the predetermined driving condition is established by this operation (step #910). When the predetermined driving condition is established, the process advances to the step #902. Accordingly, when the dual pressing operation position of the right and left brake pedals 19 is in the braking speed change region, the braking speed change control is performed, and as the right and left brake pedals 19 return to the braking canceling region, the vehicle speed feedback control is performed. When the dual pressing operation of the right and left brake pedals 19 from the braking stop region to the braking speed change region is not detected in the step #909, and when the predetermined driving condition is not established in the step #910, the disconnection of the electrical continuity to the variable speed valve 38 for forward traveling and the variable speed valve 39 for reverse traveling is continued (step #911).

It should be noted that, in this braking start-stop control, the state in which "the predetermined driving condition is established" is the same state as described for the forward-reverse switching control and the start-stop control, in which the predetermined driving condition is established.

Though not shown, the working power control unit 27C is configured in such a manner that, when the operation of the stop pedal 23 to the predetermined press limit region is detected based on the output of the pedal sensor 64 for stop pedal, the working power control unit 27C determines a state of the clutch 14 for working based on the operation position of the PTO switch 50, the output of the arm sensor 51 for lift arm and the like. When the clutch 14 for working is in the off-state, this state is retained, and when the clutch 14 for working is in the on-state, the clutch 14 for working is switched to the off-state after a set time has elapsed since the detection of the operation of the stop pedal 23 to the predetermined press limit region, so that the actuation of the working device is stopped after the traveling of the vehicle body is stopped, for example by switching of the unloading valve 45 to the communicating state based on the pressing operation of the stop pedal 23.

In addition, when the operation of the stop pedal 23 to the press limit region is not detected and at the same time the establishment of the predetermined driving condition is detected, it is determined whether or not a condition required for switching the clutch 14 for working from the off-state to the on-state (hereinbelow, referred to as "work initiation condition") is established, based on the operation position of the PTO switch 50, the output of the arm sensor 51 for lift arm and the like. When the work initiation condition is established, the clutch 14 for working is switched to the on-state, and when the work initiation condition is not established, the clutch 14 for working is retained in the off-state.

The working power control unit 27C is configured in such a manner that, when a movement of the right and left brake pedals 19 to a work stop region set on a press limit side of the braking stop region is detected based on the output of the pedal sensor 65 for brake pedal, the working power control unit 27C determines the state of the clutch 14 for working based on the operation position of the PTO switch 50, the output of the arm sensor 51 for lift arm and the like. When the clutch 14 for working is in the off-state, this state is retained, and when the clutch 14 for working is in the on-state, the clutch 14 for working is switched to the off-state.

When the movement of the right and left brake pedals 19 from the work stop region to the braking stop region outside the work stop region is detected, it is determined whether or not the state allows the predetermined driving condition to be established by a subsequent movement of the right and left brake pedals 19 to the braking canceling region. When the state allows the predetermined driving condition to be established, it is determined whether or not the work initiation condition is established. When the work initiation condition is established, the clutch 14 for working is switched to the on-state, and when the work initiation condition is not established, the clutch 14 for working is retained in the off-state.

Due to the control actuations of the vehicle speed control unit 27B and the working power control unit 27C described above, while configured as clutchless type with no main clutch, the transmission to the right and left front wheels 1 as drive wheels and the right and left rear wheels 2, as well as the transmission to the PTO shaft 16, can be connected and disconnected, by performing the pressing operation of the stop pedal 23 or the dual pressing operation of the right and left brake pedals 19. When the traveling of the vehicle body and the actuation of the working device are controlled by the pressing operation of the stop pedal 23 or the dual pressing operation of the right and left brake pedals 19, the actuation of the working device is stopped after the traveling of the vehicle body is stopped, and the traveling of the vehicle body is started after the actuation of the working device is initiated. With this configuration, appropriate work can be surely performed at a stop position and a start position of the vehicle body, and especially when a rotary tilling device is implemented as the working device, the unplowed remains at the stop position and the start position of the vehicle body can be prevented from being generated.

Though not shown, the pedal sensor 65 for brake pedal is linked to the right and left brake pedals 19 through a mechanical linkage mechanism (not shown) for detecting the dual pressing operation amount. The mechanical linkage mechanism for detecting the dual pressing operation amount is provided with a moving member biased by a spring so as to be displaced in a pedal pressing direction in conjunction with the dual pressing operation of the right and left brake pedals 19. The mechanical linkage mechanism is configured in such a manner that, when a single pressing operation is performed on one of the right and left brake pedals 19, a displacement of the moving member to follow said one of the brake pedals 19 is prevented by bringing the moving member into contact with the other of the brake pedals 19, and that only when the dual pressing operation of the right and left brake pedals 19 is performed, the moving member is allowed to be displaced to follow the right and left brake pedals 19, and the dual pressing operation amount of the right and left brake pedals 19 at that moment is transmitted to the pedal sensor 65 for brake pedal.

Figure 10:
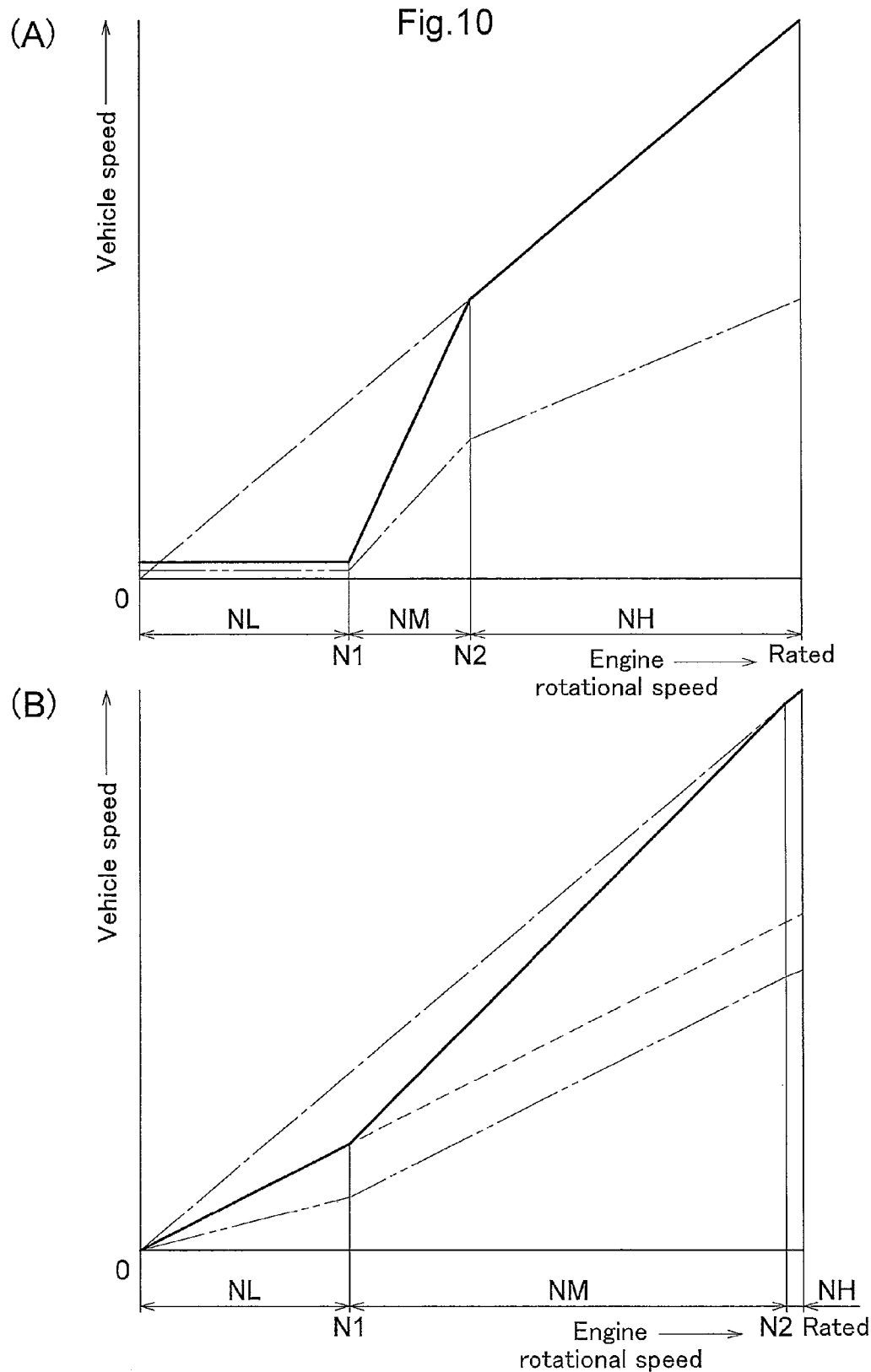
FIG. 10 shows graphs of relationship among engine rotational speed, change gear ratio of the main transmission device and vehicle speed.

As shown in FIG. 10, there are two types of the vehicle speed setting data stored in the ECU 27: the first vehicle speed setting data for work traveling (see FIG. 10 (A)) and the second vehicle speed setting data for high-speed moving (see FIG. 10 (B)). In each vehicle speed setting data, a relationship among the engine rotational speed, the change gear ratio of the main transmission device 9 and the vehicle speed (the output of the vehicle speed sensor 63) is set, using the fastest change gear ratio of the main transmission device 9 corresponding to a fastest position of the main shift lever 20 as criterion.

Each type of vehicle speed setting data will be described in detail below. Basically, both the first and second vehicle speed setting data are set in the following manner. When the engine rotational speed is a first set rotational speed N1 which is set to the idling rotational speed, it is set in such a manner that the change gear ratio of the main transmission device 9 becomes a first change gear ratio which is a large change gear ratio on a low-speed side, and the vehicle speed becomes a low speed which has been set in advance. When the engine rotational speed is in a high rotational speed region NH which is equal to or above a second set rotational speed N2 and is set on a high-speed side relative to the first set rotational speed N1, it is set in such a manner that the change gear ratio of the main transmission device 9 is retained at the fastest change gear ratio, and the vehicle speed becomes proportional to the engine rotational speed. When the engine rotational speed is in a medium rotational speed region NM between the first set rotational speed N1 and the second set rotational speed N2, it is set in such a manner that, as the engine rotational speed at that moment becomes low, the change gear ratio of the main transmission device 9 is altered to larger change gear ratio on the low-speed side between the first change gear ratio and the fastest change gear ratio, and the vehicle speed becomes proportional to the engine rotational speed and the change gear ratio of the main transmission device 9 (the rate of change of the vehicle speed becomes constant and larger than the rate of change in the high rotational speed region NH). When the engine rotational speed is in a low rotational speed region NL which is below the first set rotational speed N1, it is set in such a manner that the change gear ratio of the main transmission device 9 is altered in accordance with the engine rotational speed so that the main transmission device 9 does not become neutral and the vehicle speed does not become zero (the rate of change of the vehicle speed becomes constant and smaller than the rate of change in the high rotational speed region NH), as long as the engine rotational speed is larger than zero.

Specifically, in the first vehicle speed setting data, the first set rotational speed N1 is set to the idling rotational speed as described above, and the second set rotational speed N2 is set to a rotational speed at which the engine 3 exerts the maximum torque. A relationship among the engine rotational speed, the change gear ratio of the main transmission device 9 and the vehicle speed is set in the following manner. In the high rotational speed region NH, the relationship is set in which the vehicle speed is proportional to the engine rotational speed so that the vehicle speed corresponds to the engine rotational speed at the fastest change gear ratio of the main transmission device 9. In the medium rotational speed region NM, the relationship is set in which the vehicle speed is proportional to the engine rotational speed and to the change gear ratio of the main transmission device 9 so that, when the engine rotational speed reaches the first set rotational speed (idling rotational speed) N1, the vehicle speed becomes a very low set speed, and when the engine rotational speed reaches the second set rotational speed N2 at which the maximum torque is exerted, the vehicle speed corresponds to the engine rotational speed at the fastest change gear ratio of the main transmission device 9. In the low rotational speed region NL, the relationship is set in which the vehicle speed corresponds to the engine rotational speed at the change gear ratio of the main transmission device 9 which is inversely proportional to the engine rotational speed so that the vehicle speed becomes constant at a very low set speed (see FIG. 10 (A)).

On the other hand, in the second vehicle speed setting data, the first set rotational speed N1 is set to the idling rotational speed as described above, and the second set rotational speed N2 is set to a rotational speed slightly smaller than the rated rotational speed of the engine 3. The relationship among the engine rotational speed, the change gear ratio of the main transmission device 9 and the vehicle speed is set in the following manner. In the high rotational speed region NH, the relationship is set in which the vehicle speed is proportional to the engine rotational speed so that the vehicle speed corresponds to the engine rotational speed at the fastest change gear ratio of the main transmission device 9. In the medium rotational speed region NM, the relationship is set in which the vehicle speed is proportional to the engine rotational speed and to the change gear ratio of the main transmission device 9 so that, when the engine rotational speed reaches the first set rotational speed (idling rotational speed) N1, the vehicle speed becomes a low set speed, and when the engine rotational speed reaches the second set rotational speed N2 which is close to and slightly smaller than the rated rotational speed, the vehicle speed corresponds to the engine rotational speed at the fastest change gear ratio of the main transmission device 9. In the low rotational speed region NL, the relationship is set in which the vehicle speed corresponds to the engine rotational speed at the change gear ratio of the main transmission device 9 which is proportional to the engine rotational speed so that, when the engine rotational speed reaches the first set rotational speed (idling rotational speed) N1, the vehicle speed becomes a low set speed, and when the engine rotational speed is zero, the main transmission device 9 becomes neutral and the vehicle speed becomes zero (see FIG. 10 (B)).

It should be noted that a dashed-dotted line shown in FIG. 10 shows an imaginary condition in which the change gear ratio of the main transmission device 9 is retained as the fastest change gear ratio in the low rotational speed region NL and the medium rotational speed region NM.

In addition, a broken line shown in FIG. 10 (B) shows an imaginary change gear ratio of the main transmission device 9 which is obtained when the operation angle of the pump swash plate 31B of the variable capacity pump 31 is altered from zero to an operation limitation angle in proportion to the engine rotational speed which is changed from zero to the rated rotational speed, while the variable capacity motor 32 is retained at the low-speed step. In other words, the change gear ratio of the main transmission device 9 in the low rotational speed region NL of the second vehicle speed setting data is a change gear ratio obtained in the low rotational speed region NL, by altering the operation angle of the pump swash plate 31B of the variable capacity pump 31 in proportion to the engine rotational speed while the variable capacity motor 32 is set to the low-speed step.

The vehicle speed control unit 27B is configured to change the vehicle speed setting data to be adopted, based on the output of the lever sensor 60 for auxiliary shift lever functioning as speed change step detector for detecting the speed change step of the auxiliary transmission device (stepped transmission device) 10. Specifically, when the speed change step of the auxiliary transmission device 10 which is read out based on the output of the lever sensor 60 for auxiliary shift lever is the low-speed step for low-speed working or the high-speed step for high-speed working, the vehicle speed control unit 27B adopts the first vehicle speed setting data, and when the fastest step for high-speed moving, adopts the second vehicle speed setting data.

It should be noted that a medium-speed set region of the main shift lever 20 is a region in which the main shift lever 20 can set the change gear ratio of the main transmission device 9 that can be attained by switching a speed change step of the variable capacity motor 32 to either the low-speed step or the high-speed step. It should also be noted that the speed that can be attained at the low-speed step of the variable capacity motor 32 is defined as a speed obtained based on: a change gear ratio obtained by, while the speed change step of the variable capacity motor 32 is set to the low-speed step, altering the operation angle of the pump swash plate 31B of the variable capacity pump 31 from zero to the operation limitation angle; and the engine rotational speed from the second vehicle speed setting data, corresponding to this change gear ratio. A limit value of this speed is defined as a speed obtained based on: the fastest change gear ratio at the low-speed step obtained by, while the speed change step of the variable capacity motor 32 is set to the low-speed step, altering the operation angle of the pump swash plate 31B of the variable capacity pump 31 to the operation limitation angle; and the engine rotational speed from the second vehicle speed setting data, corresponding to this fastest change gear ratio.

The ECU 27 is provided with a gain for correcting each vehicle speed setting data which is set using the fastest change gear ratio of the main transmission device 9 as criterion, to the vehicle speed setting data for which a set change gear ratio corresponding to the operation position of the main shift lever 20 arbitrarily set is used as criterion.

The vehicle speed control unit 27B is configured to read out a gain corresponding to the operation position of the main shift lever 20 from the output of the lever sensor 59 for main shift lever, to multiply the adopted vehicle speed setting data by the gain read out, and to automatically correct the adopted vehicle speed setting data to an appropriate one for which the set change gear ratio corresponding to the operation position of the main shift lever 20 is used as criterion.

For example, when the operation position of the main shift lever 20 is positioned halfway (50%) to the fastest position of the main shift lever 20, the adopted vehicle speed setting data is multiplied by 0.5, to thereby automatically correct the adopted vehicle speed setting data to an appropriate one for which, throughout its range, a change gear ratio which is half (50%) of the fastest change gear ratio of the main transmission device 9 is used as criterion (data with which a relationship depicted with an imaginary line (dashed-two dotted line) in FIG. 10 is obtained). For example, when the operation position of the main shift lever 20 is the fastest position, the adopted vehicle speed setting data is multiplied by 1.0, to thereby automatically correct the adopted vehicle speed setting data to an appropriate one for which, throughout its range, the fastest change gear ratio of the main transmission device 9 is used as criterion (data with which a relationship depicted with a solid line in FIG. 10 is obtained).

Accordingly, as shown in FIG. 10 (A), in the corrected first vehicle speed setting data, the relationship among the engine rotational speed, the change gear ratio of the main transmission device 9 and the vehicle speed becomes as follows. In the high rotational speed region NH, the relationship is obtained in which the vehicle speed is proportional to the engine rotational speed so that the vehicle speed corresponds to the engine rotational speed at the corrected fastest change gear ratio (set change gear ratio) of the main transmission device 9 corresponding to the operation position of the main shift lever 20. In the medium rotational speed region NM, the relationship is obtained in which the vehicle speed is proportional to the engine rotational speed and to the change gear ratio of the main transmission device 9 so that, when the engine rotational speed reaches the first set rotational speed (idling rotational speed) N1, the vehicle speed becomes the corrected very low set speed based on the operation position of the main shift lever 20, and when the engine rotational speed reaches the second set rotational speed N2 at which the maximum torque is exerted, the vehicle speed corresponds to the engine rotational speed at the corrected fastest change gear ratio of the main transmission device 9 described above. In the low rotational speed region NL, the relationship is obtained in which the vehicle speed corresponds to the engine rotational speed at the change gear ratio of the main transmission device 9 which is inversely proportional to the engine rotational speed so that the vehicle speed becomes constant at the corrected very low set speed described above.

On the other hand, as shown in FIG. 10 (B), in the corrected second vehicle speed setting data, the relationship among the engine rotational speed, the change gear ratio of the main transmission device 9 and the vehicle speed becomes as follows. In the high rotational speed region NH, the relationship is obtained in which the vehicle speed is proportional to the engine rotational speed so that the vehicle speed corresponds to the engine rotational speed at the corrected fastest change gear ratio (set change gear ratio) of the main transmission device 9 corresponding to the operation position of the main shift lever 20. In the medium rotational speed region NM, the relationship is obtained in which the vehicle speed is proportional to the engine rotational speed and to the change gear ratio of the main transmission device 9 so that, when the engine rotational speed reaches the first set rotational speed (idling rotational speed) N1, the vehicle speed becomes the corrected low set speed based on the operation position of the main shift lever 20, and when the engine rotational speed reaches the second set rotational speed N2 which is slightly smaller than the rated rotational speed, the vehicle speed corresponds to the engine rotational speed at the corrected fastest change gear ratio of the main transmission device 9 described above. In the low rotational speed region NL, the relationship is obtained in which the vehicle speed corresponds to the engine rotational speed at the change gear ratio of the main transmission device 9 which is proportional to the engine rotational speed so that, when the engine rotational speed reaches the first set rotational speed (idling rotational speed) N1, the vehicle speed becomes the corrected low set speed described above, and when the engine rotational speed is zero, the main transmission device 9 becomes neutral and the vehicle speed becomes zero.

Then, the control target vehicle speed is set based on the corrected vehicle speed setting data and the output of the engine sensor 62, so that the relationship among the engine rotational speed, the change gear ratio of the main transmission device 9, and the vehicle speed is established with the corrected vehicle speed setting data.

Figure 11:
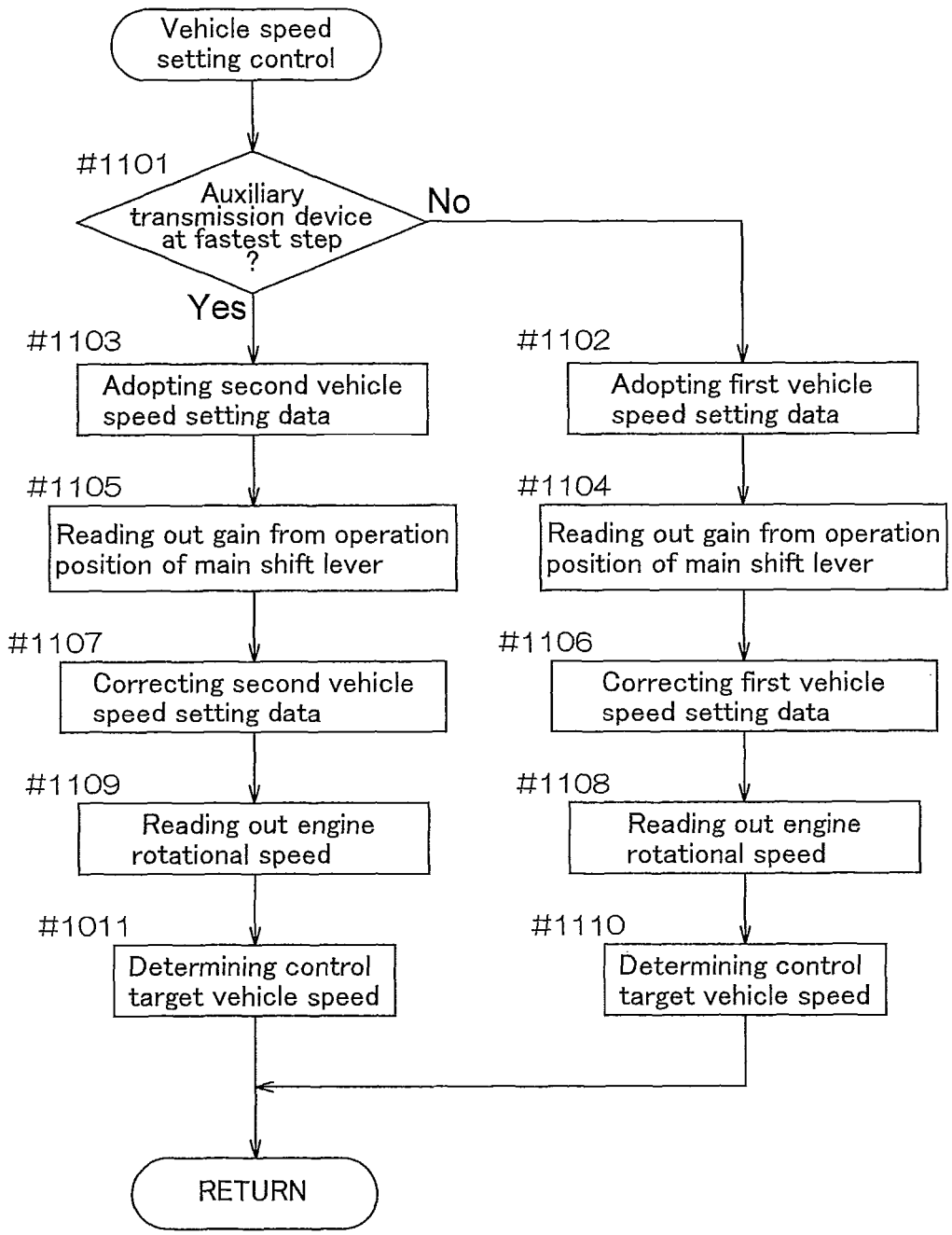
FIG. 11 is a flow chart of vehicle speed setting control.

Hereinbelow, the vehicle speed setting control will be described with reference to the flow chart of FIG. 11. The speed change step of the auxiliary transmission device 10 is detected from the output of the lever sensor 60 for auxiliary shift lever (step #1101). When the speed change step is the low-speed step for low-speed working or the high-speed step for high-speed working, the first vehicle speed setting data for work traveling is adopted as the vehicle speed setting data (step #1102), and when the speed change step is the fastest step for high-speed moving, the second vehicle speed setting data for high-speed moving is adopted as the vehicle speed setting data (step #1103). Next, a gain corresponding to the vehicle speed setting data is read out from the output of the lever sensor 59 for main shift lever (steps #1104, #1105), and the vehicle speed setting data is corrected by multiplying the adopted vehicle speed setting data by the gain, to thereby automatically correct the vehicle speed setting data to an appropriate one for which the set change gear ratio (the fastest change gear ratio of the main transmission device 9 set by the main shift lever 20) corresponding to the operation position of the main shift lever 20 is used as criterion (steps #1106, #1107). Then, the engine rotational speed from the output of the engine sensor 62 is read (steps #1108, #1109), and the control target vehicle speed for the output of the vehicle speed sensor 63 is determined based on the corrected vehicle speed setting data and the read engine rotational speed (steps #1110, #1111).

Then, the control target vehicle speed determined by the vehicle speed setting control is set either for forward traveling or for reverse traveling based on the output of the lever sensor 61 for FR lever, the actuation of the change gear ratio altering unit C is controlled in such a manner that the output of the vehicle speed sensor 63 matches the set control target vehicle speed for forward traveling or for reverse traveling (the output of the vehicle speed sensor 63 falls on the dead band of the control target vehicle speed for forward traveling or for reverse traveling), and the operation angles of the pump swash plate 31B and the motor swash plate 32B are altered, to thereby perform the vehicle speed feedback control to alter the change gear ratio of the main transmission device 9.

With this configuration, for example, when the main shift lever 20 is operated from a zero-speed position to the desired operation position, and at the same time, when an accelerator operation is performed by the accelerator lever 17 or the accelerator pedal 18 with the predetermined driving condition being established, while the engine rotational speed is in the medium rotational speed region NM, the engine rotational speed is increased or decreased in accordance with the accelerator operation and the change gear ratio of the main transmission device 9 is altered in proportion to this increased or decreased engine rotational speed, in such a manner that the vehicle speed is changed at a constant rate of change which is larger than the rate of change in the high rotational speed region NH.

With this configuration, in the case where the engine rotational speed is gradually increased from the idling rotational speed by the accelerator operation and the vehicle body is started, as the engine rotational speed becomes closer to the idling rotational speed, the change gear ratio of the main transmission device 9 becomes a larger change gear ratio on the low-speed side, and thus a load on the engine 3 is reduced. Therefore, as compared with the case where the vehicle body is started in a state in which the change gear ratio of the main transmission device 9 is retained to the set change gear ratio corresponding to the operation position of the main shift lever 20, a decrease in the engine rotational speed and generation of engine stall caused by overload upon starting can be effectively suppressed, and the starting of the vehicle body can be smoothly performed.

In the case of a trans-ridge traveling in which the vehicle body enters or leaves an agricultural field, a loading and unloading traveling in which the vehicle body is mounted or dismounted on or from a loading space of a truck using a running board, or the like, as the engine rotational speed is made closer to the idling rotational speed by the accelerator operation, the change gear ratio of the main transmission device 9 becomes a larger change gear ratio on the low-speed side and a load on the engine 3 is reduced, and the vehicle speed is decreased to a large extent. Therefore, the trans-ridge traveling, the loading and unloading traveling or the like can be excellently performed at low-speed. Especially, by operating the auxiliary shift lever 21 to the low-speed position or the high-speed position and adopting the first vehicle speed setting data, the speed change step of the auxiliary transmission device 10 can be set to the low-speed step or the high-speed step with a high torque and the vehicle speed can be set to a very low speed. Therefore, the trans-ridge traveling, the loading and unloading traveling or the like can be more excellently performed at very low speed with a high torque.

Furthermore, in the medium rotational speed region NM, as compared with the configuration in which the engine rotational speed is simply increased or decreased in accordance with the accelerator operation, an adjustment range of the vehicle speed by the accelerator operation is wider, and the amount of change of the vehicle speed relative to an the accelerator operation amount is larger. Therefore, the acceleration and deceleration by the accelerator operation is facilitated and the movement utilizing the medium rotational speed region NM can be comfortably performed. Especially, in a high-speed moving state in which the auxiliary shift lever 21 is operated to the high-speed movement position, by adopting the second vehicle speed setting data in which the second set rotational speed N2 is set to a rotational speed slightly lower than the rated rotational speed of the engine 3, in nearly whole range from the idling rotational speed to the rated rotational speed, the acceleration and deceleration by the accelerator operation is facilitated and the high-speed moving can be comfortably performed.

On the other hand, while the engine rotational speed is in the high rotational speed region NH, even though the engine rotational speed changes due to the accelerator operation, traveling load or working load, the change gear ratio of the main transmission device 9 becomes constant at the set change gear ratio corresponding to the operation position of the main shift lever 20, and therefore, the relationship in which the vehicle speed is proportional to the engine rotational speed can be retained. Especially, in a work traveling state in which the auxiliary shift lever 21 is operated to the low-speed position or the high-speed position, by adopting the first vehicle speed setting data in which the rotational speed at which the engine 3 exerts the maximum torque is set to the second set rotational speed N2, the high rotational speed region NH spans a wide range from the second set rotational speed N2 at which the engine 3 exerts the maximum torque to the rated rotational speed, and in this wide high rotational speed region NH, the relationship in which the vehicle speed is proportional to the engine rotational speed can be retained. Accordingly, when the working device, such as rotary tilling device, configured to be actuated by non-changed power (non-changed rotational speed) from the engine 3 taken out from the PTO shaft 16, is connected to a rear portion of the vehicle body in order to perform work, by operating the auxiliary shift lever 21 to the low-speed position or the high-speed position, a relationship in which each of the vehicle speed and the actuation speed of the working device is proportional to the engine rotational speed can be retained in the wide high rotational speed region NH spanning from the second set rotational speed N2 at which the engine 3 exerts the maximum torque to the rated rotational speed. As a result, the disturbance in the working trail of the working device caused by inability to retain the constant relationship between the vehicle speed and the actuation speed of the working device can be prevented, and the working trail of the working device can be finished in an excellent state in which the work is uniformly performed. Especially, when the rotary tilling device is connected to the rear portion of the vehicle body in order to perform the tillage work, the tilling trail of the rotary tilling device can be finished in an excellent tilling state in which the tilling is uniformly performed.

In the case where the engine rotational speed is reduced from the high rotational speed region NH to the medium rotational speed region NM due to the traveling load, working load or the like, as the engine rotational speed is decreased in the medium rotational speed region NM, the change gear ratio of the main transmission device 9 becomes a larger change gear ratio on the low-speed side, and thus a load on the engine 3 is reduced. Therefore, the engine 3 can be imparted with a viscous property, to thereby effectively suppress a decrease in the engine rotational speed and generation of engine stall which may otherwise be caused by overload. In addition, with this configuration, in the case where the vehicle body is started by a press canceling operation of the right and left brake pedals 19 or the stop pedal 23, or by a swinging operation of the FR lever 22 from the neutral position to the forward position or the reverse position, performed while the engine rotational speed is retained in the high rotational speed region NH, even though the engine rotational speed is decreased due to the traveling load or working load at that moment, if the engine rotational speed is decreased as low as the medium rotational speed region NM, the engine 3 can be imparted with a viscous property and the decrease in the engine rotational speed and generation of engine stall caused by overload can be effectively suppressed. Therefore, the starting of the vehicle body utilizing the right and left brake pedals 19, the stop pedal 23, or the FR lever 22, can be smoothly performed.

For the engine rotational speed which is decreased to the low rotational speed region NL due to the traveling load, working load or the like, the setting is made in such a manner that, with the first vehicle speed setting data to be adopted upon work traveling, the vehicle speed becomes constant at a very low set speed, and with the second vehicle speed setting data to be adopted upon high-speed moving, the vehicle speed becomes zero when the engine rotational speed becomes zero. Therefore, during a time period in which the engine rotational speed is reduced to zero, the main transmission device 9 never becomes neutral, and with this configuration, even though the engine 3 is operated a phenomenon in which a driver senses a discomfort can be prevented, such as stopping traveling of the vehicle body caused by the main transmission device 9 becoming neutral, due to a reduction in the engine rotational speed.

Moreover, in the low rotational speed region NL, the traveling state at a low speed or very low speed is retained, and thus in the low rotational speed region NL, the engine 3 can be imparted with a viscous property to some degree. With this viscosity, the driver is allowed to recognize overload on the engine 3 in the low rotational speed region NL, to thereby motivate the driver to take some measures, such as deceleration operation of the main shift lever 20 to reduce the load. If no measure is taken, the engine stall is generated due to the overload, and thus the driver is allowed to re-recognize the overload on the engine 3 in the low rotational speed region NL.

It should be noted that, instead of the configuration described above, the vehicle speed control may be configured in such a manner that a combination of the change gear ratio of the main transmission device 9 and a change gear ratio of the auxiliary transmission device 10 is used as change gear ratio of a transmission device for traveling, that data showing a relationship among the engine rotational speed, the change gear ratio of the transmission device for traveling, and the vehicle speed (an output rotational speed of the auxiliary transmission device 10) is adopted as the vehicle speed setting data, and that a vehicle speed sensor for detecting the output rotational speed of the auxiliary transmission device 10 as a vehicle speed upon control is provided. Alternatively, the vehicle speed control may be configured in such a manner that a combination of the change gear ratio of the main transmission device 9, the change gear ratio of the auxiliary transmission device 10, and a final reduction ratio by the differential device 13 for rear wheel or the like is used as a change gear ratio of a rear wheel transmission system, and that data showing a relationship among the engine rotational speed, the change gear ratio of the rear wheel transmission system and the vehicle speed is adopted as the vehicle speed setting data.

Referring to FIGS. 4A, 4B, 4C, 12 and 13, the vehicle speed control unit 27B includes: a change gear ratio determining unit 27Ba configured to determine the change gear ratio of the main transmission device 9 which is set based on the operation position of the main shift lever 20, the engine rotational speed and the like; a decrease detection unit 27Bb configured to detect a decrease amount of the engine rotational speed (hereinbelow, referred to as "engine drop amount") from the set rotational speed; a first switching control unit 27Bc configured to switch the speed change step of the variable capacity motor 32 based on the output of the lever sensor 59 for main shift lever; a second switching control unit 27Bd configured to switch the speed change step of the variable capacity motor 32 based on the determination of the change gear ratio determining unit 27Ba; and a third switching control unit 27Be configured to switch the speed change step of the variable capacity motor 32 based on an output of the decrease detection unit 27Bb.

Then, the vehicle speed control unit 27B is configured to switch a control actuation regarding the switching of the speed change step of the variable capacity motor 32, in accordance with the speed change step of the auxiliary transmission device 10 read out from the output of the lever sensor 60 for auxiliary shift lever. Specifically, when the speed change step of the auxiliary transmission device 10 is the low-speed step for low-speed working, the vehicle speed control unit 27B actuates the first switching control unit 27Bc; when the speed change step of the auxiliary transmission device 10 is the high-speed step for high-speed working, the vehicle speed control unit 27B actuates the first switching control unit 27Bc and the third switching control unit 27Be; and when the speed change step of the auxiliary transmission device 10 is the fastest step for high-speed moving, the vehicle speed control unit 27B actuates the second switching control unit 27Bd and the third switching control unit 27Be.

It should be noted that, the change gear ratio determining unit 27Ba is configured to determine whether or not the control target vehicle speed which is set based on the adopted corrected vehicle speed setting data (the vehicle speed setting data which is corrected based on the operation position of the main shift lever 20) and the output of the engine sensor 62 exceeds the limit value of the speed that can be attained at the low-speed step of the variable capacity motor 32, to thereby determine whether or not the change gear ratio of the main transmission device 9 which is set based on the operation position of the main shift lever 20, the engine rotational speed and the like is a change gear ratio that can be attained at the low-speed step of the variable capacity motor 32.

The decrease detection unit 27Bb is configured to read out the set rotational speed of the engine 3 which is set by the accelerator lever 17 or the accelerator pedal 18, based on the output of the lever sensor 30 for speed governing lever, and to compute the engine drop amount based on the set rotational speed of the engine 3 read out and the output of the engine sensor 62.

Figure 12:
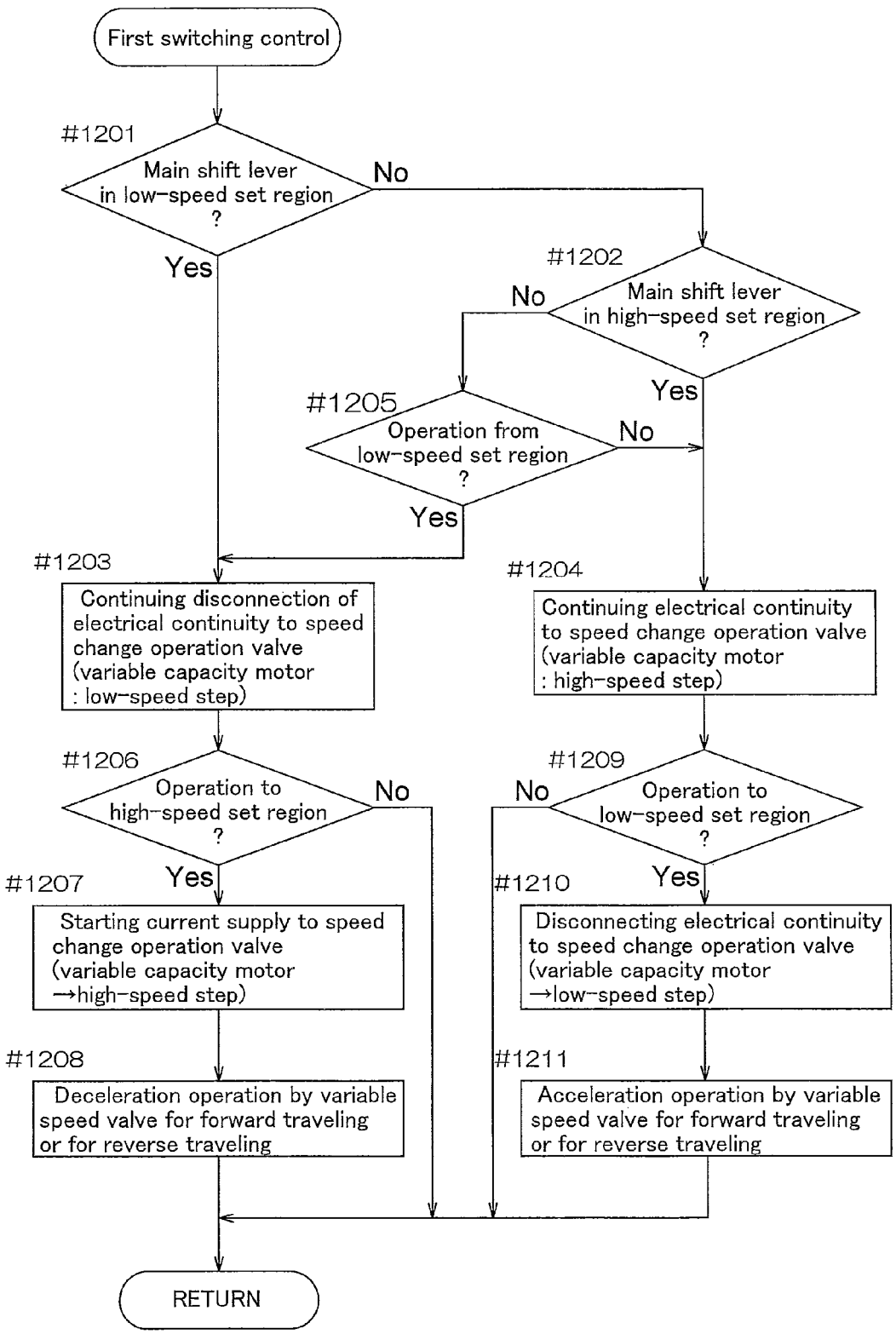
FIG. 12 is a flow chart of first switching control.

Hereinbelow, a first switching control in which the speed change step of the variable capacity motor 32 is switched by a control actuation of the first switching control unit 27Bc will be described with reference to the flow chart of FIG. 12. The operation position of the main shift lever 20 is determined based on the output of the lever sensor 59 for main shift lever (steps #1201, #1202). When the operation position of the main shift lever 20 is within a low-speed set region including the zero-speed position, the disconnection of the electrical continuity to the speed change operation valve 43 is continued so that the speed change step of the variable capacity motor 32 is kept as the low-speed step (step #1203). When the operation position of the main shift lever 20 is in a high-speed set region including the fastest position, the electrical continuity to the speed change operation valve 43 is continued so that the speed change step of the variable capacity motor 32 is kept as the high-speed step (step #1204). When the operation position of the main shift lever 20 is in the medium-speed set region between the low-speed set region and the high-speed set region, an operation process to the medium-speed set region is detected (step #1205), and when the main shift lever 20 is positioned in the medium-speed set region after the operation from the low-speed set region, the speed change step of the variable capacity motor 32 is retained at the low-speed step, and when positioned in the medium-speed set region after the operation from the high-speed set region, the electrical continuity to the speed change operation valve 43 is controlled so that the speed change step of the variable capacity motor 32 is kept as the high-speed step (steps #1203, #1204). In the case where the speed change step of the variable capacity motor 32 is retained at the low-speed step, it is determined whether or not an operation of the main shift lever 20 from the medium-speed set region to the high-speed set region is performed, based on the output of the lever sensor 59 for main shift lever (step #1206), and when the operation to the high-speed set region is detected, a current supply to the speed change operation valve 43 is started so that the speed change step of the variable capacity motor 32 is switched from the low-speed step to the high-speed step (step #1207), and then the electrical continuity to the variable speed valve 38 for forward traveling or the variable speed valve 39 for reverse traveling is controlled in such a manner that a deceleration operation of the pump swash plate 31B of the variable capacity pump 31 is performed with an operation amount which is set so as to compensate (offset) an acceleration amount of the change gear ratio of the main transmission device 9 changed along with switching of the variable capacity motor 32 from the low-speed step to the high-speed step (step #1208). In the case where the speed change step of the variable capacity motor 32 is retained at the high-speed step, it is determined whether or not the operation of the main shift lever 20 from the medium-speed set region to the low-speed set region is performed, based on the output of the lever sensor 59 for main shift lever (step #1209), and when the operation to the low-speed set region is detected, the electrical continuity to the speed change operation valve 43 is disconnected so that the speed change step of the variable capacity motor 32 is switched from the high-speed step to the low-speed step (step #1210), and then the electrical continuity to the variable speed valve 38 for forward traveling or the variable speed valve 39 for reverse traveling is controlled in such a manner that an acceleration operation of the pump swash plate 31B of the variable capacity pump 31 is performed with an operation amount which is set so as to compensate (offset) a deceleration amount of the change gear ratio of the main transmission device 9 changed along with switching of the variable capacity motor 32 from the high-speed step to the low-speed step (step #1211).

It should be noted that the medium-speed set region of the main shift lever 20 is a region in which the main shift lever 20 can set the change gear ratio of the main transmission device 9 that can be attained by switching the speed change step of the variable capacity motor 32 to either the low-speed step or the high-speed step.

With this configuration, when the main shift lever 20 is positioned in the low-speed set region, or when positioned in the medium-speed set region after the operation from the low-speed set region, and at the same time, the above-described predetermined driving condition is established, the vehicle speed control unit 27B controls the electrical continuity to the variable speed valve 38 for forward traveling or the variable speed valve 39 for reverse traveling to perform a speed change operation of the pump swash plate 31B of the variable capacity pump 31 so that the control target vehicle speed which is set based on the adopted corrected vehicle speed setting data and the output of the engine sensor 62 is attained while retaining the speed change step of the variable capacity motor 32 to the low-speed step.

In addition, when the main shift lever 20 is positioned in the high-speed set region, or when positioned in the medium-speed set region after the operation from the high-speed set region, in the case where the above-described predetermined driving condition is established, the vehicle speed control unit 27B controls the electrical continuity to the variable speed valve 38 for forward traveling or the variable speed valve 39 for reverse traveling to perform the speed change operation of the pump swash plate 31B of the variable capacity pump 31 so that the control target vehicle speed which is set based on the adopted corrected vehicle speed setting data and the output of the engine sensor 62 is attained while retaining the speed change step of the variable capacity motor 32 to the high-speed step.

Then, in the case where an acceleration operation of the main shift lever 20 positioned in the low-speed set region or the medium-speed set region after the operation from the low-speed set region is performed to the high-speed set region while the above-described predetermined driving condition is established, the electrical continuity to the variable speed valve 38 for forward traveling or the variable speed valve 39 for reverse traveling is controlled so that the acceleration operation of the pump swash plate 31B of the variable capacity pump 31 is performed in accordance with the acceleration operation of the main shift lever 20 until the main shift lever 20 reaches the high-speed set region. When the main shift lever 20 reaches the high-speed set region, by the control actuation of the first switching control unit 27Bc as described above, a current supply to the speed change operation valve 43 is started so that the speed change step of the variable capacity motor 32 is switched from the low-speed step to the high-speed step, and then the electrical continuity to the variable speed valve 38 for forward traveling or the variable speed valve 39 for reverse traveling is controlled in such a manner that the deceleration operation of the pump swash plate 31B of the variable capacity pump 31 is performed with an operation amount which is set so as to compensate the acceleration amount of the change gear ratio of the main transmission device 9 changed along with switching of the variable capacity motor 32 from the low-speed step to the high-speed step.

To the contrary, in the case where a deceleration operation of the main shift lever 20 positioned in the high-speed set region or the medium-speed set region after the operation from the high-speed set region is performed to the low-speed set region while the above-described predetermined driving condition is established, the electrical continuity to the variable speed valve 38 for forward traveling or the variable speed valve 39 for reverse traveling is controlled so that the deceleration operation of the pump swash plate 31B of the variable capacity pump 31 is performed in accordance with the deceleration operation of the main shift lever 20 until the main shift lever 20 reaches the low-speed set region. When the main shift lever 20 reaches the low-speed set region, by the control actuation of the first switching control unit 27Bc as described above, the electrical continuity to the speed change operation valve 43 is disconnected so that the speed change step of the variable capacity motor 32 is switched from the high-speed step to the low-speed step, and then the electrical continuity to the variable speed valve 38 for forward traveling or the variable speed valve 39 for reverse traveling is controlled in such a manner that the acceleration operation of the pump swash plate 31B of the variable capacity pump 31 is performed with an operation amount which is set so as to compensate the deceleration amount of the change gear ratio of the main transmission device 9 changed along with switching of the variable capacity motor 32 from the high-speed step to the low-speed step.

Figure 13:
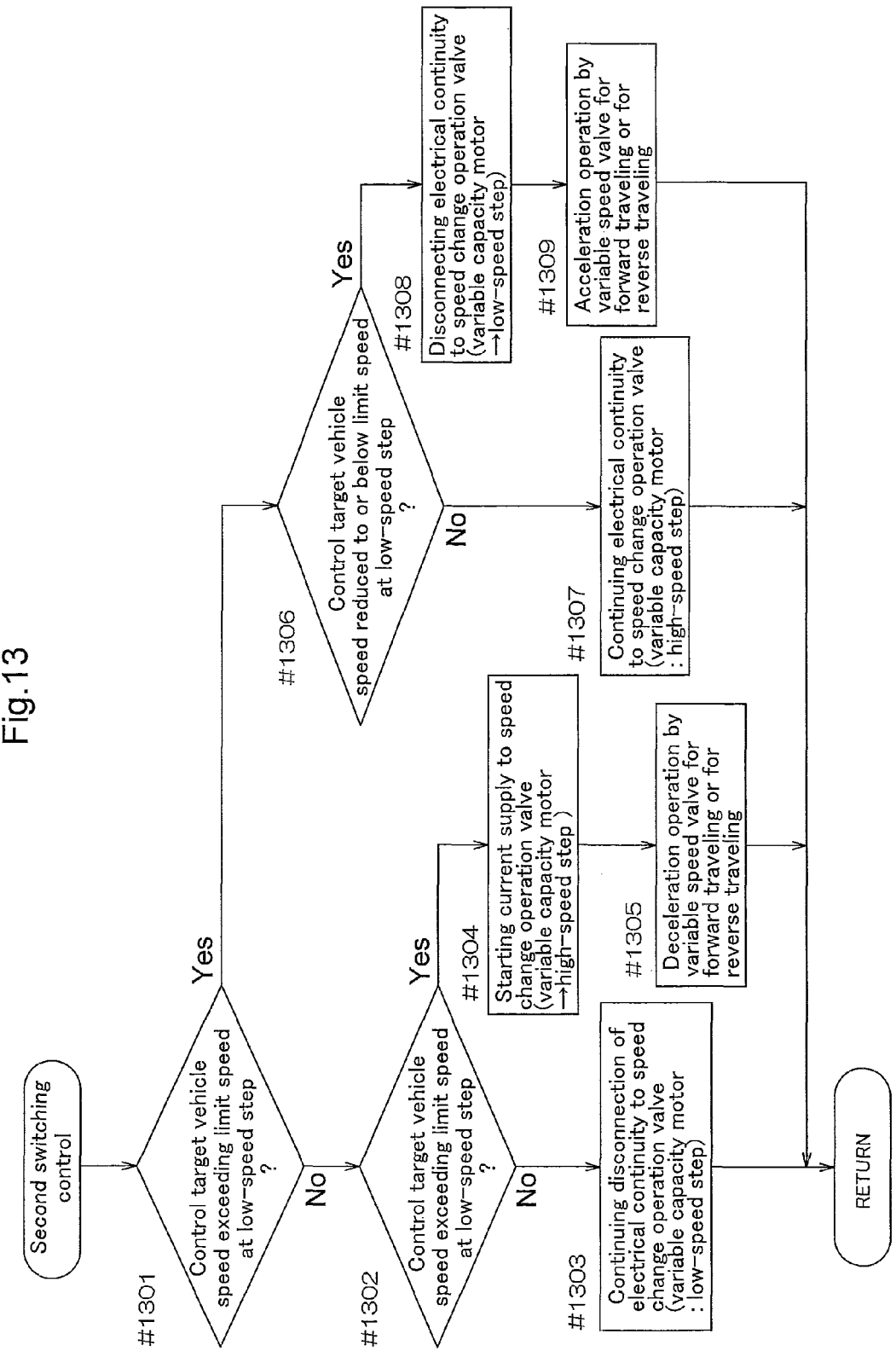
FIG. 13 is a flow chart of second switching control.

Hereinbelow, a second switching control in which the speed change step of the variable capacity motor 32 is switched by a control actuation of the second switching control unit 27Bd will be described with reference to the flow chart of FIG. 13. Based on the determination by the change gear ratio determining unit 27Ba, it is determined whether or not the control target vehicle speed which is determined based on the adopted corrected vehicle speed setting data and the output of the engine sensor 62 exceeds the limit value of the speed that can be attained at the low-speed step of the variable capacity motor 32 (step #1301). When the control target vehicle speed does not exceed the limit value, it is detected whether or not the control target vehicle speed exceeds the limit value of the speed (step #1302), and when the control target vehicle speed does not exceed the limit value of the speed, the disconnection of the electrical continuity to the speed change operation valve 43 is continued so that the speed change step of the variable capacity motor 32 is kept as the low-speed step (step #1303). When the control target vehicle speed exceeds the limit value, a current supply to the speed change operation valve 43 is started so that the speed change step of the variable capacity motor 32 is switched from the low-speed step to the high-speed step (step #1304), and then the electrical continuity to the variable speed valve 38 for forward traveling or the variable speed valve 39 for reverse traveling is controlled in such a manner that a deceleration operation of the pump swash plate 31B of the variable capacity pump 31 is performed with an operation amount which is set so as to compensate (offset) the acceleration amount of the change gear ratio of the main transmission device 9 changed along with switching of the variable capacity motor 32 from the low-speed step to the high-speed step (step #1305). When the control target vehicle speed exceeds the limit value of the speed in the step #1301, it is detected whether or not the control target vehicle speed is reduced to or below the limit value of the speed (step #1306), and when the control target vehicle speed is not reduced to or below the limit value of the speed, the electrical continuity to the speed change operation valve 43 is continued so that the speed change step of the variable capacity motor 32 is kept as the high-speed step (step #1307). When the control target vehicle speed is reduced to or below the limit value, the electrical continuity to the speed change operation valve 43 is disconnected so that the speed change step of the variable capacity motor 32 is switched from the high-speed step to the low-speed step (step #1308), and then the electrical continuity to the variable speed valve 38 for forward traveling or the variable speed valve 39 for reverse traveling is controlled in such a manner that the acceleration operation of the pump swash plate 31B of the variable capacity pump 31 is performed with an operation amount which is set so as to compensate (offset) the deceleration amount of the change gear ratio of the main transmission device 9 changed along with switching of the variable capacity motor 32 from the high-speed step to the low-speed step (step #1309).

It should be noted that the speed that can be attained at the low-speed step of the variable capacity motor 32 is defined as a speed obtained based on: the change gear ratio obtained by, while the speed change step of the variable capacity motor 32 is set to the low-speed step, altering the operation angle of the pump swash plate 31B of the variable capacity pump 31 from zero to the operation limitation angle; and the engine rotational speed from the second vehicle speed setting data, corresponding to this change gear ratio. The limit value of this speed is defined as a speed obtained based on: the fastest change gear ratio at the low-speed step obtained by, while the speed change step of the variable capacity motor 32 is set to the low-speed step, altering the operation angle of the pump swash plate 31B of the variable capacity pump 31 to the operation limitation angle; and the engine rotational speed from the second vehicle speed setting data, corresponding to this fastest change gear ratio.

With this configuration, for example, when the main shift lever 20 is positioned at the fastest position, and at the same time, the above-described predetermined driving condition is established, in the case where a pressing operation of the accelerator pedal 18 is performed, the vehicle speed control unit 27B controls the electrical continuity to the variable speed valve 38 for forward traveling or the variable speed valve 39 for reverse traveling to perform the speed change operation of the pump swash plate 31B of the variable capacity pump 31 so that the control target vehicle speed is obtained with the speed change step of the variable capacity motor 32 being retained to the low-speed step, until the control target vehicle speed which is set based on the adopted corrected vehicle speed setting data and the output of the engine sensor 62 changeable in accordance with the pressing operation of the accelerator pedal 18 exceeds the above-described limit value.

When the control target vehicle speed exceeds the above-described limit value, along with it, by the control actuation of the second switching control unit 27Bd as described above, the current supply to the speed change operation valve 43 is started so that the speed change step of the variable capacity motor 32 is switched from the low-speed step to the high-speed step, and then the electrical continuity to the variable speed valve 38 for forward traveling or the variable speed valve 39 for reverse traveling is controlled in such a manner that a deceleration operation of the pump swash plate 31B of the variable capacity pump 31 is performed with an operation amount which is set so as to compensate the acceleration amount of the change gear ratio of the main transmission device 9 changed along with switching of the variable capacity motor 32 from the low-speed step to the high-speed step. While the control target vehicle speed is kept above the limit value, the electrical continuity to the variable speed valve 38 for forward traveling or the variable speed valve 39 for reverse traveling is controlled to perform the speed change operation of the pump swash plate 31B of the variable capacity pump 31 so that the control target vehicle speed is obtained with the speed change step of the variable capacity motor 32 being retained to the high-speed step.

Afterward, when the control target vehicle speed is reduced to the above-described limit value by the operation of the accelerator pedal 18 in a press canceling direction, along with it, by the control actuation of the second switching control unit 27Bd as described above, the electrical continuity to the speed change operation valve 43 is disconnected so that the speed change step of the variable capacity motor 32 is switched from the high-speed step to the low-speed step, and then the electrical continuity to the variable speed valve 38 for forward traveling or the variable speed valve 39 for reverse traveling is controlled in such a manner that the acceleration operation of the pump swash plate 31B of the variable capacity pump 31 is performed with an operation amount which is set so as to compensate the deceleration amount of the change gear ratio of the main transmission device 9 changed along with switching of the variable capacity motor 32 from the high-speed step to the low-speed step. While the control target vehicle speed is kept below the limit value, the electrical continuity to the variable speed valve 38 for forward traveling or the variable speed valve 39 for reverse traveling is controlled to perform the speed change operation of the pump swash plate 31B of the variable capacity pump 31 so that the control target vehicle speed is obtained with the speed change step of the variable capacity motor 32 being retained to the low-speed step.

Figure 14:
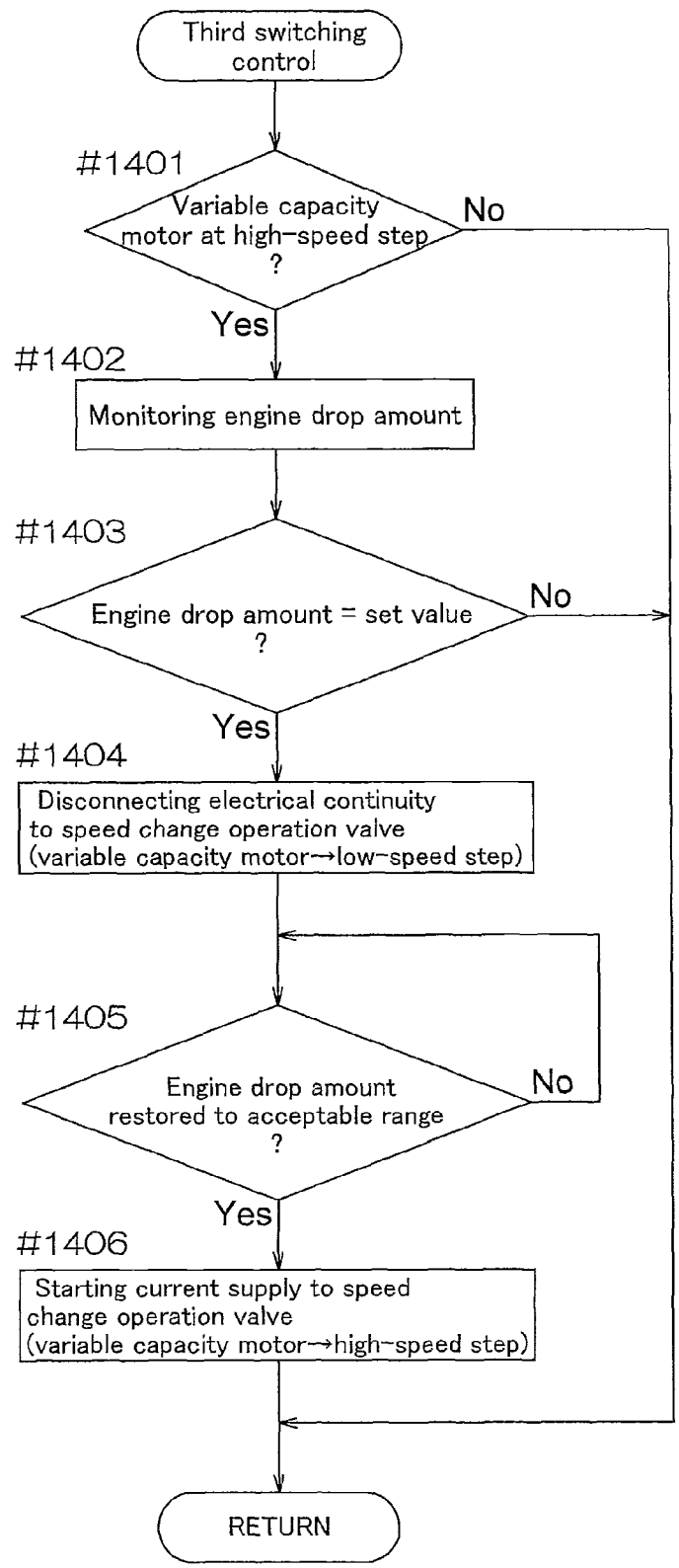
FIG. 14 is a flow chart of third switching control.
Figure 15:
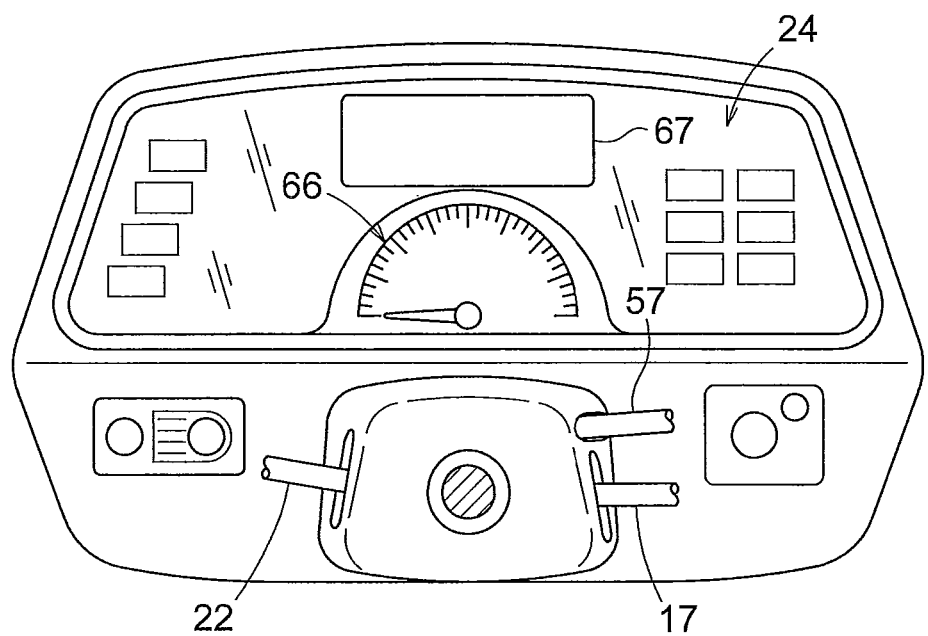
FIG. 15 is a front view of a display panel.
Figure 16:
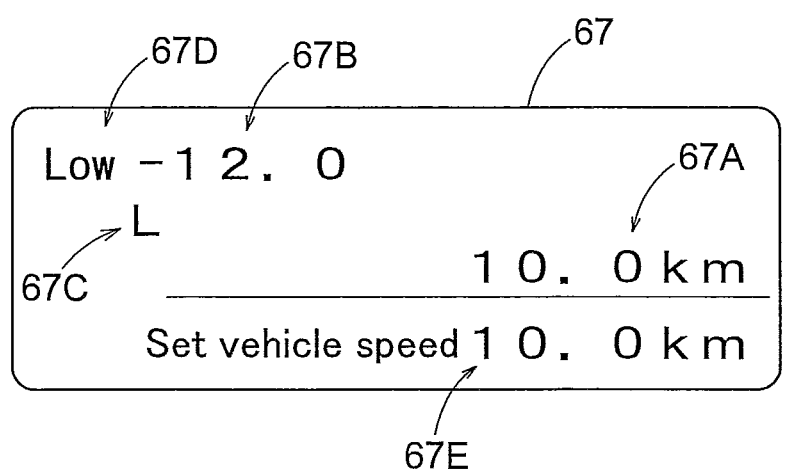
FIG. 16 is a front view of a liquid crystal display device.

Hereinbelow, a third switching control in which the speed change step of the variable capacity motor 32 is switched by a control actuation of the third switching control unit 27Be will be described with reference to the flow chart of FIG. 14. The speed change step of the variable capacity motor 32 is determined based on an electrical continuity state of the speed change operation valve 43 (step #1401). When the speed change step is the high-speed step, the engine drop amount is monitored based on the output of the decrease detection unit 27Bb (step #1402), and it is determined whether or not the engine drop amount reaches a set amount (for example a value which is 20% of the set rotational speed) (step #1403). When the engine drop amount reaches the set amount, the electrical continuity to the speed change operation valve 43 is disconnected so that the speed change step of the variable capacity motor 32 is switched from the high-speed step to the low-speed step (step #1404). Then, it is determined whether or not the engine drop amount is recovered to a predetermined acceptable range (step #1405), and when it is recovered to the predetermined acceptable range, a current supply to the speed change operation valve 43 is started so that the speed change step of the variable capacity motor 32 is switched from the low-speed step to the high-speed step (step #1406).

With the configuration described above, in a low-speed working state in which the speed change step of the auxiliary transmission device 10 is set to the low-speed step, and in a high-speed working state in which the speed change step of the auxiliary transmission device 10 is set to the high-speed step, when it is desired to secure a higher torque in order to more comfortably perform heavy loading work or the like, by positioning the main shift lever 20 at the low-speed set region or shifting the main shaft lever 20 from the low-speed set region to the medium-speed set region, the speed change step of the variable capacity motor 32 can be set to the low-speed step, and a higher torque can be secured. Accordingly, the starting, traveling or the like of the vehicle body in heavy loading work or the like can be smoothly performed, and heavy loading work can be more comfortably performed.

Then, in the low-speed working state in which the speed change step of the auxiliary transmission device 10 is set to the low-speed step, since a high torque is secured by the speed change step, a decrease in the engine rotational speed and generation of engine stall caused by overload are unlikely to occur, and thus high-low switching of the variable capacity motor 32 in the main transmission device 9 is performed solely through the operation of the main shift lever 20 by driver's will. Accordingly, even when the variable capacity motor 32 of the main transmission device 9 is switched to the high-speed step for the purpose of enhancing the work efficiency in the low-speed working state, the speed change step of the variable capacity motor 32 is never unexpectedly switched from the high-speed step to the low-speed step which may otherwise be caused by the reduction in the engine rotational speed, and as long as the engine rotational speed is within the high rotational speed region NH, the change gear ratio of the main transmission device 9 set by the operation of the main shift lever 20, the accelerator lever 17 or the accelerator pedal 18 based on the will of the driver who pays attention to the work can be retained. When the reduction in the engine rotational speed is notable, the variable capacity motor 32 of the main transmission device 9 can be switched to the low-speed step by the operation of the main shift lever 20 by the driver's will, to thereby suppress or prevent the reduction in the engine rotational speed. As a result, work, such as rotary tillage work, can be excellently performed in which the vehicle speed and the actuation speed of the working device are desired to be retained in a relationship in which they are proportional to the engine rotational speed.

In addition, in the high-speed working state in which the speed change step of the auxiliary transmission device 10 is set to the high-speed step, though a relatively high torque is secured by the speed change step, a decrease in the engine rotational speed and generation of engine stall caused by overload are likely to occur as compared with the case of the low-speed step. Therefore, the high-low switching of the variable capacity motor 32 in the main transmission device 9 is configured not only to be performed solely through the operation of the main shift lever 20 by the driver's will, but also to be performed automatically based on the engine drop amount. With this configuration, while the high-low switching of the variable capacity motor 32 in the main transmission device 9 can be performed by the driver's will in accordance with the work, the generation of engine stall caused by overload can be prevented.

Furthermore, in both of the low-speed working state and the high-speed working state, during low-speed traveling in which the change gear ratio of the main transmission device 9 is set to the large change gear ratio on the low-speed side, the speed change step of the variable capacity motor 32 becomes the low-speed step. Accordingly, for the operation angle of the pump swash plate 31B of the variable capacity pump 31, an angle on the high-speed side exhibiting high hydraulic pressure transmission efficiency can be adopted, and as a result, the vehicle speed during the low-speed traveling can be stabilized.

Furthermore, in the medium-speed set region, hysteresis is imparted, and thus a frequent high-low switching of the variable capacity motor 32 by the operation of the main shift lever 20 can be prevented.

On the other hand, in the high-speed moving state in which the speed change step of the auxiliary transmission device 10 is set to the fastest step, a torque is low due to the speed change step, and therefore, as long as the control target vehicle speed is a speed that can be attained at the low-speed step of the variable capacity motor 32, the speed change step of the variable capacity motor 32 is retained to the low-speed step to secure a high torque. With this configuration, during the starting or traveling of the vehicle body in the high-speed moving state in which the speed change step of the auxiliary transmission device 10 is set to the fastest step, a decrease in the engine rotational speed and generation of engine stall caused by overload can be effectively suppressed. In addition, by retaining the variable capacity motor 32 to the low-speed step as long as possible, an angle on the high-speed side exhibiting high hydraulic pressure transmission efficiency can be used as the operation angle of the pump swash plate 31B in a wider speed change region. Accordingly, hydraulic pressure transmission efficiency in the main transmission device 9 can be enhanced during the starting or traveling in the high-speed moving state in which the speed change step of the auxiliary transmission device 10 is set to the fastest step, and a decrease in the engine rotational speed and generation of engine stall caused by overload can be more effectively suppressed during the starting or traveling of the vehicle body in the high-speed moving state.

Furthermore, when the speed change step of the variable capacity motor 32 is switched by the control actuation of the first switching control unit 27Bc or the second switching control unit 27Bd, the pump swash plate 31B is operated using the operation amount which is set so as to compensate an amount of change in the change gear ratio of the main transmission device 9 changeable along with the switching, and therefore, the speed change operation for altering the change gear ratio of the main transmission device 9 by the operation of the main shift lever 20, the accelerator lever 17 or the accelerator pedal 18 can be smoothly performed non-stepwise, even though the switching of the speed change step of the variable capacity motor 32 is performed.

Then, with respect to the low-speed working state in which the speed change step of the auxiliary transmission device 10 is set to the low-speed step, the high-speed working state in which the speed change step is set to the high-speed step, and the high-speed moving state in which the speed change step is set to the fastest step, the control actuation regarding the switching of the speed change step of the variable capacity motor 32 suitable for each state can be automatically selected together with the switching of the speed change step of the auxiliary transmission device 10 by the auxiliary shift lever 21.

It should be noted that the medium-speed set region of the main shift lever 20 is a region in which the main shift lever 20 can set the change gear ratio of the main transmission device 9 that can be attained by switching the speed change step of the variable capacity motor 32 to either the low-speed step or the high-speed step. It should be also noted that the speed that can be attained at the low-speed step of the variable capacity motor 32 is defined as a speed obtained based on: the change gear ratio obtained by, while the speed change step of the variable capacity motor 32 is set to the low-speed step, altering the operation angle of the pump swash plate 31B of the variable capacity pump 31 from zero to the operation limitation angle; and the engine rotational speed from the second vehicle speed setting data, corresponding to this change gear ratio. The limit value of this speed is defined as a speed obtained based on: the fastest change gear ratio at the low-speed step obtained by, while the speed change step of the variable capacity motor 32 is set to the low-speed step, altering the operation angle of the pump swash plate 31B of the variable capacity pump 31 to the operation limitation angle; and the engine rotational speed from the second vehicle speed setting data, corresponding to the fastest change gear ratio.

It should be noted that, the control actuation of the first switching control unit 27Bc may be configured in the following manner. When the first switching control unit 27Bc detects the operation of the main shift lever 20 from the low-speed set region to the medium-speed set region based on the output of the lever sensor 59 for main shift lever, a current supply to the speed change operation valve 43 is started so that the speed change step of the variable capacity motor 32 is switched from the low-speed step to the high-speed step, and then the electrical continuity to the variable speed valve 38 for forward traveling or the variable speed valve 39 for reverse traveling is controlled in such a manner that a deceleration operation of the pump swash plate 31B of the variable capacity pump 31 is performed with the operation amount which is set so as to compensate the acceleration amount of the change gear ratio of the main transmission device 9 changed along with switching of the variable capacity motor 32 from the low-speed step to the high-speed step. When the operation of the main shift lever 20 from the medium-speed set region to the high-speed set region is detected, the electrical continuity to the speed change operation valve 43 is controlled so that the speed change step of the variable capacity motor 32 is kept as the high-speed step. When the operation of the main shift lever 20 from the high-speed set region to the medium-speed set region is detected, the electrical continuity to the speed change operation valve 43 is disconnected so that the speed change step of the variable capacity motor 32 is switched from the high-speed step to the low-speed step, and then the electrical continuity to the variable speed valve 38 for forward traveling or the variable speed valve 39 for reverse traveling is controlled in such a manner that the acceleration operation of the pump swash plate 31B of the variable capacity pump 31 is performed with the operation amount which is set so as to compensate the decelerated amount of the change gear ratio of the main transmission device 9 changed along with switching of the variable capacity motor 32 from the high-speed step to the low-speed step. When the operation of the main shift lever 20 from the medium-speed set region to the low-speed set region is detected, the electrical continuity to the speed change operation valve 43 is disconnected so that the speed change step of the variable capacity motor 32 is kept as the low-speed step.

Referring to FIGS. 4B, 4C, 15 and 16, the display panel 24 is provided with a tachometer 66 configured to show the engine rotational speed, and a liquid crystal display device 67 configured to show the vehicle speed and the like. The liquid crystal display device 67 is provided with: a vehicle speed display part 67A configured to display the vehicle speed with characters; a main speed change step display part 67B configured to display the speed change step of the main transmission device 9 with characters; a motor speed change step display part 67C configured to display the speed change step of the variable capacity motor 32 with characters; an auxiliary speed change step display part 67D configured to display the speed change step of the auxiliary transmission device 10 with characters; a set vehicle speed display part 67E configured to display the arbitrarily set vehicle speed with characters; and the like. An actuation of the liquid crystal display device 67 is controlled by a control actuation of a display control unit 27E provided as control program in the ECU 27.

The vehicle speed display part 67A is arranged in a lower row in a middle height region on a right side in the liquid crystal display device 67. The main speed change step display part 67B is arranged in an upper region on a left side in the liquid crystal display device 67 in such a manner that it is away from the vehicle speed display part 67A. The motor speed change step display part 67C is arranged in an upper row in the middle height region on the left side in the liquid crystal display device 67 so as to be positioned between the vehicle speed display part 67A and the main speed change step display part 67B in terms of height. The auxiliary speed change step display part 67D is arranged leftward of the main speed change step display part 67B in the liquid crystal display device 67. The set vehicle speed display part 67E is arranged in a lower region on the right side in the liquid crystal display device 67 so as to be positioned below the vehicle speed display part 67A.

The display control unit 27E includes a vehicle speed computing unit 27Ea configured to compute an actual vehicle speed (hereinbelow, referred to as "actual speed") based on: the output rotational speed of the main transmission device 9 which is output by the vehicle speed sensor 63; a change gear ratio in the set speed change step of the auxiliary transmission device 10 which is read out from the output of the lever sensor 60 for auxiliary shift lever; and the final reduction ratio by the differential device 13 for rear wheel or the like and a circumferential length of the rear wheel 2 which are fixed data regarding the computation of the vehicle speed, and the actual speed output by the vehicle speed computing unit 27Ec is displayed on the vehicle speed display part 67A.

The display control unit 27E includes a rated vehicle speed computing unit 27Eb configured to compute a rated vehicle speed which is a theoretical vehicle speed obtained when the engine rotational speed reaches the rated rotational speed in a speed change state arbitrarily set by the main shift lever 20 and the auxiliary shift lever 21, based on: the rated rotational speed of the engine 3; the vehicle speed setting data (set change gear ratio of the main transmission device 9) corrected by the control actuation of the vehicle speed control unit 27B based on the output of the lever sensor 59 for main shift lever; the change gear ratio in the set speed change step of the auxiliary transmission device 10; the final reduction ratio; and the circumferential length of the rear wheel 2, and the rated vehicle speed output by the rated vehicle speed computing unit 27Eb is displayed on the main speed change step display part 67B without unit, as the speed change step of the main transmission device 9.

The display control unit 27E is configured to read out the speed change step of the variable capacity motor 32 from the control actuation of the vehicle speed control unit 27B, and to display the speed change step on the motor speed change step display part 67C. In addition, the display control unit 27E is configured to read out the speed change step of the auxiliary transmission device 10 from the output of the lever sensor 60 for auxiliary shift lever, and to display the speed change step on the auxiliary speed change step display part 67D.

The display control unit 27E includes a set vehicle speed computing unit 27Ec configured to compute a set vehicle speed which is a theoretical vehicle speed obtained when the engine rotational speed reaches the arbitrarily set rotational speed in the speed change state arbitrarily set by the main shift lever 20 and the auxiliary shift lever 21, based on: the set rotational speed of the engine 3 which is read out from the output of the lever sensor 30 for speed governing lever; the change gear ratio of the main transmission device 9 determined by the set rotational speed and the corrected vehicle speed setting data adopted by the vehicle speed control unit 27B; the change gear ratio in the set speed change step of the auxiliary transmission device 10; the final reduction ratio; and the circumferential length of the rear wheel 2, and the set vehicle speed output by the set vehicle speed computing unit 27Ec is displayed on the set vehicle speed display part 67E.

With respect to the display on each display part 67A-67E, specifically, when the computed vehicle speed is 10 km/h, an indication of "10.0 km" is displayed, and when 4.5 km/h, an indication of "4.5 km" is displayed on the vehicle speed display part 67A. When the computed rated vehicle speed is 12 km/h, an indication of "12.0" is displayed, and when 6 km/h, an indication of "6.0" is displayed on the main speed change step display part 67B as the speed change step of the main transmission device 9. When the speed change step of the variable capacity motor 32 which is read out from the control actuation of the vehicle speed control unit 27B is the low-speed step, an indication of "L" is displayed, and when the high-speed step, an indication of "H" is displayed on the motor speed change step display part 67C. When the speed change step of the auxiliary transmission device 10 which is read out from the output of the lever sensor 60 for auxiliary shift lever is the low-speed step for working, an indication of "low" is displayed, when the high-speed step for working, an indication of "high" is displayed, and when the fastest step for high-speed moving, and indication of "high-speed" is displayed on the auxiliary speed change step display part 67D. When the computed set vehicle speed is 10 km/h, an indication of "10.0 km" is displayed, and when 4.5 km/h, an indication of "4.5 km" is displayed on the set vehicle speed display part 67E. Then, the display on the set vehicle speed display part 67E functions as an interrupt display that shows a set vehicle speed at that moment for a set time (e.g., 5 seconds) when the operation by which the vehicle speed is changed is performed.

It should be noted that the operation by which the vehicle speed is changed (or the operation that changes the vehicle speed) herein means that an operation of the accelerator lever 17, an operation of the accelerator pedal 18, the dual pressing operation of the right and left brake pedals 19, the operation of the main shift lever 20, an operation of the auxiliary shift lever 21, the operation of the FR lever 22, and an operation of the stop pedal 23.

With the configuration described above, when the main shift lever 20 is operated to alter the set change gear ratio of the main transmission device 9, the speed change step of the main transmission device 9 displayed on the main speed change step display part 67B is changed in a continuous manner in accordance with the operation position of the main shift lever 20 and therefore, the setting of the change gear ratio of the main transmission device 9 by the main shift lever 20 is facilitated. Since the speed change step of the main transmission device 9 displayed on the main speed change step display part 67B is the rated vehicle speed which matches the highest speed obtained when the accelerator operation is maximum in the speed change state set by the main shift lever 20 and the auxiliary shift lever 21, and therefore, the vehicle speed setting in accordance with work condition is facilitated without using a vehicle speed table which stores the highest speed for each speed change state. In addition, since the speed change step of the main transmission device 9 displayed on the main speed change step display part 67B is the rated vehicle speed, when the speed change step of the auxiliary transmission device 10 is altered, a display range in the main speed change step display part 67B is automatically switched in accordance with the altered speed change step of the auxiliary transmission device 10. Therefore, the vehicle speed setting in accordance with work condition, including the switching of the speed change step of the auxiliary transmission device 10, is facilitated. Moreover, the main speed change step display part 67B and the auxiliary speed change step display part 67D are arranged side by side and therefore, an association between the speed change step of the main transmission device 9 and the speed change step of the auxiliary transmission device 10 is easily understood. Furthermore, the main speed change step display part 67B is arranged at a position away from the vehicle speed display part 67A, the motor speed change step display part 67C is arranged between the vehicle speed display part 67A and the main speed change step display part 67B, and the main speed change step display part 67B is displayed without unit. Therefore, even though the actual speed displayed on the vehicle speed display part 67A becomes equal to the speed change step of the main transmission device 9 displayed on the main speed change step display part 67B as a result of maximizing the accelerator operation, their indications can be easily distinguished.

In addition, in the set vehicle speed display part 67E, when the operation of the vehicle speed setting is performed by the accelerator lever 17, the main shift lever 20 or the like, the set vehicle speed (reached vehicle speed predicted from the vehicle speed setting operation) is instantly displayed, which is determined based on the operation position of the accelerator lever 17 or the accelerator pedal 18 and the operation positions of the main shift lever 20 and the auxiliary shift lever 21, and the displayed set vehicle speed is changed in a continuous manner in accordance with the vehicle speed setting operation. Therefore, for example in a case where work is performed at a desired engine rotational speed and vehicle speed, the vehicle speed setting can be simply and quickly performed regardless of the state of the vehicle including traveling and stopping. Then, since the display on the set vehicle speed display part 67E is an interrupt display that works when the operation by which the vehicle speed is changed is performed, the driver is allowed to clearly recognize the meaning of the indication in the set vehicle speed display part 67E. Furthermore, during the traveling at the set vehicle speed at which the vehicle speed to be displayed on the vehicle speed display part 67A and the set vehicle speed to be displayed on the set vehicle speed display part 67E become the same, no indication is made on the set vehicle speed display part 67E, and therefore, a useless indication, such as the same values (speeds) are displayed one above the other in the liquid crystal display device 67, can be prevented.

In addition, by displaying the speed change step of the variable capacity motor 32 on the motor speed change step display part 67C, the driver is allowed to easily recognize the speed change step of the variable capacity motor 32 switched by the operation of the main shift lever 20, the increase or decrease of the vehicle speed or the like.

Hereinbelow, preferred embodiments of the control system according to the present invention will be listed.

(1) In a large load situation, by operating the speed change operation tool to the low-speed side, the swash plate angle of the variable capacity motor can be changed to an angle on the low-speed side, and a high torque can be obtained. Accordingly, even in a large load situation, the work vehicle can smoothly travel. To the contrary, in a small load situation, by operating the speed change operation tool to the high-speed side, the swash plate angle of the variable capacity motor can be changed to the angle on the high-speed side to obtain fast speed, and therefore, the work efficiency can be enhanced.

In addition, during the low-speed traveling, by operating the speed change operation tool to the low-speed side, the swash plate angle of the variable capacity motor is shifted to the angle on the low-speed side. Accordingly, the angle on the high-speed side exhibiting high hydraulic pressure transmission efficiency can be more frequently used as the swash plate angle of the variable capacity pump, and thus the vehicle speed during the low-speed traveling can be stabilized, to thereby facilitate working at a low-speed.

(2) As long as the change gear ratio of the hydrostatic continuously variable transmission device set based on the output of the operation position detector is a change gear ratio that can be attained by the swash plate angle of the variable capacity motor on the low-speed side, the swash plate angle of the variable capacity motor is retained to the angle on the low-speed side. The low-speed side of the variable capacity motor which can attain a high torque is utilized maximally, and the angle on the high-speed side exhibiting high hydraulic pressure transmission efficiency can be more frequently used as the swash plate angle of the variable capacity pump.

As a result, while the traveling of the work vehicle in a large load situation can be smoothly performed, stability of the vehicle speed in a wider low-speed region can be enhanced, and traveling and working in the wider low-speed region are facilitated.

(3) In a speed change state in which the swash plate angle of the variable capacity motor is shifted to the angle on the high-speed side with a low torque, when the engine rotational speed is reduced to a large extent so that the decrease amount of the engine rotational speed from the set rotational speed reaches the set amount, along with it, the swash plate angle of the variable capacity motor is shifted from the angle on the high-speed side to the angle on the low-speed side. With this configuration, the generation of engine stall caused by overload can be prevented.

(4) When the speed change step of the stepped transmission device is the low-speed step for low-speed working that can secure a high torque, the first switching control unit is actuated. By operating the speed change operation tool to the low-speed side, the swash plate angle of the variable capacity motor can be changed to the angle on the low-speed side, in accordance with the operation region on the low-speed side in which the speed change operation tool is located at that moment. To the contrary, by operating the speed change operation tool to the high-speed side, the swash plate angle of the variable capacity motor can be changed to the angle on the high-speed side, in accordance with the operation region on the high-speed side in which the speed change operation tool is located at that moment.

With this configuration, for example in the case where heavy loading work is performed in which enough torque is not seemed to be obtained only by shifting the speed change step of the stepped transmission device to the low-speed step for low-speed working, by operating the speed change operation tool to the low-speed side, the swash plate angle of the variable capacity motor can be changed to the angle on the low-speed side to thereby secure a higher torque, and therefore, even in heavy loading work or the like with a large load, the traveling of the work vehicle can be smoothly performed. To the contrary, in light load work or the like with a small load, by operating the speed change operation tool to the high-speed side, the swash plate angle of the variable capacity motor can be changed to the angle on the high-speed side to obtain fast speed, and therefore, the work efficiency can be enhanced.

Then, the shifting of the swash plate angle of the variable capacity motor by the actuation of the first switching control unit is performed solely through the operation of the speed change operation tool by the driver's will. Accordingly, even when the swash plate angle of the variable capacity motor is shifted to the high-speed side, the swash plate angle of the variable capacity motor is never unexpectedly shifted to the low-speed side which may otherwise be caused by the reduction in the engine rotational speed, and the change gear ratio of the hydrostatic continuously variable transmission device suitable for the work set by the operation of the speed change operation tool by the driver's will can be retained.

During the low-speed traveling, by operating the speed change operation tool to the low-speed side, the swash plate angle of the variable capacity motor is shifted to the angle on the low-speed side. Accordingly, the angle on the high-speed side exhibiting high hydraulic pressure transmission efficiency can be more frequently used as the swash plate angle of the variable capacity pump, and thus the vehicle speed during the low-speed traveling can be stabilized, to thereby facilitate working at a low-speed.

In other words, by changing the swash plate angle of the variable capacity motor based on the operation position of the speed change operation tool which is visually recognizable, advantages are obtained in operability, and at the same time the variable capacity motor can be utilized more effectively, leading to enhancement in traveling performance as well as workability.

When the speed change step of the stepped transmission device is the high-speed step for high-speed working that can secure a relatively high torque, the first switching control unit and the third switching control unit are actuated. Therefore, effects can be obtained which are approximately the same as those obtained in the case where the low-speed step for low-speed working is selected.

It should be noted that the high-speed step for high-speed working exerts a lower torque than the low-speed step for low-speed working does and thus engine stall caused by overload is likely to be generated. Therefore, the shifting of the swash plate angle of the variable capacity motor is configured not only to be performed by the operation of the speed change operation tool by the driver's will, but also to be performed automatically based on the decrease amount of the engine rotational speed. Accordingly, while it is configured to allow the operation of the speed change operation tool to shift the swash plate angle of the variable capacity motor, in a speed change state in which the swash plate angle of the variable capacity motor is shifted to the angle on the high-speed side with a low torque, when the engine rotational speed is reduced to a large extent so that the decrease amount of the engine rotational speed from the set rotational speed reaches the set amount, along with it, the swash plate angle of the variable capacity motor is shifted from the angle on the high-speed side to the angle on the low-speed side. With this configuration, the generation of engine stall caused by overload can be prevented.

When the speed change step of the stepped transmission device is the fastest step for high-speed moving with a low torque, the second switching control unit and the third switching control unit are actuated. Therefore, as long as the change gear ratio of the hydrostatic continuously variable transmission device set based on the output of the operation position detector is a change gear ratio that can be attained by the swash plate angle of the variable capacity motor on the low-speed side, the swash plate angle of the variable capacity motor is retained to the angle on the low-speed side. Accordingly, the low-speed side of the variable capacity motor which can attain a high torque is utilized maximally, and the angle on the high-speed side exhibiting high hydraulic pressure transmission efficiency can be more frequently used as the swash plate angle of the variable capacity pump.

As a result, while the moving of the work vehicle in a large load situation, such as ascending a slope, can be smoothly performed, stability of the vehicle speed in the wider low-speed region can be enhanced, and movability can be enhanced.

In addition, the fastest step for high-speed moving exerts further lower torque than the high-speed step for high-speed working does and thus engine stall caused by overload is likely to be generated. Therefore, like in the case where the high-speed step for high-speed working is selected, the shifting of the swash plate angle of the variable capacity motor is configured not only to be performed by the operation of the speed change operation tool by the driver's will, but also to be performed automatically based on the decrease amount of the engine rotational speed. With this configuration, the generation of engine stall caused by overload can be prevented.

Since the control actuation suitable for the speed change step of the stepped transmission device is automatically selected along with the selection of the speed change step of the stepped transmission device, the variable capacity motor can be utilized more appropriately and effectively while enhancing the operability, leading to enhancement in traveling performance as well as workability.

(5) The second set rotational speed is set to the rotational speed at which the engine exerts the maximum torque.

According to this configuration, in a wide rotational speed region on the high-speed side from the second set rotational speed at which the engine exerts the maximum torque to the rated rotational speed, the vehicle speed and the actuation speed of the working device can be retained in a relationship in which they are proportional to the engine rotational speed. Therefore, in the case where the work, such as the rotary tillage work, is performed in which the vehicle speed and the actuation speed of the working device are desired to be retained in a constant relationship, in the wide rotational speed region on the high-speed side, even though the engine rotational speed is changed due to traveling load, working load or the like during work traveling, the vehicle speed and the actuation speed of the working device can be retained in the constant relationship.

Moreover, the decrease in the engine rotational speed from the second set rotational speed caused by traveling load or working load can be suppressed, and a state in which the vehicle speed and the actuation speed of the working device are retained in the constant relationship can be easily continued.

(6) The second set rotational speed is set to the rotational speed equal or close to the rated rotational speed of the engine. According to this configuration, in the wide rotational speed region from the rotational speed equal or close to the idling rotational speed to the rotational speed equal or close to the rated rotational speed, the engine rotational speed as well as the change gear ratio of the continuously variable transmission device is changed by the accelerator operation, a range of adjustment of the vehicle speed by the accelerator operation becomes wider, and the acceleration and deceleration by the accelerator operation is facilitated.

(7) According to this configuration, by shifting the speed change step of the stepped transmission device to the speed change step for working, the state can be switched to a first condition suitable for work traveling, and by shifting the speed change step of the stepped transmission device to the speed change step for moving, the state can be switched to a second condition suitable for moving. Therefore, an effort of shifting between the first condition and the second condition can be omitted.

(8) The change gear ratio of the continuously variable transmission device corresponding to the engine rotational speed is corrected to an appropriate one on which a driver's intention is reflected using the smallest change gear ratio set by the change gear ratio setting unit as criterion.

(9) A phenomenon in which a driver senses a discomfort can be prevented, such as stopping traveling of the work vehicle caused by the continuously variable transmission device becoming neutral, due to the reduction in the engine rotational speed, even though the engine is operated.

In addition, in the case where the engine rotational speed is reduced to a rotational speed equal to or below the first set rotational speed due to the traveling load, the working load or the like, the traveling state is retained without making the continuously variable transmission device neutral. Therefore, even in the low rotational speed region equal to or below the first set rotational speed, the engine can be imparted with a viscous property enough to be sensed by the driver. Therefore, the driver is allowed to recognize overload on the engine in the low rotational speed region, to thereby motivate the driver to take some measures, such as deceleration operation to reduce the load.

(10) The vehicle speed control unit changes the swash plate angle of the variable capacity pump and the swash plate angle of the variable capacity motor so that the vehicle speed read out from the output from the vehicle speed sensor matches the control target vehicle speed obtained based on the output from the engine sensor and the output from the change gear ratio setting unit.

(11) In a case where the engine rotational speed is increased from the idling rotational speed by the accelerator operation and the work vehicle is started, as the engine rotational speed becomes a lower rotational speed close to the first set rotational speed, the change gear ratio of the hydrostatic continuously variable transmission device becomes the large change gear ratio on the low-speed side, and thus a load on the engine is reduced. Therefore, as compared with the case where the work vehicle is started in a state in which the change gear ratio of the hydrostatic continuously variable transmission device is retained at a small change gear ratio on the high-speed side exhibiting a large load, a decrease in the engine rotational speed and generation of engine stall caused by overload upon starting can be effectively suppressed, and the starting of the work vehicle can be smoothly performed.

In addition, in a case where the engine rotational speed is reduced to a rotational speed lower than the second set rotational speed during traveling due to the traveling load, working load or the like, as the decrease amount from the second set rotational speed becomes larger, the change gear ratio of the hydrostatic continuously variable transmission device becomes a large change gear ratio on the low-speed side, and thus a load on the engine is reduced. Therefore, the engine can be imparted with a viscous property, to thereby effectively suppress the generation of engine stall which may otherwise be caused by overload.

Then, when the engine rotational speed is increased to or above the second set rotational speed, regardless of fluctuation of the power transmission efficiency in the hydrostatic continuously variable transmission device caused by fluctuation in load, the change gear ratio of the hydrostatic continuously variable transmission device becomes constant at the smallest change gear ratio, and therefore, regardless of fluctuation of the engine rotational speed caused by the accelerator operation, traveling load or working load, a relationship in which the vehicle speed is proportional to the engine rotational speed is retained. Accordingly, in the case where the work, such as rotary tillage work, is performed in which the vehicle speed and the actuation speed of the working device are desired to be retained in a relationship in which they are proportional to the engine rotational speed, the relationship can be retained with high accuracy regardless of the fluctuation of the power transmission efficiency in the hydrostatic continuously variable transmission device, and a difference is unlikely to occur between the vehicle speed and the appropriate speed for the actuation speed of the working device.

Furthermore, when the engine rotational speed is a rotational speed between the first set rotational speed and the second set rotational speed, the engine rotational speed as well as the change gear ratio of the hydrostatic continuously variable transmission device is changed by the accelerator operation, a range of adjustment of the vehicle speed by the accelerator operation becomes wider, and an amount of change in the vehicle speed relative to the accelerator operation amount becomes larger, and acceleration and deceleration by the accelerator operation is facilitated.

(12) Even in the case of the configuration that has the stepped transmission device, when work, such as rotary tillage work, is performed in which the vehicle speed and the actuation speed of the working device are desired to be retained in a relationship in which they are proportional to the engine rotational speed, the relationship can be retained with high accuracy, and a difference is unlikely to occur between an appropriate speed for the actuation speed of the working device and the vehicle speed.

(13) When the speed change step of the stepped transmission device is changed, in accordance with this change, the computation result by the computing unit is changed to a large extent. Accordingly, the display range of the speed change step of the continuously variable transmission device displayed on the speed change step display part for variable speed change is automatically switched to the display range corresponding to the speed change step of the stepped transmission device. In other words, the speed change step of the continuously variable transmission device can be displayed with an appropriate display range corresponding to each speed change step of the stepped transmission device, and the vehicle speed setting corresponding to work condition, including the shifting of the speed change step of the stepped transmission device, is facilitated.

(14) The speed change step of the continuously variable transmission device and the speed change step of the stepped transmission device are displayed side by side. Accordingly, an association between the speed change step of the continuously variable transmission device and the speed change step of the stepped transmission device can be easily understood.

(15) When the change in the set rotational speed of the engine by the engine rotational speed setting unit, the change in the change gear ratio of the continuously variable transmission device by the change gear ratio setting unit or the like are performed, the set vehicle speed displayed on the set vehicle speed display part is changed in a continuous manner in accordance with those changes. Therefore, in a case where work is performed with a working device in which a recommended vehicle speed is set, such as sparging device, or in a case where work is performed at the desired engine rotational speed and vehicle speed, the vehicle speed setting can be simply and quickly performed regardless of the state of the vehicle including traveling and stopping.

(16) The display on the set vehicle speed display part functions as an interrupt display that works during the detection of the operation of the speed change operation tool, and during a set time after the operation of the operation tool becomes undetectable. An amount of information always displayed on the display device can be reduced, to thereby help easy understanding of the displayed information. Especially, even when the set rotational speed of the engine is set to the rated rotational speed by the engine rotational speed setting unit and the speed change step of the continuously variable transmission device displayed on the speed change step display part for variable speed change becomes the same as the set vehicle speed displayed on the set vehicle speed display part, they can be easily distinguished.

(17) The vehicle speed is displayed on the vehicle speed display part. Even when the accelerator operation is maximized and the speed change step of the continuously variable transmission device displayed on the speed change step display part for variable speed change becomes the same as the vehicle speed displayed on the vehicle speed display part, they can be easily distinguished.

(18) The speed change step of the variable capacity motor can be easily recognized. The difference in the feeling of traveling caused by the speed change step of the variable capacity motor can be easily recognized.

OTHER EMBODIMENTS

<1> The work vehicle may be an agricultural work vehicle, e.g. riding type rice transplanter and combine; a riding type mower; or a construction work vehicle, e.g. wheel loader.

<2> The work vehicle may be: those having no auxiliary transmission device (stepped transmission device) 10; those having a pair of the right and left continuously variable transmission devices 9 for individually changing the speed of each of the right and left rear wheels 2; those having a main clutch; or those having a forward-reverse switching mechanism specialized for switching between a forward movement and a reverse movement.

<3> The main transmission device (continuously variable transmission device) 9 may be those having the variable capacity motor 32 which is capable of performing three- or more step speed change, or a hydromechanical transmission device (HMT) into which a planetary gear is incorporated.

<4> The swash plate angle control unit D may be, for example, configured to perform the swash plate feedback control in which the actuation of the pump swash plate operation unit A is controlled in such a manner that the output of the swash plate angle sensor for detecting the operation angle of the pump swash plate 31B matches the control target operation angle which is set based on the operation position of the main shift lever 20 (the operation angle of the swash plate angle sensor falls on the dead band of the control target operation angle).

<5> With respect to the configurations of the pump swash plate operation unit A and the motor swash plate operation unit B, various modifications are possible, and for example, an electric actuator, such as electric motor and electromagnetic cylinder, may be adopted.

<6> The auxiliary transmission device 10 may be capable of performing two-step speed change including the low-speed step for working and the high-speed step for moving.

<7> The lever sensor (speed change step detector) 60 for stepped speed change may be those configured to detect an operation position of a shift member for switching speed change step provided in the auxiliary transmission device 10.

<8> The speed change operation tool 20 may be those having a main shift pedal and the like, or alternatively, those having both the main shift lever and the main shift pedal.

<9> The speed change operation tool 20 may not have the medium-speed set region (hysteresis), and may be configured to be operated to the low-speed set region and the high-speed set region.

<10> The change gear ratio determining unit 27Ba may be those configured to detect the operation angle of the pump swash plate 31B based on an amount of electrical continuity to the variable speed valve 38 for forward traveling or the variable speed valve 39 for reverse traveling, and to, based on whether or not the detected operation angle of the pump swash plate 31B reaches the operation limitation angle, determine whether or not a change gear ratio of the main transmission device 9 which is set based on the output of the lever sensor (operation position detector) 59 is a change gear ratio that can be attained by the swash plate angle of the variable capacity motor 32 on the low-speed side. Alternatively, the change gear ratio determining unit 27Ba may be those provided with the swash plate angle sensor for detecting the operation angle of the pump swash plate 31B, and configured to, based on whether or not the operation angle of the pump swash plate 31B obtained from an output of the swash plate angle sensor reaches the operation limitation angle, determine whether or not the change gear ratio of the main transmission device 9 which is set based on the output of the lever sensor 59 is a change gear ratio that can be attained by the swash plate angle of the variable capacity motor 32 on the low-speed side.

<11> It may be configured that, when the swash plate angle control unit D or the first switching control unit 27Bc reads out the operation position of the speed change operation tool 20 based on the output of the lever sensor 59 and switches the speed change step of the variable capacity motor 32 in accordance with the operation region where the speed change operation tool 20 is located, a speed change operation of the pump swash plate 31B, with the operation amount which is set so as to compensate (offset) the amount of change in the change gear ratio of the main transmission device 9 caused along with the switching, is not performed, and only when the swash plate angle control unit D or the second switching control unit 27Bd switches the speed change step of the variable capacity motor 32 based on the determination result by the change gear ratio determining unit 27Ba configured to determine the change gear ratio of the main transmission device 9 which is set based on the output of the lever sensor 59, the speed change operation of the pump swash plate 31B, with the operation amount which is set so as to compensate (offset) the amount of change in the change gear ratio of the main transmission device 9 caused along with the switching, is performed.

<12> With respect to the engine drop amount (set amount) which is used as criterion for determining to perform the switching of the speed change step of the variable capacity motor 32 from the high-speed step to the low-speed step by the swash plate angle control unit D or the third switching control unit 27Be, various modifications are possible depending on the performance of the engine 3 and types of the work performed by the work vehicle.

<13> The swash plate angle control unit D or the third switching control unit 27Be may be configured in such a manner that, when it switches the speed change step of the variable capacity motor 32 from the high-speed step to the low-speed step based on the engine drop amount and it is detected that the engine rotational speed is recovered to the set rotational speed based on the output of the decrease detection unit 27Bb, the swash plate angle control unit D or the third switching control unit 27Be switches the speed change step of the variable capacity motor 32 from the low-speed step to the high-speed step.

<14> The vehicle speed control unit 27B may be, for example, configured to perform the swash plate feedback control in which the actuation of the pump swash plate operation unit A is controlled in such a manner that the output from the swash plate angle sensor for detecting the operation angle of the pump swash plate 31B matches the control target operation angle which is set based on the operation position of the main shift lever 20 (the operation angle of the swash plate angle sensor falls on the dead band of the control target operation angle).

<15> The vehicle speed control unit 27B may be configured to correct the change gear ratio of the main transmission device 9 corresponding to the engine rotational speed in the medium rotational speed region NM and the high rotational speed region NH, based on the output from the change gear ratio setting unit.

<16> The first set rotational speed in the vehicle speed setting data may be set to a rotational speed close to the idling rotational speed. In addition, the second set rotational speed in the first vehicle speed setting data may be set to a rotational speed close to the rotational speed at which the engine 3 exerts the maximum torque. Further, the first change gear ratio and the second set rotational speed in the vehicle speed setting data may be configured to be changeable in accordance with type of the work vehicle and type of the working device to be installed.

<17> An operation tool may be provided, such as switch for switching the vehicle speed setting state between the first condition in which the first vehicle speed setting data is adopted and the second condition in which the second vehicle speed setting data is adopted.

<18> Both the vehicle speed setting data specialized for low-speed working and the vehicle speed setting data specialized for high-speed working may be provided.

<19> The vehicle speed sensor (vehicle speed detector) 63 may be those configured to detect the output rotational speed of the auxiliary transmission device 10, or those provided on both right and left rear wheel shafts so as to detect an output rotational speed of the differential device 13 for rear wheel. Then, in accordance with the configuration of the vehicle speed sensor 63, a manner the vehicle speed control unit 27B obtains the control target vehicle speed for the output from the vehicle speed sensor 63 is also to be modified.

<20> The speed change step of the variable capacity motor 32 may be directly detected by a swash plate angle sensor for detecting the operation angle of the motor swash plate 32B, or indirectly detected (estimated) from an operation signal to the motor swash plate 32B.

The speed change system for the work vehicle according to the present invention is applicable to the work vehicle, such as tractor, riding type mower, riding type rice transplanter, combine, and wheel loader, which has the hydrostatic transmission device in which the swash plate angle of the variable capacity pump is non-stepwise changeable and the swash plate angle of the variable capacity motor is stepwise changeable.

What is claimed is:

1. A speed change system for a work vehicle having a continuously variable transmission device comprising:
    a pump swash plate operation mechanism configured to operate a swash plate of a variable capacity pump for the continuously variable transmission device;
    a motor swash plate operation mechanism configured to operate a swash plate of a variable capacity motor for the continuously variable transmission device;
    a swash plate angle control unit configured to non-stepwise adjust a swash plate angle of the variable capacity pump through the pump swash plate operation mechanism and stepwise adjust a swash plate angle of the variable capacity motor through the motor swash plate operation mechanism; and
    an operation position detector configured to detect an operation position of a speed change operation tool;
    wherein
    the swash plate angle control unit sets the swash plate angle of the variable capacity pump and the swash plate angle of the variable capacity motor based on an output from the operation position detector, and controls the pump swash plate operation mechanism and the motor swash plate operation mechanism so that the swash plate angle of the variable capacity pump and the swash plate angle of the variable capacity motor become respective set swash plate angles, and
    when the swash plate angle of the variable capacity motor is changed based on the output from the operation position detector, the swash plate angle control unit controls the pump swash plate operation mechanism in such a manner that the swash plate angle of the variable capacity pump is changed with a control amount which is set so as to compensate an amount of change in a change gear ratio of the continuously variable transmission device caused along with the change of the swash plate angle of the variable capacity motor.

2. The system according to claim 1, wherein
    the swash plate angle control unit reads out the operation position of the speed change operation tool based on the output from the operation position detector, sets the swash plate angle of the variable capacity motor to an angle on a higher-speed side as an operation region in which the speed change operation tool is positioned is on a higher-speed side, and controls the motor swash plate operation mechanism so that the swash plate angle of the variable capacity motor becomes the set swash plate angle.

3. The system according to claim 1, further comprising:
    a change gear ratio determining unit configured to determine the change gear ratio of the continuously variable transmission device which is set based on the output from the operation position detector,
    wherein
    when the change gear ratio determining unit determines that the change gear ratio of the continuously variable transmission device set based on the output from the operation position detector is a change gear ratio that can be attained by the swash plate angle of the variable capacity motor on a low-speed side, the swash plate angle control unit sets the swash plate angle of the variable capacity motor to an angle on the low-speed side and controls the motor swash plate operation mechanism so that the swash plate angle of the variable capacity motor becomes the set angle on the low-speed side, and
    when the change gear ratio determining unit determines that the change gear ratio of the continuously variable transmission device set based on the output from the operation position detector is a change gear ratio that cannot be attained by the swash plate angle of the variable capacity motor on the low-speed side, the swash plate angle control unit sets the swash plate angle of the variable capacity motor to an angle on a high-speed side and controls the motor swash plate operation mechanism so that the swash plate angle of the variable capacity motor becomes the set angle on the high-speed side.

4. The system according to claim 1, further comprising:
    a decrease detection unit configured to detect a decrease amount of an engine rotational speed from a set rotational speed,
    wherein, in a case where the swash plate angle of the variable capacity motor is an angle on a high-speed side, when it is detected that the decrease amount of the engine rotational speed from the set rotational speed reaches a set amount based on an output from the decrease detection unit, the swash plate angle control unit controls the motor swash plate operation mechanism so that the swash plate angle of the variable capacity motor is switched from the angle on the high-speed side to an angle on a low-speed side, and afterward, when it is detected that the engine rotational speed to the set rotational speed is recovered based on the output from the decrease detection unit, the swash plate angle control unit controls the motor swash plate operation mechanism so that the swash plate angle of the variable capacity motor is switched from the angle on the low-speed side to the angle on the high-speed side.

5. The system according to claim 1, further comprising:
    a change gear ratio determining unit configured to determine the change gear ratio of the continuously variable transmission device which is set based on the output from the operation position detector;
a decrease detection unit configured to detect a decrease amount of an engine rotational speed from a set rotational speed; and
a speed change step detector configured to detect a speed change step of a stepped transmission device capable of performing three-step speed change;
wherein the swash plate angle control unit includes:
a first switching control unit configured to switch the swash plate angle of the variable capacity motor based on the output from the operation position detector;
a second switching control unit configured to switch the swash plate angle of the variable capacity motor based on a determination by the change gear ratio determining unit; and
a third switching control unit configured to switch the swash plate angle of the variable capacity motor based on an output from the decrease detection unit,
wherein
the first switching control unit reads out the operation position of the speed change operation tool based on the output from the operation position detector, sets the swash plate angle of the variable capacity motor to an angle on a higher-speed side as an operation region in which the speed change operation tool is positioned is on a higher-speed side, and controls the motor swash plate operation mechanism so that the swash plate angle of the variable capacity motor becomes the set swash plate angle,
when the change gear ratio determining unit determines that the change gear ratio of the continuously variable transmission device set based on the output from the operation position detector is a change gear ratio that can be attained by the swash plate angle of the variable capacity motor on a low-speed side, the second switching control unit sets the swash plate angle of the variable capacity motor to an angle on the low-speed side and controls the motor swash plate operation mechanism so that the swash plate angle of the variable capacity motor becomes the set angle on the low-speed side, and
when the change gear ratio determining unit determines that the change gear ratio of the continuously variable transmission device set based on the output from the operation position detector is a change gear ratio that cannot be attained by the swash plate angle of the variable capacity motor on the low-speed side, the second switching control unit sets the swash plate angle of the variable capacity motor to an angle on a high-speed side and controls the motor swash plate operation mechanism so that the swash plate angle of the variable capacity motor becomes the set angle on the high-speed side,
in a case where the swash plate angle of the variable capacity motor is the angle on the high-speed side, when it is detected that the decrease amount of the engine rotational speed from the set rotational speed reaches a set amount based on the output from the decrease detection unit, the third switching control unit controls the motor swash plate operation mechanism so that the swash plate angle of the variable capacity motor is switched from the angle on the high-speed side to the angle on the low-speed side, and afterward, when it is detected that the engine rotational speed to the set rotational speed is recovered based on the output from the decrease detection unit, the third switching control unit controls the motor swash plate operation mechanism so that the swash plate angle of the variable capacity motor is switched from the angle on the low-speed side to the angle on the high-speed side,
wherein
the swash plate angle control unit actuates
the first switching control unit when it is detected that the speed change step of the stepped transmission device is a low-speed step for low-speed working based on an output from the speed change step detector,
the first switching control unit and the third switching control unit when it is detected that the speed change step of the stepped transmission device is a high-speed step for high-speed working based on the output from the speed change step detector, and
the second switching control unit and the third switching control unit when it is detected that the speed change step of the stepped transmission device is a fastest step for high-speed moving based on the output from the speed change step detector.

6. A speed change system for a work vehicle having a continuously variable transmission device comprising:
an engine rotational speed detector configured to detect an engine rotational speed; and
a vehicle speed control unit configured to control a change gear ratio of the continuously variable transmission device;
wherein
the vehicle speed control unit controls the change gear ratio with a process comprising:
(a) when the engine rotational speed is a first set rotational speed which is set to a rotational speed equal or close to an idling rotational speed of an engine, selecting a first change gear ratio which is set to a change gear ratio larger than a smallest change gear ratio as the change gear ratio of the continuously variable transmission device;
(b) when the engine rotational speed is a rotational speed which is equal to or above a second set rotational speed which is set on a high-speed side relative to the first set rotational speed, retaining the change gear ratio of the continuously variable transmission device at the smallest change gear ratio; and
(c) when the engine rotational speed is a rotational speed between the first set rotational speed and the second set rotational speed, making the change gear ratio of the continuously variable transmission device larger between the first change gear ratio and the smallest change gear ratio, as the engine rotational speed at that moment becomes low.

7. The system according to claim 6, wherein
the second set rotational speed is a rotational speed at which the engine outputs a maximum torque.

8. The system according to claim 6, wherein
the second set rotational speed is a rotational speed which is equal or close to a rated rotational speed of the engine.

9. The system according to claim 6, further comprising:
a speed change step detector configured to detect a speed change step of a stepped transmission device having a speed change step for working and a speed change step for moving,
wherein
when the speed change step of the stepped transmission device is the speed change step for working, the second set rotational speed becomes a rotational speed at which the engine outputs a maximum torque, and
when the speed change step of the stepped transmission device is the speed change step for moving, the second set rotational speed becomes a rotational speed equal or close to a rated rotational speed of the engine.

10. The system according to claim 6, wherein
the vehicle speed control unit corrects the change gear ratio of the continuously variable transmission device corresponding to the engine rotational speed, based on the smallest change gear ratio set for the continuously variable transmission device.

11. The system according to claim 6, wherein
when the engine rotational speed is a rotational speed larger than zero, the continuously variable transmission device is controlled so as not to become neutral.

12. A speed change system for a work vehicle having a continuously variable transmission device comprising:
an engine rotational speed detector configured to detect an engine rotational speed;
a vehicle speed control unit configured to control a change gear ratio of the continuously variable transmission device; and
a vehicle speed detector configured to detect a vehicle speed;
wherein
the vehicle speed control unit computes a control target vehicle speed based on the detected engine rotational speed and a change gear ratio which is set for the continuously variable transmission device, and controls the change gear ratio of the continuously variable transmission device so that the detected vehicle speed matches the control target vehicle speed.

13. The system according to claim 12, wherein
the continuously variable transmission device is HST,
the system further comprises: a pump swash plate operation mechanism configured to operate a swash plate of a variable capacity pump of the HST; and a motor swash plate operation mechanism configured to operate a swash plate of a variable capacity motor of the HST, and
the vehicle speed control unit non-stepwise adjusts a swash plate angle of the variable capacity pump through the pump swash plate operation mechanism and stepwise adjusts a swash plate angle of the variable capacity motor through the motor swash plate operation mechanism.

14. The system according to claim 12, wherein
the vehicle speed control unit controls the change gear ratio with a process comprising:
(a) when the engine rotational speed is a first set rotational speed which is set to a rotational speed equal or close to an idling rotational speed of an engine, selecting a first change gear ratio which is set to a change gear ratio larger than a smallest change gear ratio as the change gear ratio of the continuously variable transmission device;
(b) when the engine rotational speed is a rotational speed which is equal to or above a second set rotational speed which is set on a high-speed side relative to the first set rotational speed, retaining the change gear ratio of the continuously variable transmission device at the smallest change gear ratio; and
(c) when the engine rotational speed is a rotational speed between the first set rotational speed and the second set rotational speed, making the change gear ratio of the continuously variable transmission device larger between the first change gear ratio and the smallest change gear ratio, as the engine rotational speed at that moment becomes low.

15. The system according to claim 12, further comprising:
a speed change step detector configured to detect a speed change step of a stepped transmission device;
wherein
the vehicle speed control unit computes the control target vehicle speed, with a change gear ratio of the stepped transmission device obtained from an output from the speed change step detector being taken into account, and controls the change gear ratio of the continuously variable transmission device so that an output from the vehicle speed detector matches the control target vehicle speed.

16. A speed change system for a work vehicle having a continuously variable transmission device comprising:
a computing unit configured to compute a rated vehicle speed obtained when an engine rotational speed reaches a rated rotational speed of an engine, based on the rated rotational speed and a change gear ratio set for the continuously variable transmission device;
a display device comprising: a vehicle speed display part configured to display information regarding a vehicle speed; and a speed change step display part for variable speed change configured to display with characters without unit the rated vehicle speed output by the computing unit as a speed change step of the continuously variable transmission device; and
a display control unit configured to control the display device.

17. The system according to claim 16, further comprising:
a stepped transmission device configured to stepwise change power for traveling;
a speed change step detector configured to detect a speed change step of the stepped transmission device;
wherein
the computing unit computes the rated vehicle speed, with a change gear ratio of the stepped transmission device read out from an output from the speed change step detector being taken into account.

18. The system according to claim 17, wherein
a speed change step display part for stepped speed change configured to display the speed change step of the stepped transmission device which is output from the speed change step detector is provided, and
the speed change step display part for stepped speed change and the speed change step display part for variable speed change are arranged adjacently.

19. The system according to claim 16, further comprising:
a set rotational speed detector for detecting a set rotational speed which is set for the engine;
wherein
the computing unit replaces the rated rotational speed of the engine with an output from the set rotational speed detector and computes a set vehicle speed obtained when the engine rotational speed reaches the set rotational speed, and
the display device is provided with a set vehicle speed display part configured to display with characters the set vehicle speed output by the computing unit.

20. The system according to claim 16, wherein
when an operation of a speed change operation tool is detected, the display control unit displays a set vehicle speed on the set vehicle speed display part, and
when a set time elapsed after the operation of the speed change operation tool becomes undetectable, the display control unit finishes displaying the set vehicle speed on the set vehicle speed display part.

21. The system according to claim 16, further comprising:
a rotational speed detector configured to detect a rotational speed associated with the vehicle speed;
wherein
the vehicle speed display part displays with characters the vehicle speed output by the computing unit, and is positioned away from the speed change step display part for variable speed change.

22. The system according to claim 16, wherein
the continuously variable transmission device is a hydrostatic continuously variable transmission device having a variable capacity motor capable of performing multi-step speed change and is provided with a motor speed change step detector configured to detect a speed change step of the variable capacity motor, and
the display device is provided with a motor speed change step display part configured to display the speed change step of the variable capacity motor which is output from the motor speed change step detector.

* * * * *